United States Patent
Orita

(10) Patent No.: US 8,442,681 B2
(45) Date of Patent: *May 14, 2013

(54) DESIRED MOTION EVALUATION APPARATUS OF LEGGED MOBILE ROBOT

(75) Inventor: Atsuo Orita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 222 days.

This patent is subject to a terminal disclaimer.

(21) Appl. No.: 13/036,511

(22) Filed: Feb. 28, 2011

(65) Prior Publication Data

US 2011/0213498 A1 Sep. 1, 2011

(30) Foreign Application Priority Data

Mar. 1, 2010 (JP) ................................ 2010-044701

(51) Int. Cl.
*G05B 19/18* (2006.01)

(52) U.S. Cl.
USPC ........... 700/254; 700/245; 700/246; 700/247; 700/260; 700/261; 180/8.2; 318/568.12

(58) Field of Classification Search ........................ None
See application file for complete search history.

(56) References Cited

U.S. PATENT DOCUMENTS

| | | | | |
|---|---|---|---|---|
| 4,826,392 A * | 5/1989 | Hayati | ........................... | 700/260 |
| 5,872,893 A * | 2/1999 | Takenaka et al. | ............. | 700/245 |
| 7,308,336 B2 * | 12/2007 | Takenaka et al. | ............. | 700/245 |
| 7,339,340 B2 * | 3/2008 | Summer et al. | .......... | 318/568.12 |
| 7,554,787 B2 * | 6/2009 | Pelrine et al. | ................. | 361/234 |
| 7,606,634 B2 * | 10/2009 | Takenaka et al. | ............. | 700/260 |
| 7,734,375 B2 * | 6/2010 | Buehler et al. | ................ | 700/245 |
| 7,845,440 B2 * | 12/2010 | Jacobsen | ...................... | 180/9.46 |
| 8,066,088 B2 * | 11/2011 | Asbeck et al. | ................. | 180/8.2 |
| 8,214,081 B2 * | 7/2012 | Choi et al. | .................... | 700/250 |
| 2011/0213495 A1 * | 9/2011 | Orita | ............................. | 700/254 |
| 2011/0213496 A1 * | 9/2011 | Orita | ............................. | 700/254 |
| 2011/0213498 A1 * | 9/2011 | Orita | ............................. | 700/261 |

FOREIGN PATENT DOCUMENTS

| | | |
|---|---|---|
| JP | 3674788 | 5/2005 |
| JP | 3679105 | 5/2005 |

* cited by examiner

*Primary Examiner* — Khoi Tran
*Assistant Examiner* — Jonathan L Sample
(74) *Attorney, Agent, or Firm* — Rankin, Hill & Clark LLP

(57) ABSTRACT

A desired motion evaluation apparatus of a legged mobile robot uses virtual surfaces (S3a, S2a, S2b) to approximate a plurality of surfaces to be contacted (FL, WL1, WL2) in an operating environment of the robot (1), and calculates translational forces (required virtual surface translational forces) to be applied from virtual surfaces (S3a, S2a, S2b) to the robot (1) in order to implement a translational motion of the desired motion of the entire robot (1). The desired motion evaluation apparatus evaluates the desired motion on the basis of the required virtual surface translational forces.

5 Claims, 19 Drawing Sheets

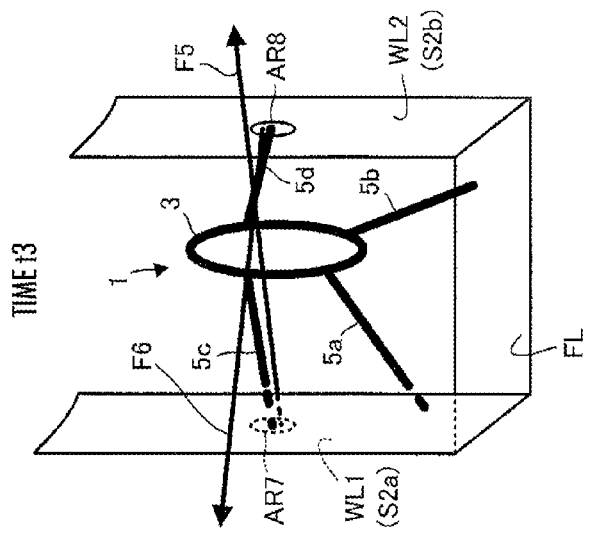
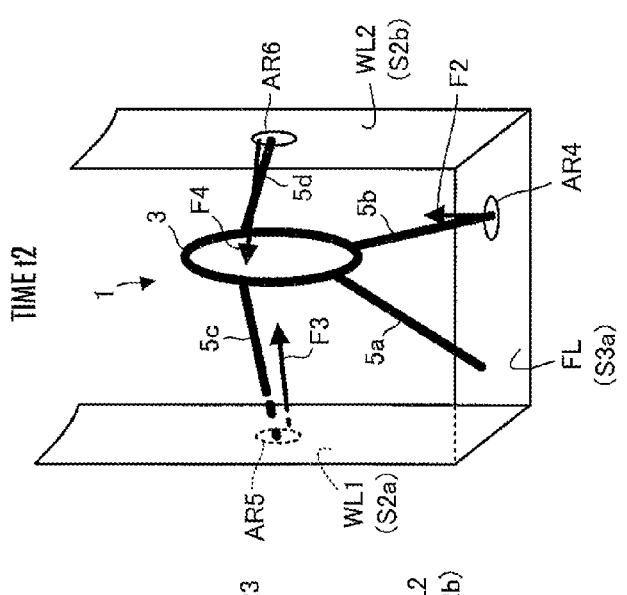
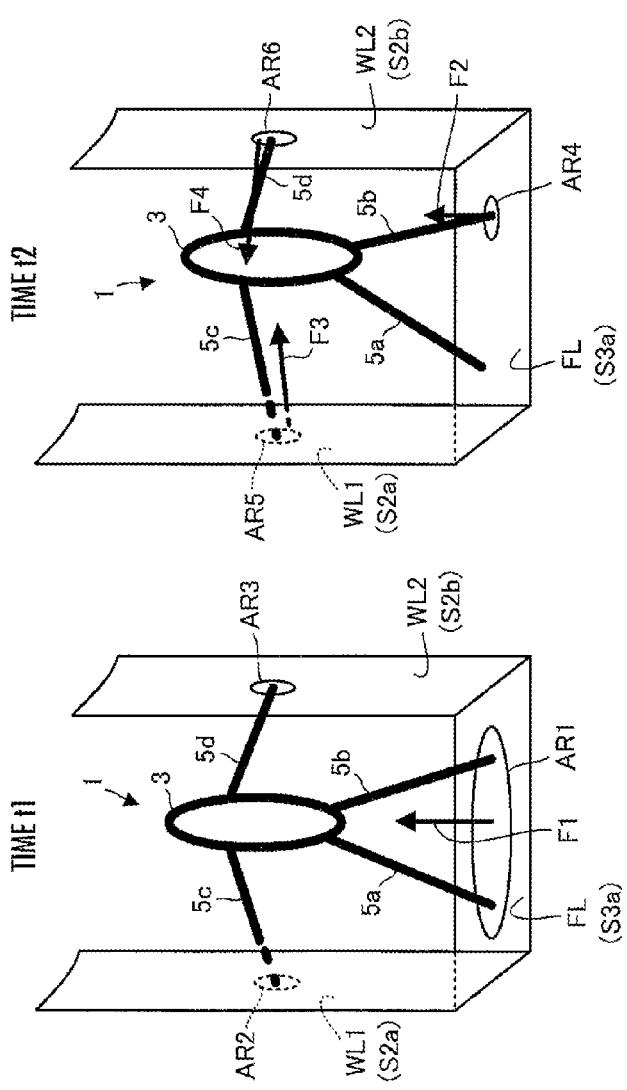

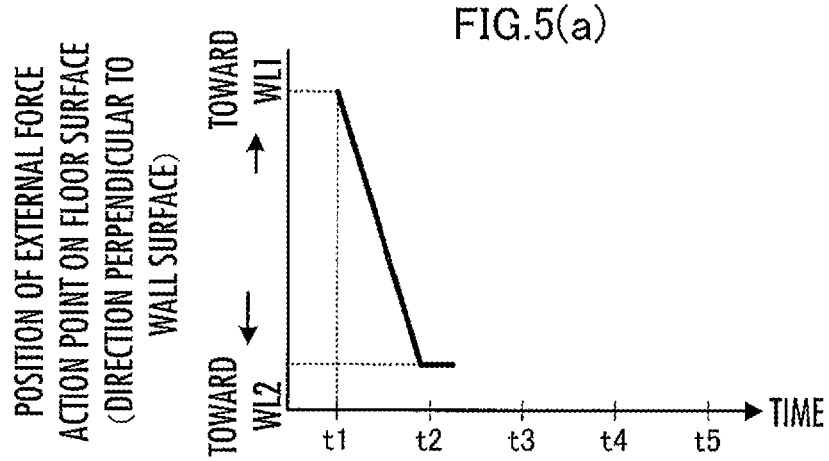
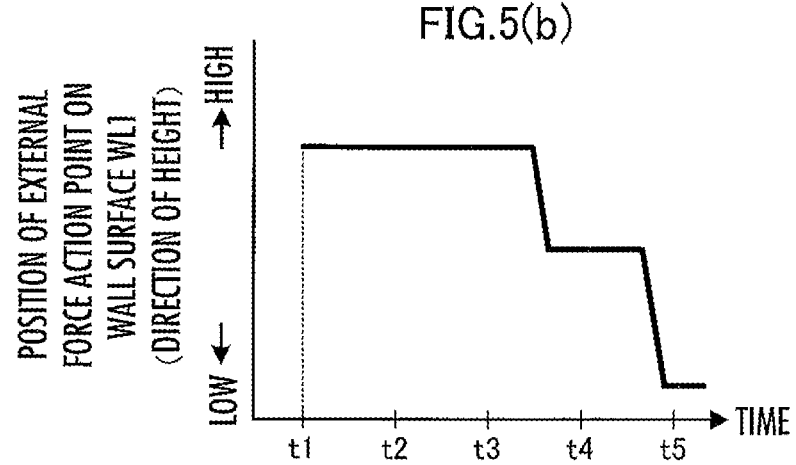
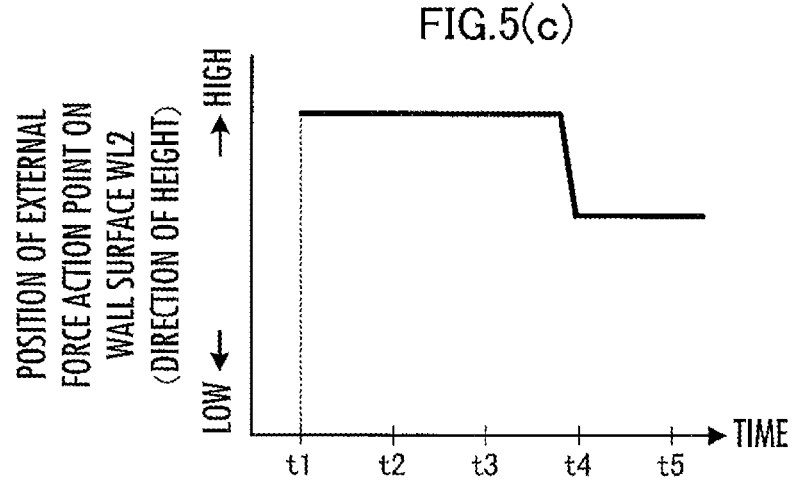

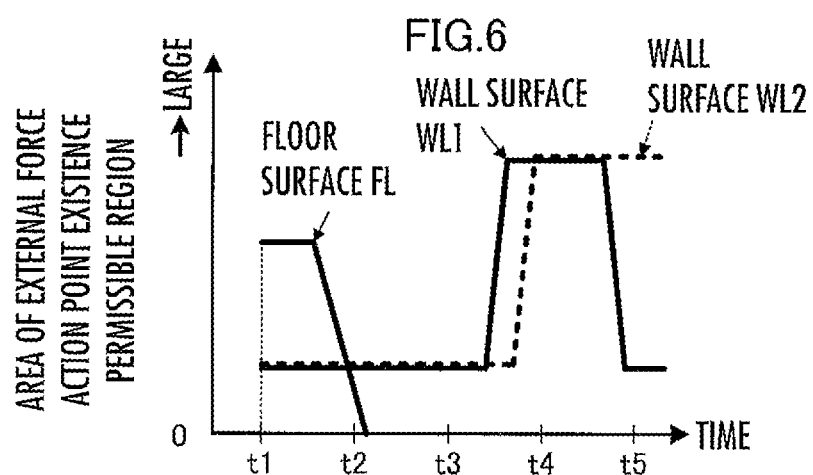

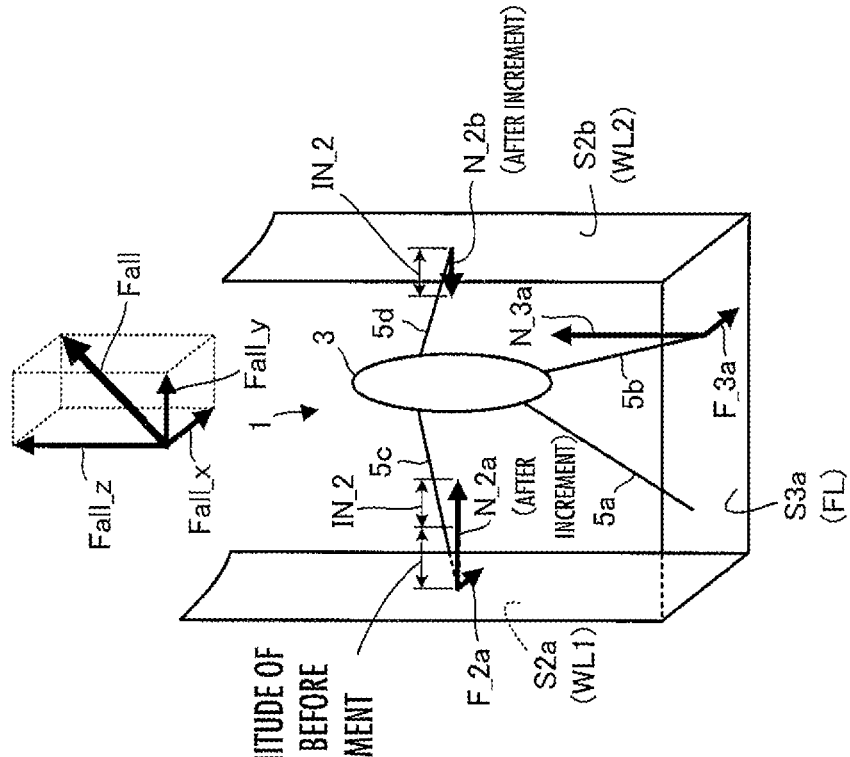
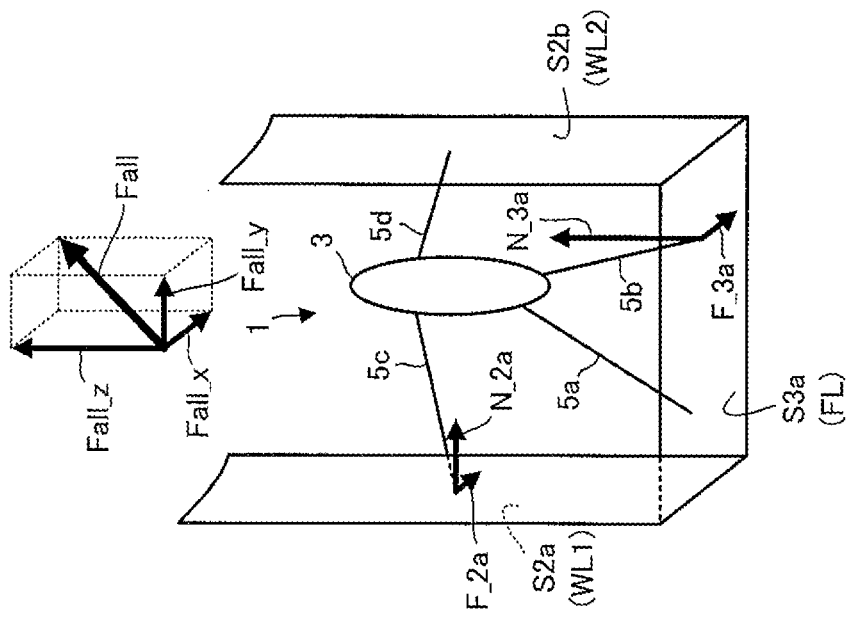

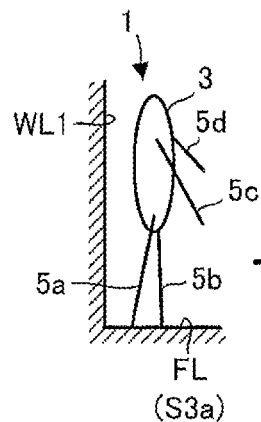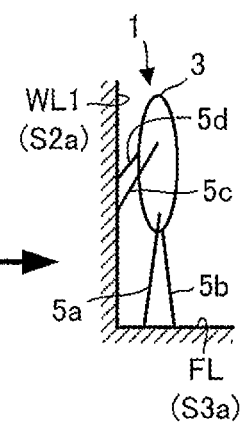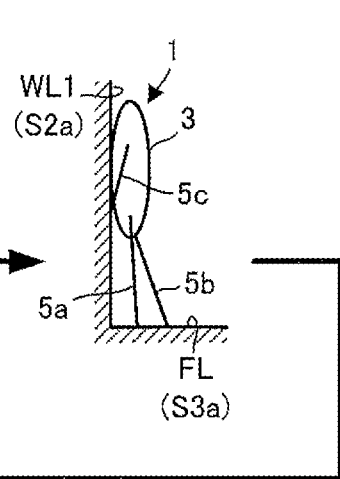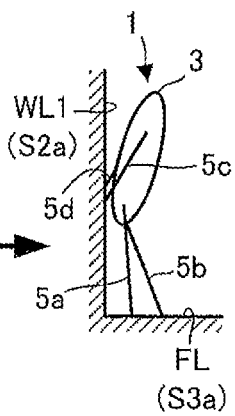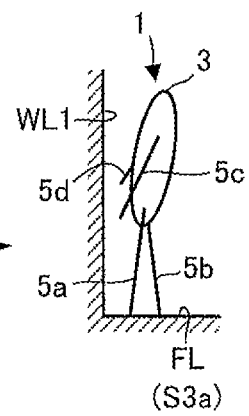

DESIRED MOTION EVALUATION APPARATUS OF LEGGED MOBILE ROBOT

BACKGROUND OF THE INVENTION

1. Field of the Invention

The present invention relates to a desired motion evaluation apparatus of a legged mobile robot.

2. Description of the Related Art

As a technique for generating a desired gait, including a desired motion, of a legged mobile robot (hereinafter referred to simply as a robot in some cases), there has conventionally been known a technique disclosed in, for example, Japanese Patent Official Gazette No. 3674788 or Japanese Patent Official Gazette No. 3679105 proposed by the applicant of the present application. These techniques are used for generating desired gaits for causing a legged mobile robot, such as a bipedal walking robot, to walk or run on a floor thereby to travel. Each of the desired gaits is composed of a desired motion that defines the motion (a time-series pattern of positions and postures) of each portion, such as the body and leg links, of the robot, and a desired floor reaction force that defines a floor reaction force to be applied from a floor to the robot and the point of action thereof (the total floor reaction force central point). These desired motion and desired floor reaction force are generated so that the dynamic feasibility is satisfied.

In general, when actually controlling the motion of the robot, simply controlling the actual motion of the robot to a desired motion frequently leads to a situation wherein an external force necessary for achieving a desired motion cannot be applied to the robot due to, for example, the difference between an actual operating environment of the robot, including the configuration of a floor, and an operating environment assumed in a desired gait. In such a situation, controlling an external force applied to the robot from an outside world, i.e., the operating environment of the robot, is necessary in addition to controlling the motion of the robot. For this reason, the desired gait of the robot usually needs to include a target related to an external force, such as the aforesaid desired floor reaction force, in addition to a desired motion of the robot.

To cause the robot to perform a variety of jobs, there are cases where it is required to cause the robot to perform a required motion while maintaining a plurality of portions of the robot in contact with a plurality of surfaces to be contacted existing outside the robot (e.g., maintaining the distal end of a leg and the distal end of an arm of the robot in contact with a floor surface and a wall surface, respectively), rather than simply causing the robot to travel on a floor.

In this case, unlike the case where the robot simply travels on a floor, external forces act on a plurality of portions of the robot from the plurality of surfaces to be contacted in an outside world of the robot.

Therefore, when generating the desired motion for causing the robot to perform a required motion while maintaining a plurality of portions of the robot in contact with a plurality of surfaces to be contacted existing outside the robot as described above, it is necessary to generate the desired motion such that appropriate external forces, which are dynamically feasible, can be applied to the robot from the plurality of surfaces to be contacted.

The desired motion, however, is a motion causing the external forces to act on the robot from the plurality of surfaces to be contacted, unlike the case where the robot simply travels on a floor. Therefore, there is usually a wide variety of possible types of patterns of the time series and combinations of external forces to be dynamically applied to the robot from the plurality of surfaces to be contacted in order to accomplish the desired motion rather than being limited to a single pattern or a pattern within a restricted range.

Hence, when generating a desired motion causing external forces to act on the robot from a plurality of surfaces to be contacted as described above, it is frequently required to provisionally generate a desired motion, which is kinematically feasible according to a required type of motion, and then to evaluate whether the desired motion is an appropriate desired motion dynamically feasible or whether the external forces, which need to be applied to the robot from the surfaces to be contacted in order to accomplish the desired motion, are to be appropriate to implement the motion of the robot smoothly.

Hitherto, however, the techniques for generating desired motion causing external forces to act on the robot from a plurality of surfaces to be contacted, as described above, has not yet been fully studied. Therefore, in an actual situation, there is no established technique enabling an efficient and proper evaluation of the desired motion.

SUMMARY OF THE INVENTION

The present invention has been made with the view of the background described above, and it is an object of the present invention to provide a desired motion evaluation apparatus capable of efficiently and properly evaluating whether a generated desired motion is appropriately feasible when the desired motion of the robot is generated in a situation wherein external forces act on the robot from a plurality of surfaces to be contacted.

To this end, a desired motion evaluation apparatus of a legged mobile robot in accordance with the present invention is a motion evaluation apparatus of a legged mobile robot, which evaluates a desired motion of the robot for causing the robot to implement a motion while having a plurality of portions of the robot in contact with a plurality of different surfaces to be contacted, which exist in an operating environment of the robot, the desired motion evaluation apparatus including:

a virtual surface group setting unit which uses a virtual surface group composed of a plurality of virtual surfaces having a predetermined mutual posture relationship in order to virtually set the virtual surface group in the space of an operating environment of the robot such that the plurality of virtual surfaces of the virtual surface group match or approximate the plurality of surfaces to be contacted;

a required total translational external force determining unit which determines, on the basis of the desired motion, a required total translational external force, which is a translational force component in a total external force to be applied to the robot to implement the desired motion;

a required virtual surface translational force calculating unit, which is a unit that calculates a required virtual surface translational force, which is a translational force to be applied to the robot from each of the plurality of virtual surfaces of the virtual surface group to attain the determined required total translational external force, and calculates the required virtual surface translational force in each virtual surface so as to satisfy at least a first A requirement that the resultant force of virtual surface normal force components, which are components perpendicular to the virtual surface of the required virtual surface translational force in each of the plurality of virtual surfaces, coincides with components other than components parallel to all virtual surfaces of the virtual surface group of the required total translational external force and a first B requirement that the resultant force of virtual surface frictional force components, which are components parallel to the virtual surface of the required virtual surface translational force in each of the plurality of virtual surfaces, coincides with the components parallel to all virtual surfaces of the virtual surface group of the required total translational external force; and a desired motion evaluating unit which evaluates the desired motion at least on the basis of the calculated required virtual surface translational force (a first aspect of the invention).

In the present invention (including the second to the fifth aspects of the invention, which will be discussed later), the plurality of surfaces to be contacted, which exist in the operating environment of the robot and which are different from each other, means a plurality of surfaces to be contacted in which any two surfaces to be contacted included in the plurality of surfaces to be contacted (or planes individually including the two surfaces to be contacted) intersect with each other or oppose each other in parallel or substantially in parallel with an interval provided therebetween. In this case, each surface to be contacted does not have to be a surface having an area that is larger than a portion of the robot to be in contact therewith (e.g., an ordinary floor surface), and it may be, for example, a local surface having an area that is approximately as large as or smaller than the portion.

Further, in the desired motion, the number of portions of the robot brought into contact with each surface to be contacted does not have to be one and may be two or more. In this case, if two or more portions of the robot are brought into contact with a certain one surface to be contacted, then the desired external force to be applied to the robot from the surface to be contacted means the desired value of the resultant force of the external forces to be applied to the two or more portions of the robot from the surface to be contacted.

According to the first aspect of the invention, the virtual surface group formed of a plurality of virtual surfaces, the mutual posture relationship of which has been established beforehand, is used as a substitutional surfaces of the aforesaid plurality of surfaces to be contacted in order to evaluate the desired motion. Then, the virtual surface group is virtually set in the space of the operating environment of the robot by the virtual surface group determining unit such that the plurality of virtual surfaces of the virtual surface group become surfaces which match or approximate the plurality of surfaces to be contacted.

In the processing carried out by the virtual surface group setting unit, virtually setting the virtual surface group in the space of the operating environment of the robot means determining the arrangement of the individual virtual surfaces, which constitute the virtual surface group in the space, more specifically, determining the position and the posture (spatial orientation) of each virtual surface in the space.

Further, the required total translational external force determining unit determines the required total translational external force, which is a translational force component of a total external force to be applied to the robot in order to implement the desired motion (the desired motion to be evaluated).

Here, the required total translational external force is, in other words, a translational force which balances the resultant force of the translational inertial force (the translational force component of an inertial force) of the entire robot generated by the aforesaid desired motion and the gravitational force acting on the entire robot. In this case, the desired motion of the robot defines the motion of each portion, i.e., each link, of the robot and the movement of the overall center-of-gravity point of the robot, so that the translational inertial force of the entire robot is able to be determined on the basis of the desired motion by using an appropriate geometric model (a rigid link model) of the robot. Further, the gravitational force acting on the entire robot is the product of the total mass and the gravitational acceleration of the robot. Thus, the required total translational external force is able to be determined on the basis of the desired motion.

In the present invention, the aforesaid desired motion may be generated according to, for example, the type of motion required of the robot (e.g., the way the distal portion of a leg link of the robot is moved or the way a contact target surface is contacted).

Further, in the first aspect of the invention, the required virtual surface translational force calculating unit calculates a required virtual surface translational force, which is a translational force to be applied to the robot from each of the plurality of virtual surfaces of the virtual surface group to attain a required total translational external force, which is determined by the required total translational external force determining unit. Incidentally, each virtual surface corresponds to each surface to be contacted, so that the required virtual surface translational force in each virtual surface corresponds to the translational force to be applied to the robot from a surface to be contacted corresponding to the virtual surface.

Here, the required virtual surface translational forces in the individual virtual surfaces calculated by the required virtual surface translational force calculating unit mean, in other words, the translational forces, the resultant force of which coincides with the required total translational external force. Further, the required virtual surface translational force in each virtual surface is constituted of one or both of the virtual surface normal force component, which is a component perpendicular to the virtual surface, and a virtual surface frictional force component, which is a component parallel to the virtual surface.

In this case, according to the present invention, external forces are applied to the robot from the plurality of virtual surfaces of the virtual surface group when external forces are applied to the robot from the plurality of surfaces to be contacted. Generally, therefore, countless different combinations of required virtual surface translational forces in virtual surfaces are possible for implementing the required total translational external force.

However, when a frictional force component of a translational force that can be applied to the robot from a surface to be contacted corresponding to each virtual surface (a component parallel to the surface to be contacted) is excessive and approaches the upper limit of the frictional force that can be generated in the surface to be contacted, slippage between the surface to be contacted and the robot tends to frequently occur. Therefore, the desired motion is preferably generated so that the frictional force to be applied to the robot from each surface to be contacted can be minimized.

Therefore, it is considered preferable to calculate the required virtual surface translational force in the virtual surface corresponding to each surface to be contacted with a guideline that the required virtual surface translational force does not include the virtual surface frictional force component as much as possible or the magnitude of the virtual surface frictional force component is minimized. In other words, it is considered preferable to calculate the required virtual surface translational force with a guideline that the required total translational external force can be achieved by the resultant force of the virtual surface normal force components of the virtual surfaces as much as possible.

Therefore, in the first aspect of the invention, the required virtual surface translational force calculating unit calculates the required virtual surface translational force in each virtual surface so as to satisfy at least a first A requirement that the resultant force of virtual surface normal force components, which are components perpendicular to the virtual surface of the required virtual surface translational force in each of the plurality of virtual surfaces, coincides with components other than components parallel to all virtual surfaces of the virtual surface group of the required total translational external force and a first B requirement that the resultant force of virtual surface frictional force components, which are components parallel to the virtual surface of the required virtual surface translational force in each of the plurality of virtual surfaces, coincides with the components parallel to all virtual surfaces of the virtual surface group of the required total translational external force.

Thereby, the required virtual surface translational force calculating unit calculates the required virtual surface translational force in each virtual surface so as to attain the required total translational external force by the resultant force of virtual surface normal force components in each of the virtual surfaces as much as possible and to minimize the virtual surface frictional force components.

In one example, if the plurality of surfaces to be contacted are, for example, three surfaces to be contacted intersecting with each other, and furthermore if the three virtual surfaces corresponding to these surfaces to be contacted intersect with each other, each of the required virtual surface translational forces calculated by the required virtual surface translational force calculating unit is composed of only virtual surface normal force components and there is no virtual surface frictional force component in all of the virtual surfaces.

Further, in the first aspect of the invention, the desired motion evaluating unit evaluates the desired motion on the basis of the required virtual surface translational force calculated as described above. More specifically, the evaluation of the desired motion is carried out on the basis of the required virtual surface translational force in each virtual surface, which is calculated with a guideline that the required virtual surface translational force satisfies at least the first A requirement and the second A requirement. This enables an evaluation of whether the desired motion is capable of achieving a preferable requirement for operations of the robot such as minimizing the frictional force applied to the robot in each surface to be contacted.

Further, the required virtual surface translational force calculating unit performs processing with use of a plurality of virtual surfaces having a predetermined mutual posture relationship and processing of calculating the required virtual surface translational force in each virtual surface on the basis of the relatively simple guideline of satisfying at least the first A requirement and the first B requirement related to a translational motion of the entire robot of the desired motion of the robot.

Accordingly, the required virtual surface translational force calculating unit is able to perform the processing without requiring very complicated processes.

Therefore, according to the first aspect of the invention, in the case of generating a desired motion of the robot in a situation where the external forces act on the robot from the plurality of surfaces to be contacted, it is possible to efficiently and properly evaluate whether the generated desired motion is able to be dynamically and properly achieved.

In the first aspect of the invention, more specifically, for example, the following embodiment is preferably adopted. Preferably, the desired motion evaluating unit includes a first determining unit, which determines whether the calculated required virtual surface translational force satisfies a second requirement that the magnitude of the virtual surface frictional force component of the required virtual surface translational force in each virtual surface is not more than a first predetermined value set on the basis of at least the virtual surface normal force component in the virtual surface, and the desired motion evaluating unit evaluates the desired motion as inappropriate at least in the case where a determination result of the first determining unit is negative and the calculated required virtual surface translational force is not correctable so as to satisfy the first A requirement, the first B requirement, and the second requirement (a second aspect of the invention).

Here, in order to attain the desired motion (to attain the required total translational external force), there is sometimes a need to apply frictional forces to the robot from the surfaces to be contacted corresponding to the virtual surfaces. The magnitude of each of the frictional forces needs to be controlled to be not more than the upper limit value of the magnitude of a frictional force that can be generated on each surface to be contacted. Further, the upper limit value is influenced by the virtual surface normal force component in the surface to be contacted. As the magnitude of the normal force component decreases, the upper limit value decreases accordingly.

Therefore, in the second aspect of the invention, the first determining unit determines whether the calculated required virtual surface translational force satisfies the second requirement.

If the determination result of the first determining unit is negative and if the calculated required virtual surface translational force is not be able to be corrected so as to satisfy the first A requirement, the first B requirement, and the second requirement in the virtual surface in which the determination result is negative, the desired motion requires generating an excessive frictional force on the surface to be contacted corresponding to the virtual surface in which the determination result of the first determining unit is negative in order to carry out the correction properly, thereby causing slippage of the robot in the surface to be contacted.

Therefore, in the second aspect of the invention, the desired motion is evaluated as inappropriate at least in the case where the determination result of the first determining unit is negative and where the calculated required virtual surface translational force is not be able to be corrected so as to satisfy the first A requirement, the first B requirement, and the second requirement.

This enables the desired motion, which may cause slippage in any of the surfaces to be contacted, to be evaluated as an inappropriate motion. Further, the evaluation result can be used to improve the desired motion to an appropriate motion.

The first predetermined value in the second requirement corresponds to the upper limit value of the magnitude of a frictional force that can be generated on a virtual surface. The first predetermined value is preferably set to a value that coincides with or is slightly smaller than the upper limit value of the magnitude of the frictional force that can be generated in the surface to be contacted in the case where, for example, the normal force component in the surface to be contacted corresponding to each virtual surface is set to coincide with the virtual surface normal force component in the virtual surface.

In the second aspect of the invention, if the virtual surface group includes a virtual surface opposing the virtual surface, in which the determination result of the first determining unit is negative, with an interval provided therebetween, in other words, if the plurality of surfaces to be contacted include two surfaces to be contacted opposing to each other with an interval provided therebetween and the determination result of the first determining unit is negative in the virtual surface corresponding to one of the two surfaces to be contacted, the magnitudes of the virtual surface normal force components in opposite directions in two virtual surfaces opposing to each other are increased by the same amount, by which the magnitudes of the virtual surface normal force components in the virtual surfaces can be increased while satisfying the first A requirement. Then, this enables an increase in the upper limit value of the magnitudes of the virtual surface frictional force components in the virtual surfaces.

Meanwhile, if there is no virtual surface opposing the virtual surface in which the determination result of the first determining unit is negative, the magnitudes of the virtual surface normal force components in the virtual surface cannot be increased while satisfying the first A requirement. Consequently, it is impossible to correct the required virtual surface translational forces in the virtual surfaces in which the determination result of the first determining unit is negative so as to satisfy the second requirement while satisfying the first A requirement and the first B requirement.

Therefore, in the second aspect of the invention, preferably the desired motion evaluating unit includes a second determining unit, which, in the case where the determination result of the first determining unit is negative, determines whether the virtual surface in which the determination result is negative is a virtual surface belonging to opposing virtual surfaces, which are two virtual surfaces opposing to each other with an interval provided therebetween of the virtual surface group, and the desired motion evaluating unit determines that the desired motion is inappropriate in the case where the determination result of the first determining unit and the determination result of the second determining unit are both negative (a third aspect of the invention).

According to the third aspect of the invention, if the determination result of the first determining unit and the determination result of the second determining unit are both negative, it is impossible to correct the required virtual surface translational forces in the virtual surfaces in which the determination result of the first determining unit is negative so as to satisfy the second requirement while satisfying the first A requirement and the first B requirement as described above. In this case, the desired motion is determined to be inappropriate.

This enables the evaluation of the desired motion while properly determining whether the desired motion is capable of setting the required virtual surface translational force satisfying the first A requirement, the first B requirement, and the second requirement. This results in increasing the reliability of the evaluation of the desired motion.

In the third aspect of the invention, of the virtual surface normal force components in the two opposing virtual surfaces, if the virtual surface normal force component having a smaller magnitude is denoted as the first virtual surface normal force component and the virtual surface normal force component having a larger magnitude is denoted as the second virtual surface normal force component, then the first virtual surface normal force component and a component in the second virtual surface normal force component, which has the same magnitude as that of the first virtual surface normal force component, will function as internal forces that do not contribute to a motion of the robot. If the internal forces develop an excessive magnitude, then the share, which is required to generate the internal forces, in the motive power that can be generated by an actuator of the robot increases, frequently leading to deficiency of the motive power of the actuator that can be used for changing the motion of the robot.

Therefore, in the third aspect of the invention, preferably the desired motion evaluating unit includes a third determining unit, which, in the case where the determination result of the second determining unit is affirmative, determines whether it is possible to correct the virtual surface normal force component of the calculated required virtual surface translational force in each of the two opposing virtual surfaces including the virtual surface in which the determination result of the first determining unit is negative so as to satisfy a third requirement that the magnitude of the normal force component which is the smaller one of the virtual surface normal force components in the two opposing virtual surfaces be a preset second predetermined value or less, the first A requirement, and the second requirement, and the desired motion evaluating unit determines that the desired motion is inappropriate in the case where the determination result of the first determining unit, the determination result of the opposing virtual surface determining unit, and the determination result of the third determining unit are negative, affirmative, and negative, respectively (a fourth aspect of the invention).

According to the fourth aspect of the invention, the desired motion is determined to be inappropriate in the case where the determination result of the first determining unit, the determination result of the opposing virtual surface determining unit, and the determination result of the third determining unit are negative, affirmative, and negative, respectively. Therefore, the desired motion can be evaluated as inappropriate in the case where the magnitudes of the internal forces are forced to be excessive in order to set the required virtual surface translational force satisfying the first A requirement, the first B requirement, and the second requirement.

Further, the desired motion evaluation apparatus of a legged mobile robot according to the present invention may adopt the following embodiment in the case where the plurality of surfaces to be contacted include two surfaces to be contacted opposing to each other with an interval provided therebetween. Specifically, the present invention provides a desired motion evaluation apparatus of a legged mobile robot, which evaluates a desired motion of the robot for causing the robot to implement a motion while having a plurality of portions of the robot in contact with a plurality of different surfaces to be contacted, which exist in an operating environment of the legged mobile robot and include two surfaces to be contacted opposing to each other with an interval provided therebetween, the desired motion evaluation apparatus including:

a virtual surface group setting unit which uses a virtual surface group composed of a plurality of virtual surfaces having a predetermined mutual posture relationship in order to virtually set the virtual surface group in the space of an operating environment of the robot such that the plurality of virtual surfaces of the virtual surface group match or approximate the plurality of surfaces to be contacted;

a required total translational external force determining unit which determines, on the basis of the desired motion, a required total translational external force, which is a translational force component in a total external force to be applied to the robot to implement the desired motion;

a required virtual surface translational force calculating unit, which is a unit that calculates a required virtual surface translational force, which is a translational force to be applied to the robot from each of the plurality of virtual surfaces of the virtual surface group to attain the determined required total translational external force, and calculates the required virtual surface translational force in each virtual surface so as to satisfy at least a first A requirement that the resultant force of virtual surface normal force components, which are components perpendicular to the virtual surface of the required virtual surface translational force in each of the plurality of virtual surfaces, coincides with components other than components parallel to all virtual surfaces of the virtual surface group of the required total translational external force, a first B requirement that the resultant force of virtual surface frictional force components, which are components parallel to the virtual surface of the required virtual surface translational force in each of the plurality of virtual surfaces, coincides with the components parallel to all virtual surfaces of the virtual surface group of the required total translational external force, and a second requirement that the magnitude of the virtual surface frictional force component of the required virtual surface translational force in each virtual surface is not more than a first predetermined value set on the basis of at least the virtual surface normal force component in the virtual surface; and a desired motion evaluating unit which evaluates the desired motion at least on the basis of the calculated required virtual surface translational force, wherein:

the desired motion evaluating unit includes a fourth determining unit which determines whether the calculated required virtual surface translational force in each of the opposing virtual surfaces satisfies a third requirement that the magnitude of the normal force component which is the smaller one of the virtual surface normal force components in the two opposing virtual surfaces, which correspond to the two surfaces to be contacted opposing to each other with an interval provided therebetween of the virtual surface group, is a preset second predetermined value or less; and the desired motion evaluating unit evaluates the desired motion as inappropriate in the case where the determination result of the fourth determining unit is negative and the virtual surface normal force component of the calculated required virtual surface translational force in each of the opposing virtual surfaces is not correctable so as to satisfy the first A requirement and the third requirement (a fifth aspect of the invention).

In the fifth aspect of the invention, the processes of the virtual surface group setting unit and the required total translational external force determining unit are the same as those of the first aspect of the invention. In the fifth aspect of the invention, however, the plurality of surfaces to be contacted include two surfaces to be contacted opposing to each other with an interval provided therebetween, and therefore the virtual surface group also includes two opposing virtual surfaces, which oppose to each other with an interval provided therebetween, as the virtual surfaces corresponding to the two surfaces to be contacted.

Further, in the fifth aspect of the invention, the required virtual surface translational force calculating unit calculates the required virtual surface translational force in each virtual surface so as to satisfy the second requirement, in addition to the first A requirement and the first B requirement. Thereby, the required virtual surface translational force calculating unit calculates the required virtual surface translational force in each virtual surface so as to attain the required total translational external force by the resultant force of virtual surface normal force components in each of the virtual surfaces as much as possible and such that the magnitude of the virtual surface frictional force component satisfies the second requirement (such that the magnitude of the virtual surface frictional force component is not more than a first predetermined value).

In this case, in the fifth aspect of the invention, the virtual surface group includes two opposing virtual surfaces, and therefore if the required total translational external force includes a component parallel to all virtual surfaces, then the required virtual surface translational forces in the opposing virtual surfaces are calculated so as to generate the internal force between the two opposing virtual surfaces in order to satisfy the second requirement in some cases.

Therefore, in the fifth aspect of the invention, the desired motion evaluating unit performs the determination processing of the fourth determining unit, in other words, the same determination processing as that of the third determining unit in the fourth aspect of the invention. Then, the desired motion evaluating unit evaluates the desired motion as inappropriate, in the case where the determination result of the fourth determining unit is negative and where the virtual surface normal force components of the calculated required virtual surface translational forces in the opposing virtual surfaces cannot be corrected so as to satisfy the first A requirement and the third requirement.

Thereby, according to the fifth aspect of the invention, as with the fourth aspect of the invention, the desired motion is able to be evaluated as an inappropriate motion in the case where the magnitudes of the internal forces are forced to be excessive in order to set the required virtual surface translational force satisfying the first A requirement, the first B requirement, and the second requirement.

Supplementarily, in the first to fifth aspects of the invention described hereinabove, in the processing of the required virtual surface translational force calculating unit, the required virtual surface translational force in each virtual surface may be calculated so as to achieve a rotational motion of the desired motion (a rotational motion changing the angular momentum about a certain reference point) while satisfying the first A requirement and the first B requirement. For example, the desired motion evaluation apparatus may include a unit which determines a required total moment external force, which is a moment component about a predetermined reference point fixed relative to the virtual surface group in the total external force to be applied to the robot in order to achieve the desired motion on the basis of the desired motion.

Further, in the case where the required virtual surface translational force in each virtual surface calculated in the processing of the required virtual surface translational force calculating unit is applied to an external force action point, which is set on each virtual surface as a point on the virtual surface corresponding to the action point of the external force to the robot from each surface to be contacted, consideration may be made by adding a rotational motion condition that the total moment generated about the predetermined reference point coincides with the required total moment external force, such that the required virtual surface translational force in each virtual surface may be calculated so as to satisfy the first A requirement, the first B requirement, and the rotational motion condition.

BRIEF DESCRIPTION OF THE DRAWINGS

FIGS. 3(a) to 3(c) are diagrams illustrating in a time series manner the instantaneous motional states of the robot in a wall climbing gait given as an example of a desired gait of the robot shown in FIG. 1;

FIG. 5(a) to FIG. 5(c) are graphs illustrating examples of the time-dependent changes in a set position of an external force action point in the wall climbing gait;

FIG. 6 is a graph illustrating an example of the time-dependent changes in the area of an existence permissible range of an external force action point in the wall climbing gait;

FIG. 11(a) is a diagram illustrating an example of a required virtual surface translational force (a virtual surface normal force component and a virtual surface frictional force component) determined by the processing in S05 of FIG. 7, and FIG. 11(b) is a diagram illustrating an example of a required virtual surface translational force (a virtual surface normal force component and a virtual surface frictional force component) determined by the processing up to S13 of FIG. 7;

FIGS. 19(a) to 19(e) are diagrams illustrating in a time series manner the instantaneous motional states of the robot in another example of a desired gait of the robot shown in FIG. 1.

DESCRIPTION OF THE PREFERRED EMBODIMENTS

First Embodiment

A first embodiment of the present invention will be described below with reference to FIG. 1 to FIG. 13.

Figure 1:
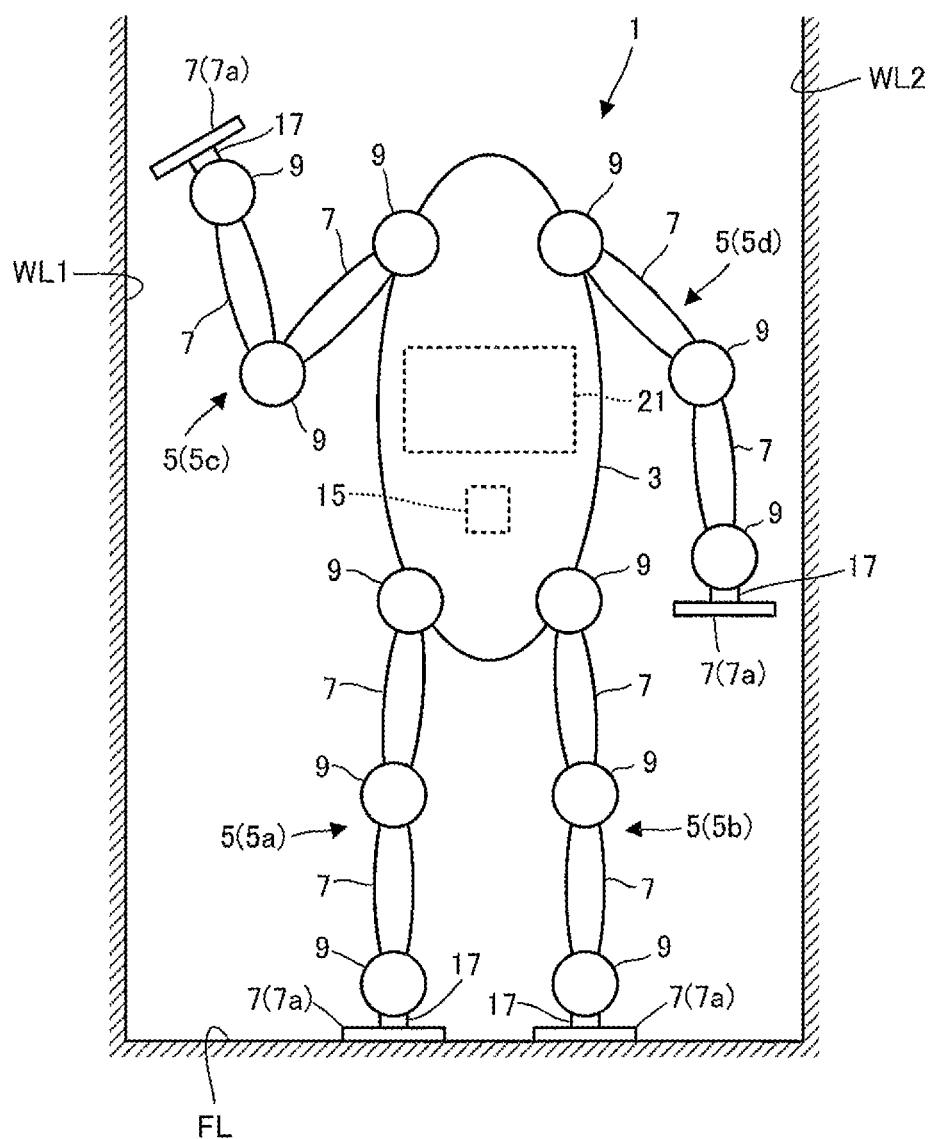
FIG. 1 is a diagram illustrating the mechanical external force configuration of a legged mobile robot in an embodiment of the present invention.

Referring first to FIG. 1, the mechanical schematic construction of a legged mobile robot 1 in the present embodiment (hereinafter referred to simply as the robot 1) will be described.

This robot 1 has a body 3 and a plurality of link mechanisms 5 extended from the body 3. Each of the link mechanisms 5 is a mechanism capable of functioning as a leg of the robot 1. The quantity of the link mechanisms 5 is four in the present embodiment.

In the description of the present embodiment, the fact that the link mechanisms 5 are capable of functioning as the legs of the robot 1 means that the link mechanisms 5 are capable of receiving from a surface to be contacted an external force supporting all or a part of the self weight of the robot 1 (more accurately, the resultant force of the gravitational force acting on the robot 1 and the inertial force generated by a motion of the robot 1) when the distal portions of the link mechanisms 5 are brought in contact with the surface to be contacted, such as a floor or a wall, in an outside world (operating environment) of the robot 1.

Each of the link mechanisms 5 is constructed of a plurality of element links 7 and a plurality of joints 9, which connect these element links 7 in order from the side of the body 3. In this case, if the element link 7 constituting the distal end of each of the link mechanisms 5 (hereinafter referred to as a distal link 7a or simply as the distal end of the link mechanism 5) is the portion to be brought in contact with a surface to be contacted, such as a floor or a wall, in an outside world of the robot 1 when the link mechanism 5 functions as a leg. Each of the distal links 7a is shaped like a plate, and the front surface, which is the surface to be in contact with an outside world, is coated with an elastic resin material, such as a rubber material (not shown).

Each of the joints 9 of each of the link mechanisms 5 is, for example, a rotary joint having a publicly known construction. Each of the joints 9 has one or a plurality of degrees of freedom. In this case, the degree of freedom of each joint 9 of each of the link mechanisms 5 is set such that the total degree of freedom of all the joints 9 included in each of the link mechanisms 5 is six or more. Hence, each of the spatial position and posture (spatial orientation) of each of the distal links 7a relative to the body 3 has three degrees of freedom. Each of the link mechanisms 5 may include a linear-motion joint in addition to a rotary joint.

Although not shown in FIG. 1, the robot 1 is provided with a plurality of joint actuators 11 (shown in FIG. 2), such as electric motors, which drive the joints 9. Further, a driving force is transmitted from the joint actuator 11 corresponding to each of the joints 9 of the link mechanisms 5 through a motive power transmitting mechanism, including a speed reducer (not shown).

The above has described the mechanical schematic construction of the robot 1 in the present embodiment.

Supplementarily, regarding the robot 1 illustrated in FIG. 1, the construction of each of the link mechanisms 5, including the size and quantity of the element links 7 of each link mechanism 5, the quantity of the joints 9, and the total degree of freedom, has been described that every one of the link mechanisms 5 shares the same construction. However, the constructions of the link mechanisms 5 do not need to be the same.

Further, referring to FIG. 1, the robot 1 has been described as a two-legged mobile robot (a robot similar to a humanoid robot) which travels on a level ground by using two link mechanisms 5a and 5b as legs. Alternatively, however, the robot 1 may be, for example, a robot which travels on a level ground by using all the link mechanisms 5 (e.g., a 4-legged robot).

Further, the quantity of the link mechanisms 5 does not have to be four, and may be, for example, three or five or more.

Figure 2:
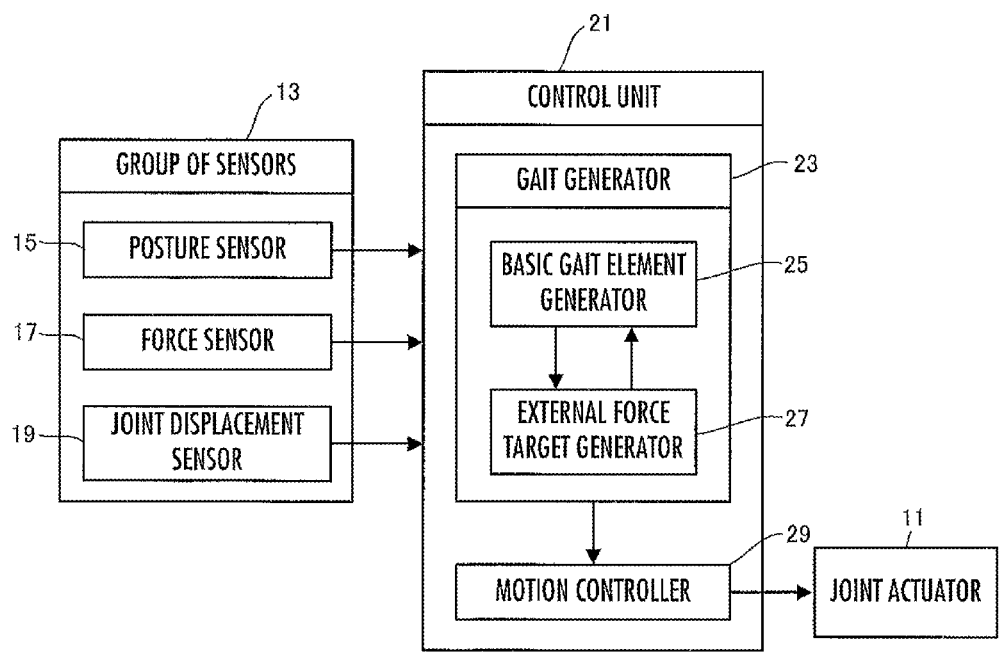
FIG. 2 is a block diagram illustrating the functions of a control unit and a group of sensors provided in the robot shown in FIG. 1.

Referring now to FIG. 2, the robot 1 constructed as described above is provided with a group of sensors 13 used for controlling the motion of the robot 1 and a control unit 21 constructed of an electronic circuit unit, which primarily includes a CPU, a RAM, a ROM, and a drive circuit of the joint actuator 11.

The group of sensors 13 in the present embodiment has a posture sensor 15 for measuring the spatial posture of the body 3 as a representative link (representative portion) of the robot 1, force sensors 17 for measuring external forces acting on the distal ends of the link mechanisms 5, and joint displacement sensors 19 for measuring the displacement amounts of the joints 9 (the rotational angles in the present embodiment).

In this case, the posture sensor 15 composed of, for example, an angular velocity sensor (rate sensor), such as a gyro-sensor, and an acceleration sensor is mounted on the body 3, as illustrated in FIG. 1. Each of the force sensors 17 composed of a 6-axis force sensor capable of detecting, for example, translational forces in the directions of three axes, and moments about three axes, is interposed between the joint 9 located at the most distal end of each of the link mechanisms 5 and the distal link 7a, as illustrated in FIG. 1. Further, each of the joint displacement sensors 19 is formed of, for example, an encoder or a potentiometer, installed in each of the joints 9.

The control unit 21 is installed in a proper portion of the robot 1, such as the body 3. The control unit 21 has a gait generator 23, which generates (or create) and outputs a desired gait indicating a desired motion of the robot 1 and a motion controller 29 which controls the motion of the robot 1 according to the desired gait, as major features thereof implemented by an installed program or the like. The gait generator 23 includes a feature as a desired motion evaluation apparatus in the present invention.

The desired gait generated and output by the gait generator 23 is composed of a desired motion of the robot 1 and a target related to an external force applied to the robot 1 from an outside world. The processing by the gait generator 23 will be further discussed later in detail.

In this case, the desired motion of the constituent elements of the desired gait is formed of the time-series of a desired displacement amount of each of the joints 9 and the time-series of the desired position and the desired posture in a global coordinate system of a representative link (the body 3 in the present embodiment) of the robot 1. To be more accurate, the desired position of the representative link (the body 3) is the desired position of a representative point set in the representative link. The global coordinate system is fixed relative to the outside world of the robot 1.

When the distal links 7a of one or more link mechanisms 5 are brought into contact with a surface to be contacted in an outside world, the target related to an external force of the constituent elements of a desired gait is composed of the time-series of the desired value of an external force (a desired external force) to be applied to the robot 1 from the surface to be contacted and the time-series of the desired external force action points serving as the desired positions of the action points of the external force. In this case, the desired external force in the present embodiment is composed of a desired value of a translational external force (a desired translational force), which is a translational force component in the external force, and a desired value of a twisting force, i.e., a moment external force (a desired twisting force) in the external force, about the axis in the direction perpendicular to the surface to be contacted in the external force.

The action point of the external force to be applied to the robot 1 from a surface to be contacted means a point at which a component of a moment about an axis parallel to the surface to be contacted is zero, the moment being generated about the action point by entire external force acting on the robot from the surface to be contacted. If the robot 1 simply travels on a floor, then the action point is a point corresponding to the so-called floor reaction force central point. This is the same as for the external force action point on a virtual surface described later.

Supplementarily, the aforesaid time-series related to a desired gait may be of course the sequence of itself of instantaneous values within a certain period of time, or may be a parameter, such as a function expression, defining the pattern of the time-series.

Further, if the total degree of freedom of one of the link mechanisms 5 of the robot 1 is six degrees, then specifying the position and the posture of the distal link 7a of the link mechanism 5 in relation to the body 3 will uniquely determine the displacement amount of the joint 9 of the link mechanism 5. Hence, in the link mechanism 5 having the six degrees of freedom, the desired position and the desired posture of the distal link 7a of the link mechanism 5 may be used as a constituent element of the desired motion in place of the desired displacement amount of the joint 9 of the link mechanism 5.

Further, as necessary, the desired values of a predetermined motional state amount of the robot 1, such as the desired values of the position, the velocity and the acceleration of an overall center-of-gravity point of the robot 1 or the desired values of the position and the posture of a particular portion of the robot 1 other than the body 3 may be included in the constituent elements of a desired motion generated by the gait generator 23.

The motion controller 29 controls the joints 9 of the robot 1 through the intermediary of the joint actuators 11 corresponding thereto such that the actual motion of the robot 1 follows the desired gait generated by the gait generator 23. In this case, according to the present embodiment, based on the difference between the actual position of the overall center-of-gravity point of the robot 1 recognized by an output of the posture sensor 15 and an output of the joint displacement sensor 19 and the desired position of the overall center-of-gravity point of the robot 1 defined by the desired motion, an external force to be additionally applied to the robot 1 in order to bring the difference close to zero is determined.

Further, the driving force to be imparted to each of the joints 9 is determined such that the actual external force (the external force recognized from an output of the force sensor 17) and the actual motion of the robot 1 follow the external force, which is obtained by adding the above additional external force to the desired value of an external force in the desired gait, and the desired motion, respectively. Then, the driving force of each of the joint actuators 11 is controlled on the basis of the determined driving force.

The processing for generating a desired gait by the gait generator 23 will now be described in detail. In the following description, to distinguish the four link mechanisms 5, reference numerals 5a, 5b, 5c and 5d will be used, as illustrated in FIG. 1.

The gait generator 23 is able to generate a gait that causes the robot 1 to implement motions in a variety of operating environments.

However, the processing for generating a desired gait in the present embodiment is characterized especially by a feature for generating a desired gait for causing the robot 1 to implement a motion while having a plurality of portions of the robot 1 in contact with a plurality of mutually different surfaces to be contacted in an outside world (an operating environment) of the robot 1.

Hence, in the following description, for the convenience of understanding the present embodiment, a desired gait, which is an example for causing the robot 1 to carry out a motion while keeping the distal links 7a of the plurality of link mechanisms 5 of the robot 1 in contact with a plurality of surfaces to be contacted, will be presented as a reference. Further, the processing by the gait generator 23 will be described by explaining the processing for generating the example desired gait, as appropriate.

As illustrated in FIG. 1, the operating environment of the robot 1 related to the desired gait to be referentially illustrated in the following description of the present embodiment has, for example, a floor surface FL, two wall surfaces WL1 and WL2 standing substantially vertically from the floor surface FL, as the mutually different surfaces to be contacted in the outside world of the robot 1. In this case, the two wall surfaces WL1 and WL2 are surfaces to be contacted opposing in parallel or substantially in parallel to each other with an interval provided therebetween.

Further, the desired gait to be referentially illustrated in the description of the present embodiment is a desired gait for causing the robot 1 to climb the two wall surfaces WL1 and WL2 from the floor surface FL between the wall surfaces. Hereinafter, the desired gait may be referred to as the wall climbing gait in some cases.

The motion mode of the robot 1 in the wall climbing gait will be described below with reference to FIGS. 3(a), 3(b), and 3(c) and FIGS. 4(a) and 4(b). The instantaneous motional states of the robot 1 in the wall climbing gait (the motional states from time t1 to time t5) are illustrated in a time-series order in FIGS. 3(a), 3(b), and 3(c) and FIGS. 4(a) and 4(b).

In these figures, for the sake of convenience, the element links 7 of the link mechanisms 5 and the joints 9 of the robot 1 are not shown, and the link mechanisms 5 are shown as line segments connecting the proximal ends thereof (the ends thereof adjacent to the body 3) and the distal ends thereof. In this case, in the figures, the distal ends of the link mechanisms 5 are shown in the form of dots, while they are actually the aforesaid plate-shaped distal links 7a.

Arrows F1 to F10 in the figures visually denote examples of external forces (translational external forces) acting on the robot 1 from the surface to be contacted FL or WL1 or WL2 in the motional states of the robot 1 illustrated in the figures. In this case, the start points of the translational external forces F1 to F10 correspond to the action points (external force action points) of the translational external forces applied to the robot 1 from the surface to be contacted FL or WL1 or WL2.

Further, in the figures, circled areas AR1 to AR12 indicated on the surface to be contacted FL or WL1 or WL2 visually denote approximate areas in which the action points of external forces applied from the surface to be contacted FL or WL1 or WL2 to the robot 1 may exist in the motional states of the robot 1 illustrated in the figures. In a surface to be contacted with which only the distal end of a single one of the link mechanisms 5 is in contact, the area in which external force action points may exist is an area in the surface of contact between the distal link 7a of the single link mechanism 5 and the surface to be contacted. Further, the area in which the external force action points may exist in the surface to be contacted with which the distal ends of the plurality of link mechanisms 5 are in contact is an area composed of combined areas in the contact surfaces between each of the distal links 7a of the plurality of link mechanisms 5 and the surface to be contacted (i.e., an area corresponding to a supporting polygon).

The following will describe the wall climbing gait with reference to the figures. FIG. 3(a) illustrates the initial state of the wall climbing gait. In the initial state, the robot 1 stands on the floor surface FL between the wall surfaces WL1 and WL2 with the distal ends of the two link mechanisms 5a and 5b of the robot 1 in contact with the floor surface FL (the ground). To begin the motion of the wall climbing gait of the robot 1, the robot 1 moves the distal end of a link mechanism 5c adjacent to the wall surface WL1 out of the remaining link mechanisms 5c and 5d into contact with the wall surface WL1 and also the distal end of the link mechanism 5d adjacent to the wall surface WL2 into contact with the wall surface WL2.

In this case, in the initial state illustrated in FIG. 3(a), as the external force for supporting the self weight of the robot 1 (more accurately, the resultant force of the gravitational force acting on the robot 1 and the inertial force generated by a motion of the robot 1), an external force indicated by, for example, the arrow F1 acts on the robot 1 from the area AR1 of the floor surface FL. In the illustrated example, the external force acting from the wall surfaces WL1 and WL2 onto the robot 1 is zero.

Subsequently, the motional state of the robot 1 shifts to the state illustrated in FIG. 3(b). The motional state shown in FIG. 3(b) indicates the shift from the initial state shown in FIG. 3(a) effected by lifting the distal end of one of the link mechanisms 5a and 5b (the link mechanism 5a in the illustrated example) from the floor surface FL while pushing the distal ends of the link mechanisms 5c and 5d in contact with the wall surfaces WL1 and WL2, respectively, in the initial state shown in FIG. 3(a) against the wall surfaces WL1 and WL2, respectively.

In this case, in the motional state shown in FIG. 3(b), as the external forces for supporting the self weight of the robot 1, the external force indicated by, for example, the arrow F2 acts from the area AR4 of the floor surface FL onto the robot 1 and also the external forces indicated by the arrows F3 and F4 (the external forces having upward frictional force components) act onto the robot 1 from the area AR5 of the wall surface WL1 and the area AR6 of the wall surface WL2.

Subsequently, the motional state of the robot 1 shifts to the state illustrated in FIG. 3(c). The motional state shown in FIG. 3(c) indicates the shift from the motional state shown in FIG. 3(b) effected by increasing the pressing force of the distal ends of the link mechanisms 5c and 5d pushed against the wall surfaces WL1 and WL2 in the motional state shown in FIG. 3(b) and also lifting the link mechanism 5b, which has been in contact with the floor surface FL in the motional state shown in FIG. 3(b), off the floor surface FL (i.e., lifting both the link mechanisms 5a and 5b off the floor surface FL).

In this case, in the motional state shown in FIG. 3(c), as the external forces for supporting the self weight of the robot 1, the external forces indicated by, for example, the arrows F5 and F6 (external forces having upward frictional force components) act from the area AR7 of the wall surface WL1 and the area AR8 of the wall surface WL2 onto the robot 1.

Subsequently, the motional state of the robot 1 shifts to the state illustrated in FIG. 4(a). The motional state in FIG. 4(a) illustrates the shift from the motional state in FIG. 3(c) effected by bringing the distal end of the link mechanism 5a out of the link mechanisms 5a and 5b, which have been lifted off the floor surface FL by the shift to the motional state in FIG. 3(c), into contact with the wall surface WL1 at below the distal end of the link mechanism 5c and also bringing the distal end of the link mechanism 5b into contact with the wall surface WL2 at below the distal end of the link mechanism 5d.

Figure 4B:
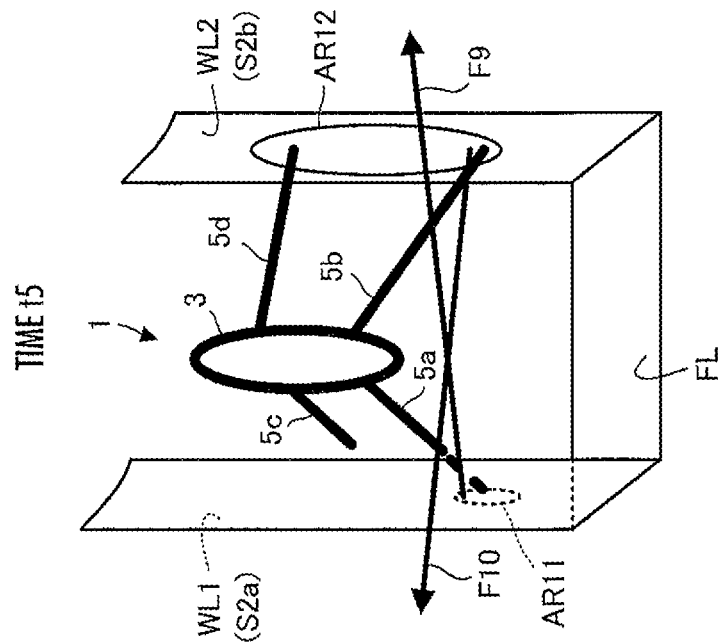
FIGS. 4(a) and 4(b) are diagrams illustrating in a time series manner the instantaneous motional states of the robot after the motional states shown in FIGS. 3(a) to 3(c)
Figure 4A:
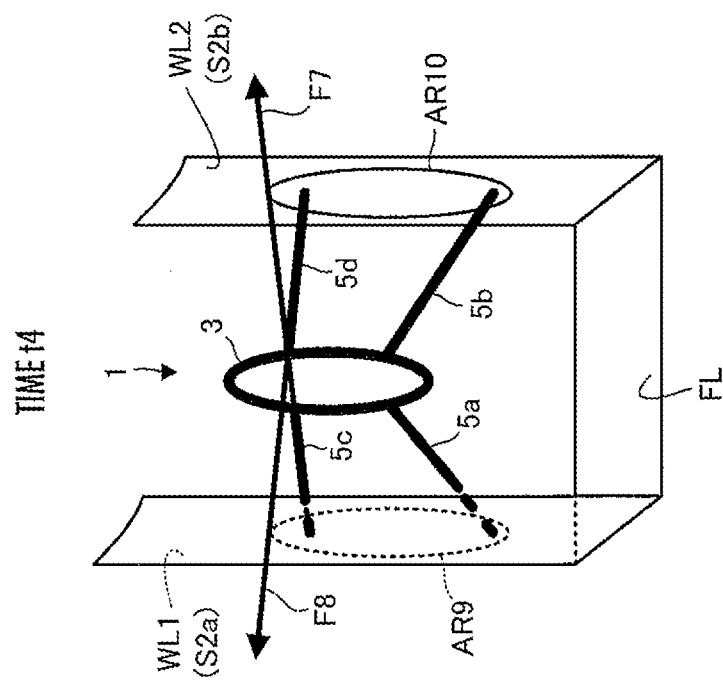

In this case, the motional state in FIG. 4(a) illustrates a state immediately after the link mechanisms 5a and 5b are brought into contact with the wall surfaces WL1 and WL2, respectively. In this state, for example, an external force indicated by the arrow F7 (an external force having an upward frictional force component) acts on the robot 1, using a point adjacent to the distal end of the link mechanism 5c as the external force action point in the area AR9 of the wall surface WL1, and an external force indicated by the arrow F8 (an external force having an upward frictional force component) acts on the robot 1, using a point adjacent to the distal end of the link mechanism 5d as the external force action point in the area AR10 of the wall surface WL2.

Then, while maintaining the motional state of the robot 1 illustrated in FIG. 4(a) wherein the link mechanisms 5a and 5c are in contact with the wall surface WL1 and the link mechanisms 5b and 5d in contact with the wall surface WL2, the pressing forces of the link mechanisms 5a and 5b on the lower side applied to the wall surfaces WL1 and WL2, respectively, are gradually increased, whereas the pressing forces of the link mechanisms 5c and 5d on the upper side applied to the wall surfaces WL1 and WL2, respectively, are gradually decreased.

Thus, the point of action of the external force applied from the wall surface WL1 to the robot 1 is moved closer toward the distal end of the link mechanism 5a in the area AR9, while the point of action of the external force applied from the wall surface WL2 to the robot 1 is moved toward the distal end of the link mechanism 5b in the area AR10. Eventually, the point of action of the external force applied from the wall surface WL1 to the robot 1 is moved into a contact surface between the distal end of the link mechanism 5a and the wall surface WL1, while the point of action of the external force applied from the wall surface WL2 to the robot 1 is moved into a contact surface between the distal end of the link mechanism 5b and the wall surface WL2.

Subsequently, the motional state of the robot 1 shifts to the state illustrated in FIG. 4(b). The motional state in FIG. 4(b) illustrates the shift from the motional state in FIG. 4(a) effected by detaching one of the distal ends of the link mechanisms 5c and 5d (the distal end of the link mechanism 5c in the illustrated example) from the wall surface WL1 while maintaining the state in which the link mechanisms 5a and 5b are pressed against the wall surfaces WL1 and WL2 after moving the action points of the external forces applied to the robot 1 from the wall surfaces WL1 and WL2 as described above in the motional state of FIG. 4(a).

In this case, in the motional state illustrated in FIG. 4(b), as the external forces for supporting the self weight of the robot 1, the external force indicated by the arrow F9 (an external force having an upward frictional force component) acts on the robot 1 from the area AR11 of the wall surface WL1 and the external force indicated by the arrow F10 (an external force having an upward frictional force component) acts on the robot 1 from the area AR12 of the wall surface WL2.

After that, the distal end of the link mechanism 5d is also detached from the wall surface WL2. Then, the distal ends of the link mechanisms 5c and 5d which have been detached from the wall surfaces WL1 and WL2 are brought back into contact with the wall surfaces WL1 and WL2 at higher levels than those in the motional state illustrated in FIG. 4(a). Thereafter, the series of the same motions from the motional state illustrated in FIG. 3(b) is repeated, thereby causing the robot 1 to climb the wall surfaces WL1 and WL2.

The above is the outline of the wall climbing gait.

As illustrated by the block diagram of FIG. 2, the processing carried out by the gait generator 23, which generates desired gaits, such as the wall climbing gaits described above, is roughly divided into the processing by a basic gait element generator 25 and the processing by an external force target generator 27.

The basic gait element generator 25 is a functional section which carries out the processing for generating a desired motion of the robot 1 and a provisional external force action point, which is a provisional desired external force action point, as basic constituent elements of a desired gait. The basic gait element generator 25 also carries out the processing for setting the existence permissible region of a desired external force action point to determine a provisional external force action point.

Further, the external force target generator 27 is a functional section which uses a desired motion and a provisional external force action point generated by the basic gait element generator 25 to carry out the processing for determining a desired value of an external force which is appropriate for achieving the desired motion (a desired external force) and a desired external force action point.

In this case, according to the present embodiment, the external force target generator 27 has a function for evaluating a desired motion generated by the basic gait element generator 25. Next, if the generated desired motion is appropriate, then the external force target generator 27 carries out the processing for determining desired external forces and desired external force action points throughout the entire period of the desired gait. If the result of the evaluation indicates that the desired motion is inappropriate, then the external force target generator 27 interrupts the processing for determining the desired external forces and the desired external force action points.

When the gait generator 23 generates a desired gait, the gait generator 23 receives travel command data stored and retained beforehand in the control unit 21 or travel command data input to the control unit 21 from an external source through radio communication, and environmental information related to a surface to be contacted and the like existing in the outside world of the robot 1.

The travel command data mainly includes data that specifies, for example, the travel start time, the travel route, how to travel and the like of the robot 1. The environmental information is composed of, for example, the information necessary for recognizing the relative position and the relative posture of a surface to be contacted (e.g., the floor surface FL, the wall surface WL1 or WL2) in the outside world of the robot 1 with respect to the robot 1 and the information necessary for recognizing the properties (e.g., a frictional coefficient) of each surface to be contacted.

The environmental information may be the one input to the control unit 21 through radio communication from an outer source or the one stored and retained beforehand in the control unit 21, or may be information recognized by the control unit 21 on the basis of an output of a sensor for recognizing an environment, such as an imaging camera (not shown) mounted on the robot 1.

Then, the gait generator 23 first carries out the processing by the basic gait element generator 25 by using the travel command data and the environmental information. Based on the input travel command data and environmental information, the basic gait element generator 25 sets conditions that restrict the motion of the robot 1 (a condition to be satisfied by a desired motion of the robot 1) and generates a desired motion of the robot 1 by arithmetic processing of inverse kinematics such that the conditions are satisfied.

In this case, basically, the conditions that restrict the motion of the robot 1 are set as appropriate according to a required type of motion of the robot 1. The restricting conditions may include, for example, a condition that restricts the motion of the distal end of each of the link mechanisms 5 (e.g., the desired time at which the distal link 7a of each of the link mechanisms 5 is brought into contact with a surface to be contacted in the outside world, the desired contact position on the surface to be contacted at the time of the contact, the desired posture of the distal link 7a at the time of the contact, and the desired position and posture of the distal link 7a that is not in contact with a surface to be contacted in the outside world at certain time or period of time) and a condition that restricts the motion of the body 2 (e.g., the desired position and posture of the body 2 at certain time or in a period of time).

In place of or in addition to the conditions that restrict the motion of the body 2, a condition that restricts a predetermined state amount related to the motion of the robot 1 (e.g., the translational momentum of the entire robot 1 or a desired angular momentum) may be used. Further, the restricting conditions generally include a mechanical restricting condition, such as the movable range of the joints 9 of the robot 1 or the permissible range of the moving velocity (the changing velocity of the displacement amount of the joint 9).

When generating the wall climbing gait, the basic gait element generator 25 determines a condition that restricts the motion of the robot 1 (e.g., a restricting condition that includes a condition that restricts the motion of the distal end of each of the link mechanisms 5 and a condition that restricts the motion of the body 3) such that a motion is performed to cause the distal end of each of the link mechanisms 5 of the robot 1 to come in contact with one of the surfaces to be contacted FL, WL1, and WL2 in a time-series manner described with reference to FIG. 3 and FIG. 4. Then, the basic gait element generator 25 generates the time-series of a desired motion of the robot 1 by the arithmetic processing of inverse kinematics such that the restricting condition is satisfied. The desired motion is generated not to discontinuously change (in steps).

Further, the basic gait element generator 25 determines the time-series of the provisional external force action points in each surface to be contacted (a surface with which the distal link or links 7a of one or a plurality of link mechanisms 5 are in contact) on the basis of the desired motion determined as described above.

In this case, the basic gait element generator 25 first sets the existence permissible region of an external force action point in each surface to be contacted on the basis of the desired motion generated as described above. More specifically, the basic gait element generator 25 sets the existence permissible region of an external force action point in a contact surface between the surface to be contacted and the distal link 7a in a surface to be contacted with which only the distal link 7a of one of the link mechanisms 5 is to be brought into contact in the desired motion generated as described above. In the contact surface between the surface to be contacted and the distal link 7a, the existence permissible region is set to an area which is not excessively close to the boundary of the contact surface.

Further, in the surface to be contacted with which the distal links 7a of two or more link mechanisms 5 are to be brought into contact, the basic gait element generator 25 sets the existence permissible region of the external force action point in an area formed by connecting each contact surface between the surface to be contacted and each of the distal links 7a (a so-called supporting polygon area). The existence permissible region is set in the supporting polygon area such that the area is not excessively close to the boundary of the supporting polygon area.

Subsequently, the basic gait element generator 25 determines the point in the existence permissible region of the external force action point set as described above (e.g., the central point in the existence permissible region) as the provisional external force action point. The provisional external force action point on each surface to be contacted is determined such that the position of the action point will not discontinuously change (in steps) in a period of time during which the state, wherein any one of the link mechanisms 5 is in contact with the surface to be contacted, continuously continues.

When the gait generator 23 generates the wall climbing gait illustrated in FIG. 3 and FIG. 4, the provisional external force action point is generated in the time-series patterns illustrated in, for example, FIGS. 5(a), 5(b) and 5(c), respectively. Time t1 to t5 on the axes of abscissas in FIGS. 5(a) to 5(c) indicate the time corresponding to the motional states shown in FIG. 3(a), FIG. 3(b), FIG. 3(c), FIG. 4(a) and FIG. 4(b), respectively, in this order.

In the examples illustrated in FIGS. 5(a) to 5(c), the position of the provisional external force action point on the floor surface FL (the position in a direction perpendicular to the wall surfaces WL1 and WL2) is determined such that the provisional external force action point continuously moves from the wall surface WL1 to the wall surface WL2 by immediately before time t2 from time t1, as illustrated in FIG. 5(a).

Further, the position of the provisional external force action point (the position in the direction of height) on the wall surface WL1 is determined such that the position of the provisional external force action point is maintained at a fixed position (a position within the contact surface between the wall surface WL1 and the distal end of the link mechanism 5c) until the midway time between time t3 and time t4, then continuously moves downward from the midway time to immediately before time t4, as illustrated in FIG. 5(b).

Subsequently, the position of the provisional external force action point on the wall surface WL1 is determined such that the position is maintained at a fixed position (an intermediate position between the surface of contact of the distal end of the link mechanism 5c with the wall surface WL1 and the surface of contact of the distal end of the link mechanism 5a with the wall surface WL 1) until the midway time between time t4 and time t5, then continuously moves downward until the time immediately before time t5, and maintained again at a fixed position (a position in the contact surface between the wall surface WL1 and the distal end of the link mechanism 5a) during a period before and after time t5.

Further, the position of the provisional external force action point on the wall surface WL2 (the position in the direction of height) is determined such that the position is maintained at a fixed position (a position in the contact surface between the wall surface WL2 and the distal end of the link mechanism 5*d*) until the midway time between time t3 and time t4, then continuously moves downward from the midway time until the time immediately before time t4, and thereafter maintained again at a fixed position (an intermediate position between the surface of contact of the distal end of the link mechanism 5*d* with the wall surface WL2 and the surface of contact of the distal end of the link mechanism 5*b* with the wall surface WL2) during a period until the time immediately after time t5, as illustrated in FIG. 5(*c*).

In this case, the area of the existence permissible region of the external force action point in each of the floor surface FL, the wall surface WL1, and the wall surface WL2 is set such that the area continuously changes in the pattern illustrated in, for example, FIG. 6.

Supplementarily, a desired motion generated by the basic gait element generator 25 basically need simply to formally (at least kinematically) meet a requirement related to a motion to be implemented by the robot 1. In other words, the dynamic feasibility of the desired motion may not be accurately ensured. Hence, there may be a case where it is actually difficult to apply an external force, which should be applied to the robot 1 in order to implement the desired motion, to the robot 1 or a case where the external force deviates from a suitable range (e.g., a case where the external force is excessively large).

Then, the gait generator 23 carries out the processing by the external force target generator 27. The external force target generator 27 receives a desired motion generated by the basic gait element generator 25 and the existence permissible regions of a provisional external force action point and an external force action point. The external force target generator 27 also receives the environmental information mentioned above.

Figure 7:
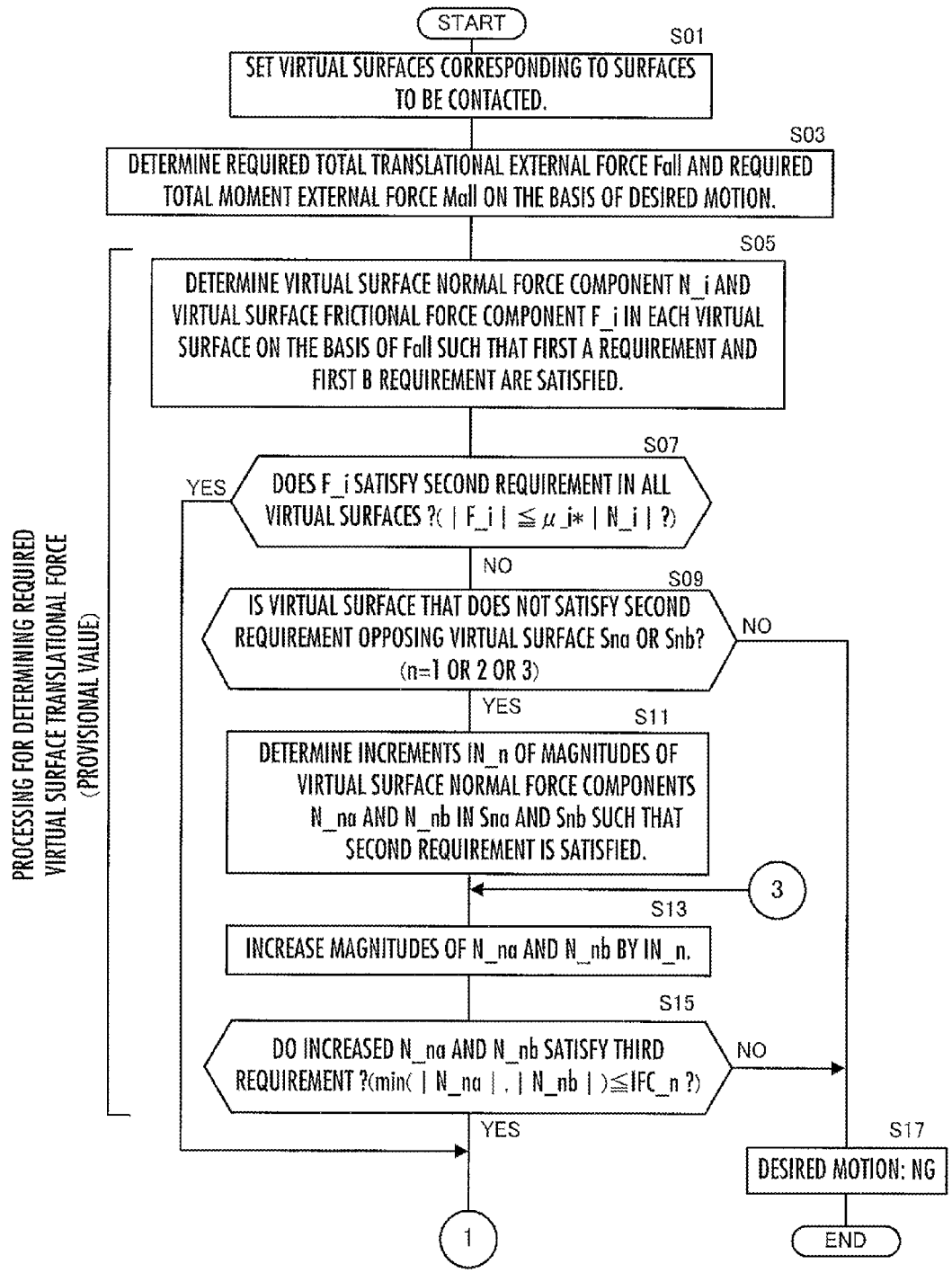
FIG. 7 is a flowchart illustrating the processing carried out by an external force target generator shown in FIG. 2 in a first embodiment.
Figure 8:
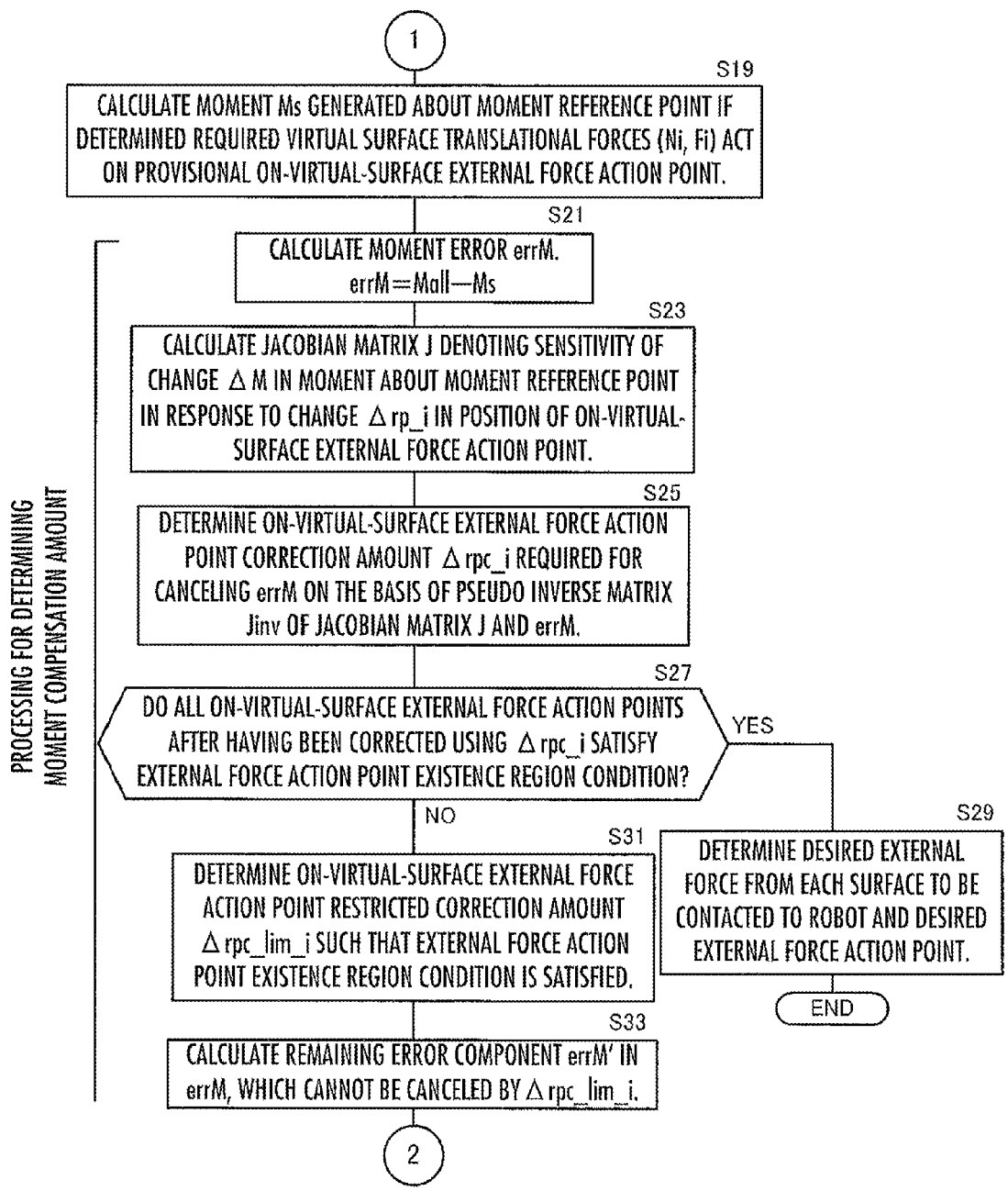
FIG. 8 is a flowchart illustrating the processing carried out by an external force target generator shown in FIG. 2 in a first embodiment.
Figure 9:
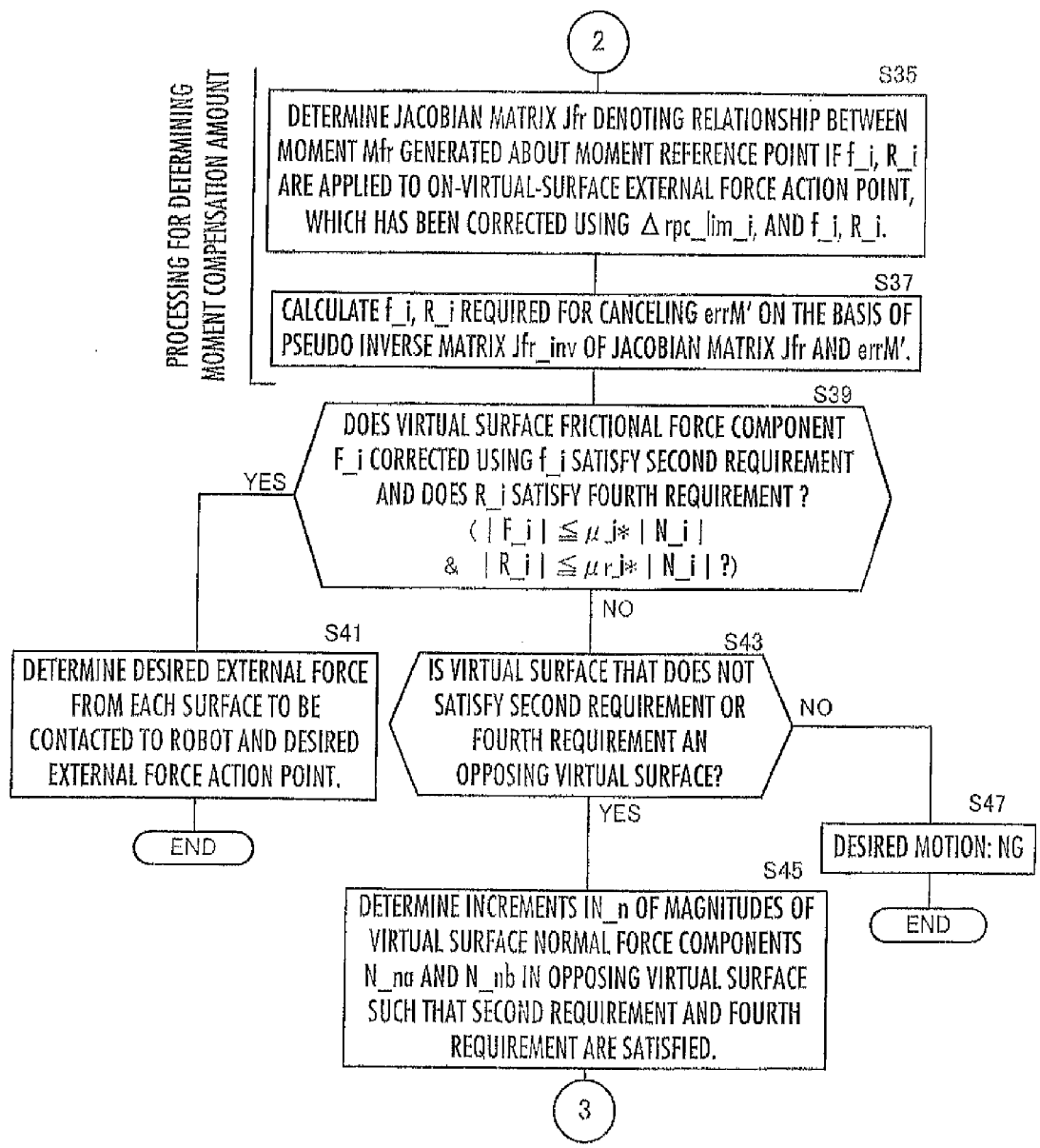
FIG. 9 is a flowchart illustrating the processing carried out by an external force target generator shown in FIG. 2 in a first embodiment.

Then, the external force target generator 27 carries out the processing illustrated by the flowcharts of FIG. 7 to FIG. 9 by using the received data so as to determine the desired external force and the desired external force action point of a desired gait. The processing illustrated by the flowcharts of FIG. 7 to FIG. 9 is for determining the instantaneous values of the desired external force and the desired external force action point while evaluating the desired motion at each time (each time at a predetermined interval) of the desired gait. If the desired motion is appropriate, then carrying out the processing in order at each time of the desired gait determines the desired external force and the desired external force action point in a time-series manner.

In the following description related to the processing by the external force target generator 27, the time corresponding to the instantaneous values of the desired external force and the desired external force action point to be currently determined by the processing illustrated by the flowcharts of FIG. 7 to FIG. 9 is referred to as the current time. Further, the time preceding the current time is referred to as the previous time, and the time following the current time is referred to as the next time.

The external force target generator 27 first implements the processing in S01. In this step S01, the external force target generator 27 sets a working virtual surface used in arithmetic processing for determining the desired external force and the desired external force action point at the current time on the basis of a desired motion and environmental information such that the virtual surface coincides with or approximates to each surface to be contacted in the outside world of the robot 1 (a surface to be contacted with which the distal end of one of the link mechanisms 5 is to be brought into contact at the current time in the desired motion).

Figure 10:
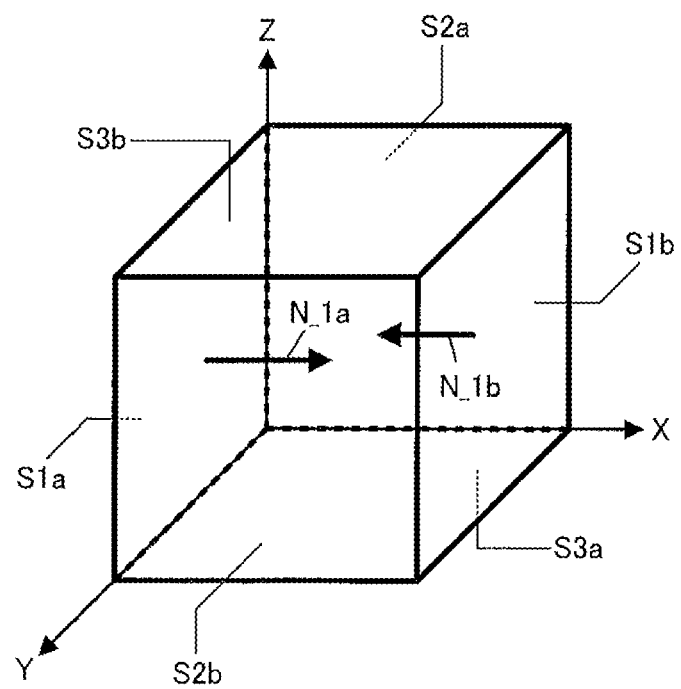
FIG. 10 is a diagram for describing a virtual surface set in S01 of FIG. 7.

Here, according to the present embodiment, in order to impart versatility to the algorithm of the processing carried out by the external force target generator 27 and to make it easy to configure the algorithm, six planes S1*a*, S2*a*, S3*a*, S1*b*, S2*b*, and S3*b* having mutual posture relationships established beforehand are prepared as the surfaces that can be used as the working virtual surfaces, as illustrated in FIG. 10. Further, in the processing carried out by the external force target generator 27, the external force to be applied to the robot 1 from each surface to be contacted in order to achieve a desired motion of the robot 1 is regarded as the external force to be applied to the robot 1 from a virtual surface corresponding to each of surface to be contacted.

In this case, according to the present embodiment, the virtual surfaces S1*a*, S2*a* and S3*a* among the six virtual surfaces are prepared as the planes that are orthogonal to each other, while the virtual surfaces S1*b*, S2*b* and S3*b* are prepared as the planes that are parallel to the virtual surfaces S1*a*, S2*a* and S3*a*, respectively.

Further, two virtual surfaces opposing in parallel to each other are set such that the directions of the normal forces that can be generated by the virtual surfaces are opposite to each other (in the direction from a virtual surface toward a virtual surface opposing thereto). For example, as illustrated in FIG. 10, in the case where a 3-axis orthogonal coordinate system (an XYZ coordinate system) is assumed, the directions of the normal forces $N\_1a$ and $N\_1b$ that can be generated by the virtual surfaces S1*a* and S1*b* that are orthogonal to an X-axis are the positive direction of the X-axis direction (the direction from S1*a* toward S1*b*) and the negative direction of the X-axis direction (the direction from S1*b* toward S1*a*). The same applies to the set of the virtual surfaces S2*a*, S2*b* that are orthogonal to a Y-axis and the set of the virtual surfaces S3*a* and S3*b* that are orthogonal to a Z-axis.

Further, in the processing in S01, the external force target generator 27 associates one of the virtual surfaces S1*a*, S2*a*, S3*a*, S1*b*, S2*b*, and S3*b* to one of the surfaces to be contacted (more accurately, the surface of contact of each surface to be contacted with the distal end of the link mechanism 5 of the robot 1) in the outside world at the current time. Then, the external force target generator 27 virtually sets the same number of virtual surfaces as that of the surfaces to be contacted at the current time for the outside world of the robot 1 (the outside world recognized by the environmental information) such that the virtual surface associated with the surface to be contacted at the current time coincides with or approximates to the surface to be contacted corresponding thereto. Setting a virtual surface in the outside world means to determine the layout position and posture of the virtual surface in the outside world.

In this case, if there are a plurality of surfaces to be contacted in the outside world at the current time, then the layouts of the virtual surfaces in the outside world (the layout of a virtual surface group consisting of the same number of virtual surfaces as that of the surfaces to be contacted) are determined such that a posture difference (a spatial angular difference) between each surface to be contacted (the surface of contact of each surface to be contacted with which the distal end of the link mechanism 5 of the robot 1 is in contact) and the virtual surface corresponding thereto becomes zero or approximates to zero as much as possible for any one of the surfaces to be contacted. The layout of a virtual surface group formed of the same number of virtual surfaces as the number of all surfaces to be contacted at the current time is determined such that, for example, the value obtained by adding, on all the surfaces to be contacted at the current time, the squared values or the absolute values of the spatial components (the angular difference components about three axes) of the aforesaid posture difference for each surface to be contacted is minimized. The above value to be obtained may alternatively be the mean value of the squared values or the absolute values.

According to the present embodiment, therefore, if there is a plurality of surfaces to be contacted in the outside world at the current time, then the plurality of virtual surfaces (the virtual surface group) set in S01 is constructed of the same number of virtual surfaces as the number of the surfaces to be contacted. Further, the mutual posture relationship of the plurality of virtual surfaces is such that any two virtual surfaces are orthogonal to each other or oppose in parallel to each other.

If the surfaces to be contacted at the current time have the same surface to be contacted as the surface to be contacted at the previous time, then the virtual surface associated with the same surface to be contacted at the current time will be maintained to be the same virtual surface as that at the previous time.

When the wall climbing gait is generated by the gait generator 23 by the processing in S01 described above, the virtual surfaces are set, for example, as described below. At the time of the motional state illustrated in FIG. 3(a) or 3(b), three virtual surfaces (e.g., the virtual surfaces S3a, S2a and S2b) including two virtual surfaces that are parallel to each other among the six virtual surfaces S1a, S2a, S3a, S1b, S2b, and S3b are associated with the floor surface FL, the wall surface WL1, and the wall surface WL2, respectively, which are the surfaces to be contacted (refer to the parenthesized reference numerals in the figure). Then, the layouts of the virtual surfaces S3a, S2a and S2b in the outside world of the robot 1 are determined such that the virtual surfaces S3a, S2a and S2b match or substantially match the floor surface FL, the wall surface WL1, and the wall surface WL2, respectively.

At the time of the motional states illustrated in FIG. 3(c), FIG. 4(a), and FIG. 4(b), the virtual surfaces S2a and S2b associated with the wall surfaces WL1 and WL2 in the motional states shown in FIGS. 3(a) and 3(b) are directly associated with the wall surfaces WL1 and WL2, respectively (refer to the parenthesized reference numerals in the figures). Then, the layouts of the virtual surfaces S2a and S2b in the outside world of the robot 1 are determined such that the virtual surfaces S2a and S2b match or substantially match the wall surfaces WL1 and WL2, respectively.

In the following description of the present embodiment, two virtual surfaces opposing in parallel to each other among the virtual surfaces set in S01 may be referred to as opposing virtual surfaces in some cases. This set of the opposing virtual surfaces in the present embodiment is one of the set of the virtual surfaces S1a and S1b, the set of the virtual surfaces S2a and S2b, and the set of the virtual surfaces S3a and S3b. The opposing virtual surfaces of the sets may generically be denoted by the opposing virtual surfaces Sna and Snb (n=1 or 2 or 3) or simply by the opposing virtual surfaces Sna and Snb.

Referring back to the description related to FIG. 7, the external force target generator 27 subsequently carries out the processing in S03. In this step S03, on the basis of the desired motion prepared by the basic gait element generator 25, the external force target generator 27 determines a required total translational external force Fall, i.e., a translational force component in a required total external force, which is the total external force to be applied to the robot 1 at the current time and a required total moment external force Mall, i.e., the component of a moment in the required total external force about a predetermined reference point, in order to implement the desired motion.

Here, the predetermined reference point (hereinafter referred to as the moment reference point) is a point fixed relative to an outside world of the robot 1 (e.g., a point set on a surface to be contacted in an outside world or on a virtual surface corresponding thereto). The moment reference point may be maintained to be a fixed point throughout the entire period of a desired gait or may be updated as necessary for every predetermined period of time of the desired gait.

In the processing by the external force target generator 27 in the present embodiment, the translational forces or moments, such as the required total translational external force Fall and the required total moment external force Mall, or the variables (vector amounts), such as spatial positions and postures, are described by means of a global coordinate system fixed in relation to a virtual surface set in S01 (e.g., a 3-axis orthogonal coordinate system (an XYZ coordinate system) set according to the position and posture relationship illustrated in FIG. 10 in relation to the virtual surfaces).

More specifically, the required total translational external force Fall and the required total moment external force Mall are determined as follows. To determine the required total translational external force Fall, the external force target generator 27 calculates a desired center-of-gravity acceleration denoted by a second-order differential value of the desired position of the overall center-of-gravity point of the robot 1 (a desired center-of-gravity acceleration at the current time) by using a geometric model (a rigid link model) of the robot 1 on the basis of the desired motion of the robot 1. Alternatively, the desired position of the overall center-of-gravity point of the robot 1 or the desired center-of-gravity acceleration may be calculated beforehand as the elements of the desired motion by the basic gait element generator 25.

Then, the external force target generator 27 calculates, as the required total translational external force Fall, the translational force that balances the resultant force of the translational inertial force (the translational force component of an inertial force generated by a desired motion of the robot 1), which is calculated on the basis of the above desired center-of-gravity acceleration and the overall mass of the robot 1, and the gravitational force acting on the robot 1.

The overall translational inertial force of the robot 1 generated by a desired motion may alternatively be calculated by, for example, adding up the translational inertial force of the center-of-gravity point of each of the links 3 and 7 of the robot 1.

Further, when determining the required total moment external force Mall, the external force target generator 27 calculates, on the basis of a desired motion of the robot 1, the total sum of the inertial force moment (the moment component of an inertial force) at the current time, which is generated about the overall center-of-gravity point of the robot 1 by a desired motion of the robot 1 and the inertial force moment at the current time, which is generated about the moment reference point by the motion (translational motion) of the overall center-of-gravity point of the robot 1 in the desired motion, by using the geometric model (the rigid link model) of the robot 1. Then, the external force target generator 27 calculates the moment balancing the inertial force moment of the total sum as the required total moment external force Mall at the current time.

Alternatively, the time-series of the translational inertial force generated by the desired motion of the robot 1 and the time-series of the inertial force moment about the moment reference point may be calculated by the basic gait element generator 25 beforehand. Further, the value of the translational inertial force and the value of the inertial force moment at the current time may be input from the basic gait element generator 25 to the external force target generator 27.

After calculating the required total translational external force Fall and the required total moment external force Mall as described above, the external force target generator 27 subsequently carries out the processing in S05 to S15. The processing in these steps S05 to S15 is carried out to determine a required virtual surface translational force, which is the translational force to be applied to the robot 1 from the virtual surfaces set in S01 in order to achieve a desired motion of the robot 1 (more specifically, the translational motion of the overall center-of-gravity point of the robot 1 defined by the desired motion).

The required virtual surface translational force in each of the virtual surfaces is formed of a virtual surface normal force component, which is a component perpendicular to the virtual surface, and a virtual surface frictional force component, which is a component parallel to the virtual surface. The value of the required virtual surface translational force determined by the processing in S05 to S15 is a provisional value and may be therefore corrected by the processing in S19 and after, which will be discussed later. The processing in S05 to S15 includes the processing for evaluating a desired motion on the basis of the required virtual surface translational force to be determined.

The following will describe the processing in S05 to S15 in detail. The external force target generator 27 carries out the processing in S05 first. In this step S05, the external force target generator 27 determines, on the basis of the required total translational external force Fall determined in S03, a virtual surface normal force component $N\_i$, which is a component perpendicular to the virtual surface (a normal force component), and a virtual surface frictional force component $F\_i$, which is a component parallel to the virtual surface (a frictional force component) in the required virtual surface translational force in the virtual surface.

In the description of the present embodiment, the suffix "i" in the reference character $N\_i$ or $F\_i$ means the identification character of any one virtual surface of the virtual surfaces set in S01 at the current time. Further, a reference character with the suffix "i" denotes a reference character related to a virtual surface with the identification character i.

In this case, in the description of the present embodiment, the identification characters of the virtual surfaces S1$a$, S2$a$, S3$a$, S1$b$, S2$b$, and S3$b$ are the suffixes of "S" of each of the reference characters denoting the virtual surfaces, namely, 1$a$, 2$a$, 3$a$, 1$b$, 2$b$, and 3$b$. A reference character related to a particular virtual surface is accompanied by the same suffix as the suffix of the particular virtual surface. For example, the reference character of a virtual surface normal force component in the virtual surface S2$a$ is expressed by $N\_2a$.

In S05, the external force target generator 27 determines the virtual surface normal force component $N\_i$ and the virtual surface frictional force component $F\_i$, which constitute the required virtual surface translational force in each virtual surface such that a first requirement that the resultant force of the required virtual surface translational forces in all virtual surfaces set in S01 at the current time coincide with the required total translational external force Fall determined in S03 is satisfied.

More specifically, in the processing in S05 of the present embodiment, to satisfy the aforesaid first requirement, the external force target generator 27 determines the virtual surface normal force component $N\_i$ and the virtual surface frictional force component $F\_i$ in each virtual surface such that a first A requirement that the resultant force of the virtual surface normal force components $N\_i$ in all the virtual surfaces set at the current time coincide with the component of the required total translational external force Fall obtained by removing the components that are parallel to all the virtual surfaces therefrom and a first B requirement that the resultant force of the virtual surface frictional force components $F\_i$ in all the virtual surfaces coincide with the component of the required total translational external force Fall that is parallel to all the virtual surfaces are satisfied.

In the processing in S05, if the virtual surfaces set at the current time include two opposing virtual surfaces Sn$a$ and Sn$b$ (n=1 or 2 or 3) that oppose each other in parallel and the required total translational external force Fall has a component Fall_n that is perpendicular to the opposing virtual surfaces Sn$a$ and Sn$b$, then the external force target generator 27 makes the virtual surface normal force component $N\_na$ or $N\_nb$ in the opposing virtual surface Sn$a$ or Sn$b$, whichever is capable of generating a normal force in the same direction as that of Fall_n, coincide with Fall_n, and also sets the virtual surface normal force component $N\_na$ or $N\_nb$ in the other opposing virtual surface to zero.

Further, in the processing in S05, if a plurality of virtual surfaces is set at the current time and the required total translational external force Fall has a component that is parallel to all the virtual surfaces, then the external force target generator 27 determines the virtual surface normal force component $N\_i$ in each virtual surface such that the first A requirement is satisfied and then determines the virtual surface frictional force component $F\_i$ of each virtual surface such that the magnitude of the virtual surface frictional force component $F\_i$ in each virtual surface becomes a magnitude based on the upper limit value of a frictional force that can be generated in the virtual surface (more specifically, such that the magnitude of the virtual surface frictional force component $F\_i$ increases as the upper limit value of the frictional force that can be generated in the virtual surface increases) while satisfying the first B requirement.

To be more specific, the external force target generator 27 sets the frictional coefficient $\mu\_i$ of each virtual surface, which has been set at the current time, on the basis of the environmental information (more specifically, the environmental information related to the frictional coefficient of a surface to be contacted corresponding to the virtual surface). In this case, the frictional coefficient $\mu\_i$ of each virtual surface may be set to the same value or substantially the same value as that of the actual frictional coefficient of the surface to be contacted corresponding to the virtual surface or may be set to be slightly smaller than the actual frictional coefficient to ensure an allowance.

The frictional coefficient $\mu\_i$ of each virtual surface does not have to be set at each time of a desired gait. For example, the frictional coefficients of the virtual surfaces associated with the surfaces to be contacted may be determined on the basis of the environmental information and stored in advance before the processing by the external force target generator 27 is begun, then the frictional coefficients to be associated with the virtual surfaces set in S01 may be selected from among the stored frictional coefficients.

Further, the external force target generator 27 sets, in each virtual surface, the value obtained by multiplying the frictional coefficient $\mu\_i$ associated with the virtual surface by a magnitude $|N\_i|$ of the virtual surface normal force component $N\_i$ ($=\mu\_i*|N\_i|$) as the upper limit value of the frictional forces that can be generated in the virtual surface (hereinafter referred to simply as the frictional force upper limit value).

In the present description, the symbol "*" is used as the multiplication symbol. In this case, the symbol "*" used in the multiplication of vectors will mean an exterior product (vector product).

Subsequently, the external force target generator 27 determines the virtual surface frictional force component F_i in each virtual surface such that the magnitude of the virtual surface frictional force component F_i increases as the frictional force upper limit value set as described above increases.

For instance, the virtual surface frictional force component F_i of each virtual surface is determined such that the mutual ratio of the magnitudes of the virtual surface frictional force components F_i of the virtual surfaces coincides with the mutual ratio of the frictional force upper limit values of the virtual surfaces while satisfying the first B requirement. In this case, for example, a component in Fall that is parallel to all the virtual surfaces may be set to coincide with the virtual surface frictional force component of a virtual surface that has a largest frictional force upper limit value, and the virtual surface frictional force components of the remaining virtual surfaces may be set to zero.

When the gait generator 23 generates the wall climbing gait, the virtual surface normal force component N_i and the virtual surface frictional force component F_i in each virtual surface will be determined, for example, as described below by the aforesaid processing in S05.

For example, a situation is assumed in which, at time t2 in the motional state illustrated in FIG. 3(b), the required total translational external force Fall has a component Fall_z that is perpendicular to the virtual surface S3a corresponding to the floor surface FL, a component Fall_y that is perpendicular to the virtual surfaces (opposing virtual surfaces) S2a and S2b corresponding to the wall surfaces WL1 and WL2, respectively, and a component Fall_x that is parallel to all these virtual surfaces S3a, S2a, and S2b, as illustrated in FIG. 11(a).

In this situation, by the processing in S05, the virtual surface normal force component N_3a of the virtual surface S3a and the virtual surface normal force component N_2a of the virtual surface S2a are determined to be the values that coincide with Fall_z and Fall_y, respectively, while the virtual surface normal force component N_2b of the virtual surface S2b is determined to be zero. Thus, the virtual surface normal force components N_3a, N_2a, and N_2b that satisfy the first A requirement are determined. Here, the relationship denoted by $\mu\_3a*|N\_3a|>\mu\_2a*|N\_2a|$ applies.

Further, the virtual surface frictional force component F_3a of the virtual surface S3a and the virtual surface frictional force component F_2a of the virtual surface S2a are determined such that the resultant force of the virtual surface frictional force component F_3a of the virtual surface S3a and the virtual surface frictional force component F_2a of the virtual surface S2a (=F_3a+F_2a) coincides with Fall_x and a relationship defined by |F_3a|>|F_2a| applies (such that, for example, $|F\_2a|/|F\_3a|=\mu\_2a*|N\_2a|/(\mu\_3a*|N\_3a|)$), and the virtual surface frictional force component F_2b of the virtual surface S2b is determined to be zero. Thus, the virtual surface frictional force components F_3a, F_2a, and F_2b that satisfy the first B requirement are determined.

At time after the motional state illustrated in FIG. 3(c) in the wall climbing gait, if the required total translational external force Fall is the same as that shown in, for example, FIG. 11(a), then by the processing in S05, the virtual surface normal force component N_2a and the virtual surface frictional force component F_2a are determined such that the virtual surface normal force component N_2a of the virtual surface S2a coincides with Fall_y of Fall and the virtual surface frictional force component F_2a coincides with the resultant force of Fall_z and Fall_x of Fall, and both the virtual surface normal force component N_2b and the virtual surface frictional force component F_2b of the virtual surface S2b are determined to be zero.

The description will now return to the flowchart of FIG. 7. The external force target generator 27 carries out the processing in S07 after carrying out the processing in S05 as described above. In this step S07, the external force target generator 27 determines whether each of all the virtual surfaces set in S01 at the current time satisfies the second requirement that the magnitude of the virtual surface frictional force component F_i be not more than the aforesaid frictional force upper limit value, which is the predetermined upper limit value set on the basis of the magnitude of the virtual surface normal force component N_i of the virtual surface frictional force component F_i. In other words, by using the frictional force upper limit value determined as described above ($=\mu\_i*|N\_i|$), the external force target generator 27 determines whether $|F\_i|\leq\mu\_i*|N\_i|$ applies to each of the all virtual surfaces set in S01.

If the determination result in S07 is affirmative, then the external force target generator 27 terminates the processing for determining the required virtual surface translational force (provisional value) in each virtual surface and carries out the processing of S19 and after shown in FIG. 8. In this case, the set of the virtual surface normal force component N_i and the virtual surface frictional force component F_i in each virtual surface determined in S05 will be directly determined as the required virtual surface translational force (provisional value).

Meanwhile, if the determination result in S07 is negative, then the external force target generator 27 carries out the processing in S09. In this step S09, the external force target generator 27 determines whether the virtual surface on which the determination result in S07 is negative is the opposing virtual surface Sna or Snb (n=1 or 2 or 3).

In the situation wherein the determination result in S09 is negative, the magnitude of the virtual surface normal force component in the virtual surface on which the determination result in S07 is negative cannot be increased while satisfying the first A requirement. This means that the magnitude of the virtual surface frictional force component in the virtual surface cannot be increased within the range of the frictional force upper limit value or less. Hence, in this case, the external force target generator 27 determines in S17 that the desired motion is inappropriate (i.e., the desired motion needs to be corrected) and interrupts the processing for determining the desired external force and the desired external force action point of the flowcharts in FIG. 7 to FIG. 9.

In the present embodiment, therefore, the required virtual surface translational force (the set of the virtual surface normal force component N_i and the virtual surface frictional force component F_i) is determined such that the first A requirement and the first B requirement are satisfied in S05, and then the desired motion is evaluated by the determination processing in S07 and S09. If the determination results in both S07 and S09 are both negative, then the desired motion is evaluated as inappropriate.

If the desired motion is evaluated as inappropriate in S17, then the external force target generator 27 outputs error information to the basic gait element generator 25. Then, the basic gait element generator 25 creates a desired motion again on the basis of the error information.

Meanwhile, in the situation wherein the determination result in S09 is affirmative, the magnitudes of the virtual surface normal force components N_na and N_nb of the opposing virtual surfaces Sna and Snb (n=1 or 2 or 3) that are parallel to each other can be increased while satisfying the first A requirement (i.e., while maintaining N_na+N_nb at a constant level). In other words, N_na and N_nb are normal forces in opposite directions from each other, so that the total sum of N_na and N_nb does not change even if the magnitudes thereof are increased by the same amount.

Therefore, if the determination result in S09 is affirmative, then the external force target generator 27 carries out the processing in S11. In this step S11, the external force target generator 27 determines increments IN_n of the magnitudes of the virtual surface normal force components N_na and N_nb of the opposing virtual surfaces Sna and Snb, respectively, such that the second requirement is satisfied.

More specifically, the external force target generator 27 calculates, as the increment IN_n, the value obtained by dividing the result, which is obtained by subtracting the frictional force upper limit value ($=\mu\_i*|N\_i|$) used in the determination processing in S07 from the magnitude of the virtual surface frictional force component F_i ($=$F_na or F_nb) in the opposing virtual surface Sna or Snb in which the determination result in S07 is negative, by the frictional coefficient $\mu\_i$.

More specifically, the external force target generator 27 calculates the increment IN_n according to expression 01 given below.

$$IN\_n = (|F\_i| - \mu\_i * |N\_i|)/\mu\_i \qquad \text{Expression 01}$$

Subsequently, the external force target generator 27 carries out the processing in S13. In this step S13, the external force target generator 27 increments each of the virtual surface normal force components N_na and N_nb of the opposing virtual surfaces Sna and Snb, respectively, by the increment IN_n determined as described above from the magnitude of the value determined by the processing in S05, then re-determines the incremented values as the virtual surface normal force components N_na and N_nb of the opposing virtual surfaces Sna and Snb, respectively.

By the processing up to S13, a required virtual surface translational force that satisfies the first A requirement, the first B requirement, and the second requirement is determined.

Subsequently, the external force target generator 27 carries out the processing in S15. In this step S15, the external force target generator 27 determines whether a third requirement that the magnitude of one of the virtual surface normal force components N_na and N_nb after their magnitudes have been incremented in S13, whichever is smaller ($=\min(|N\_na|, |N\_nb|)$), be a predetermined value IFC_n or less is satisfied.

Here, the $\min(|N\_na|,|N\_nb|)$ corresponds to an internal force which does not contribute to an overall translational motion of the robot 1. If the magnitude of the internal force increases, the share, which is required to generate the internal forces, in the motive power (driving torque) that can be generated by the joint actuator 11 of the robot 1 increases, frequently leading to deficiency of the motive power of the joint actuator 11 that can be used for changing the motion of the robot (the motive power that can be used to change the translational motion of the entire robot 1). According to the present embodiment, therefore, the determination processing in S15 is carried out to restrict the internal force to a predetermined value IFC_n or less.

The predetermined value IFC_n (hereinafter referred to as the internal force upper limit value IFC_n) is set according to, for example, the direction of an internal force generated by the opposing virtual surfaces Sna and Snb (the direction of the normal line of the opposing virtual surfaces Sna and Snb). However, the internal force upper limit value IFC_n may be set at a fixed value regardless of the direction of the internal force.

If the determination result in S15 is affirmative, then the external force target generator 27 terminates the processing for determining the required virtual surface translational force (provisional value) in each virtual surface and carries out the processing in S19 and after illustrated in FIG. 8, as with the case where the determination result in S07 is affirmative.

In this case, for the virtual surfaces except the opposing virtual surfaces Sna and Snb including the virtual surface in which the determination result in S07 is negative, the set of the virtual surface normal force component N_i and the virtual surface frictional force component F_i determined in S05 is directly determined as the required virtual surface translational force (provisional value).

Further, in each of the opposing virtual surfaces Sna and Snb, the set of the virtual surface normal force component N_i (N_na, N_nb) incremented in S13 and the virtual surface frictional force component F_i (F_na, F_nb) determined in S05 is determined as the required virtual surface translational force (provisional value).

Further, in the situation wherein the determination result in S15 is negative, it is impossible or difficult to apply, to the robot 1, an external force dynamically required to implement a desired motion of the robot 1 while satisfying the third requirement related to the internal force. Hence, if the determination result in S15 is negative, then the external force target generator 27 determines in S17 that a desired motion is inappropriate (i.e., the desired motion needs to be corrected) and interrupts the processing illustrated by the flowcharts in FIG. 7 to FIG. 9, as with the case where the determination result in S09 is negative.

Supplementarily, according to the present embodiment, if the virtual surfaces set in S01 include opposing virtual surfaces Sna and Snb (n=1 or 2 or 3) that are parallel to each other, one of the virtual surface normal force components N_na and N_nb of the opposing virtual surfaces Sna and Snb determined by the processing in S05 is zero, so that the set of N_na and N_nb always satisfies the third requirement. Therefore, if the determination result in S07 is affirmative, then the determination processing in S15 does not have to be carried out.

By the processing in S05 to S15 described above, the set of the virtual surface normal force component N_i and the virtual surface frictional force component F_i constituting the required virtual surface translational force (provisional value) of each virtual surface is determined such that the first A requirement, the first B requirement, the second requirement, and the third requirement are satisfied, except for the case where the determination result in S09 or S15 is negative (a desired motion is inappropriate). Thus, a required virtual surface translational force (provisional value) that allows the translational motion (the translational motion of an overall center-of-gravity point) of the entire robot 1 in a desired motion of the robot 1 to be achieved while satisfying the first A requirement, the first B requirement, the second requirement, and the third requirement is determined.

Accordingly, in the present embodiment, the required virtual surface translational force that satisfies the first A requirement, the first B requirement, and the second requirement is determined by the processing in steps up to S13, and then the desired motion is evaluated again by the determination processing in S15. If the determination result in S15 is negative, then it is evaluated that the desired motion is inappropriate.

If all the determination results in S07, S09, and S15 are affirmative, then a required virtual surface translational force that will satisfy the first A requirement, the first B requirement, the second requirement, and the third requirement can be determined. This means that the desired motion generated by the basic gait element generator 25 is an appropriate desired motion that allows an external force to be applied to the robot 1 such that at least the overall translational motion of the robot 1 in the desired motion (the translational motion of the overall center-of-gravity point of the robot 1) is smoothly achieved.

When the gait generator 23 generates the wall climbing gait, the virtual surface normal force component N_i and the virtual surface frictional force component F_i will be determined, for example, as follows by the processing in S05 to S15 described above.

For example, a case will be assumed where the virtual surface normal force component N_i and the virtual surface frictional force component F_i (i=3a, 2a, or 2b) in each of the virtual surfaces are determined by the processing in S05 at time t2 in the motional state illustrated in FIG. 3(b) in the wall climbing gait (refer to FIG. 11(a) mentioned above). In this case, if the virtual surface frictional force component F_3a in the virtual surface S3a and the virtual surface frictional force component F_2a in the virtual surface S2a satisfy the second requirement (if the determination result in S07 is affirmative), then the required virtual surface translational forces (N_i and F_i) in the virtual surfaces that are finally determined by the processing in steps up to S15 coincide with those determined in S05.

Meanwhile, if, for example, the virtual surface frictional force component F_2a in the virtual surface S2a does not satisfy the second requirement, then the magnitudes of the virtual surface normal force components N_2a and N_2b of the opposing virtual surfaces S2a and S2b, respectively, which includes the aforesaid virtual surface S2a, will be determined to have values obtained by incrementing the values determined in S05 by the increment IN_2 determined in S11, as illustrated in FIG. 11(b). Further, the magnitudes of the virtual surface normal force component N_3a and the virtual surface frictional force component F_3a of the virtual surface S3a and the virtual surface frictional force components F2a and F2b of the virtual surfaces S2a and S2b, respectively, are determined to be the same values as the values determined in S05.

Supplementarily, according to the present embodiment, if the virtual surfaces set in S01 include the two opposing virtual surfaces Sna and Snb (n=1 or 2 or 3) that are parallel to each other, then both the virtual surface normal force component and the virtual surface frictional force component of either the opposing virtual surface Sna or Snb is always determined to be zero by the processing in S05. However, in the processing in S05, if the required total translational external force Fall has a component perpendicular to the opposing virtual surfaces Sna and Snb, then the virtual surface normal force components of both opposing virtual surfaces Sna and Snb may be determined to be a non-zero value within a range in which the first A requirement and the third requirement are satisfied. In this case, if the required total translational external force Fall has a component parallel to all virtual surfaces, then the virtual surface frictional force components of both the opposing virtual surfaces Sna and Snb may be set to non-zero values within a range in which the first B requirement is satisfied.

In the processing in S05, if the virtual surface frictional force components of both opposing virtual surfaces Sna and Snb are set to non-zero values as described above, then the determination result in S07 may turn negative in both opposing virtual surfaces Sna and Snb. In this case, the increments IN_n of the virtual surface normal force components of the opposing virtual surfaces Sna and Snb may be determined, for example, as follows. For each of the opposing virtual surfaces Sna and Snb, the increment IN_n is provisionally calculated by the processing in S11, and one of the provisional increments IN_n, whichever is larger, is determined as the increment IN_n of the virtual surface normal force components of the opposing virtual surfaces Sna and Snb.

In the processing of steps up to S15 described above, if the determination result in S07 or S15 is affirmative (if an appropriate required virtual surface translational force (provisional value) in each virtual surface has been determined), then the external force target generator 27 subsequently carries out the processing in S19 shown in the flowchart of FIG. 8. In this step S19, the external force target generator 27 calculates a required virtual surface translational force dependent moment Ms, which is the moment generated about the moment reference point by the required virtual surface translational force in the case where the required virtual surface translational force (provisional value) determined by the steps up to S15 is applied to the provisional on-virtual-surface external force action point in each virtual surface (in the case where the external force action point in each virtual surface is set to coincide with the provisional on-virtual-surface external force action point).

Here, the provisional on-virtual-surface external force action point is an external force action point on a virtual surface which corresponds to a surface to be contacted, the external force action point being obtained by projecting, according to a predetermined rule, the provisional external force action point on each surface to be contacted at the current time, which has been generated by the basic gait element generator 25, onto the surface to be contacted.

Figure 12:
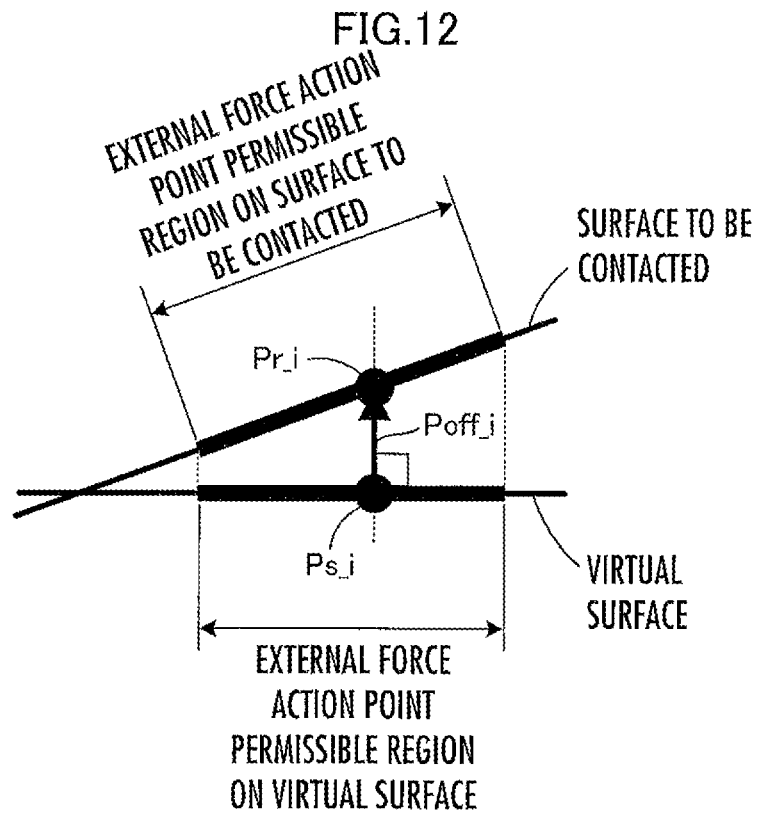
FIG. 12 is a diagram for describing the processing in S19 of FIG. 8.

In this case, according to the present embodiment, the rule for the projection mentioned above is set as described below. As illustrated in FIG. 12, if the external force action point on a certain surface to be contacted is denoted by point Pr_i and an external force action point on a virtual surface corresponding to the surface to be contacted is denoted by point Ps_i, then the external force action point Ps_i on the virtual surface coincides with, for example, a point at which a straight line which passes the external force action point Pr_i on the surface to be contacted and which is perpendicular to the virtual surface (i.e., a perpendicular from the external force action point Pr_i to the virtual surface) intersects with the virtual surface.

The provisional on-virtual-surface external force action point is an external force action point on a virtual surface which corresponds to a surface to be contacted, the external force action point being obtained by projecting, according to the aforesaid rule, the provisional external force action point on each surface to be contacted at the current time onto the virtual surface corresponding to the surface to be contacted.

In the processing in S19, the external force target generator 27 uses a position vector relative to the moment reference point of a provisional on-virtual-surface external force action point determined as described above to calculate, according to expression 03 given below, the required virtual surface translational force dependent moment Ms generated about the moment reference point when the required virtual surface translational forces (N_i, F_i) act on the provisional on-virtual-surface external force action point of each virtual surface.

$$Ms = \Sigma(Irp\_i * N\_i) + \Sigma((Irp\_i + Poff\_i) * F\_i) \qquad \text{Expression 03}$$

Irp_i in this expression 03 denotes the position vector relative to the moment reference point of the provisional on-virtual-surface external force action point of each virtual surface (each virtual surface set in S01 at the current time), and Poff_i denotes the position vector of the provisional external force action point on a surface to be contacted relative to the provisional on-virtual-surface external force action point (or a component vector in the position vector, the component vector being in a direction perpendicular to a virtual surface).

Further, (Irp_i*N_i) denotes the vector product of the position vector Irp_i of the provisional on-virtual-surface external force action point and the virtual surface normal force component N_i in each virtual surface, that is, the moment generated about the moment reference point, when N_i acts on the provisional virtual surface external force action point.

Further, Σ(Irp_i*N_i) means the total sum of the moments (Irp_i*N_i) of all virtual surfaces (all virtual surfaces set in S01 at the current time), i.e., the total moment generated about the moment reference point caused by the virtual surface normal force components N_i in the virtual surfaces.

Further, ((Irp_i+Poff_i)*F_i) denotes the total sum of the moments between a vector product (Irp_i*F_i) of the position vector Irp_i of a provisional on-virtual-surface external force action point and the virtual surface frictional force component F_i in each virtual surface, i.e., the moment generated about the moment reference point when F_i acts on the provisional on-virtual-surface external force action point, and a vector product (Poff_i*F_i) of the position vector Poff_i of a provisional external force action point on a surface to be contacted relative to a provisional on-virtual-surface external force action point and F_i, i.e., the moment generated by F_i about a provisional external force action point on a surface to be contacted.

Further, Σ((Irp_i+Poff_i)*F_i) means the total sum of the moments ((Irp_i+Poff_i)*F_i) of the individual virtual surfaces (all virtual surfaces set in S01 at current time), that is, the total moment generated about the moment reference point due to the virtual surface frictional force component F_i in each virtual surface.

Here, to supplement the description of the moment (Poff_i) *F_i), a surface to be contacted and a virtual surface corresponding thereto do not usually become flush, so that there will be a positional discrepancy between an external force action point Pr_i on a surface to be contacted and an external force action point Ps_i on a virtual surface corresponding thereto in many cases, as illustrated in FIG. 12. In such a situation, a difference due to the positional discrepancy occurs between a moment generated about a moment reference point when the required virtual surface translational force in each virtual surface acts on a provisional on-virtual-surface external force action point and a moment generated about a moment reference point when the same translational force as the aforesaid required virtual surface translational force acts on the provisional external force action point on a surface to be contacted corresponding to the virtual surface. In this case, the direction of the normal line of the surface to be contacted and the direction of the normal line of the virtual surface corresponding thereto will be approximately the same. Hence, the aforesaid difference for each virtual surface primarily depends on the virtual surface frictional force component F_i and substantially agrees with the moment (Poff_i*F_i).

In the present embodiment, therefore, the required virtual surface translational force dependent moment Ms is calculated according to expression 03, to which the moment (Poff_i*F_i) has been added, in order to compensate for the influence of the positional discrepancy thereby to enhance the reliability of Ms.

If the positional discrepancy between the provisional external force action point on the surface to be contacted and the provisional on-virtual-surface external force action point corresponding thereto is sufficiently small, then the required virtual surface translational force dependent moment Ms may be calculated according to an expression obtained by omitting the term of the moment (Poff_i*F_i) from expression 03.

The processing in S19 described above will be illustratively explained in relation to the case where the gait generator 23 generates the wall climbing gait. In a situation wherein a required virtual surface translational force has been determined, as illustrated in, for example, FIG. 11(b), the moment Ms generated about a moment reference point (e.g., a point on the intersection line of the virtual surfaces S2a and S3a) is calculated according to expression 03 given above by the virtual surface normal force components N_2a, N_2b, and N_3a and the virtual surface frictional force components F_2a and F_3a shown in the figure. In this case, in the example illustrated in FIG. 11(b), the virtual surfaces S2a, S2b and S3a match (or substantially match) the surfaces to be contacted WL1, WL2 and FL, so that Poff_i (Poff_2a, Poff_2b, Poff_3a) for each of the virtual surfaces S2a, S2b, and S3a in expression 03 may be all zero.

Subsequently, the external force target generator 27 carries out the processing of S21 to S37, which is the processing for determining a moment compensation amount. Here, an overview of the processing will be given.

If it is assumed that the required virtual surface translational force dependent moment Ms calculated in S19 as described above coincides or substantially coincides with the required total moment external force Mall calculated in S03, then the required virtual surface translational force (provisional value) determined by the processing up to S15 and the provisional on-virtual-surface external force action point corresponding to the provisional external force action point generated by the basic gait element generator 25 provide an external force that not only allows the translational motion in a desired motion of the robot 1 (the translational motion of an overall center-of-gravity point) to be properly achieved but also allows a rotational motion (a motion that changes the angular momentum about a moment reference point) to be properly achieved.

However, the processing up to S15 does not consider the dynamics related to the rotational motion in the desired motion of the robot 1. In general, therefore, the difference between required total moment external force Mall and the required virtual surface translational force dependent moment Ms (hereinafter referred to as the moment error errM) will not be zero or a value close thereto.

The moment compensation amount determined by the processing of S21 to S37 is the manipulated variable (the manipulated variable of a target related to an external force) for canceling the moment error errM (or approximating the errM to zero).

In the present embodiment, the moment compensation amount determined by the processing of S21 to S37 comes in three types of compensation amounts (a first to a third compensation amounts). The first compensation amount is a moment compensation amount composed of a correction amount of the position of an on-virtual-surface external force action point in one or more virtual surfaces (the correction amount from a provisional on-virtual-surface external force action point, which will be hereinafter referred to as the on-virtual-surface external force action point correction amount in some cases). In this case, the first compensation amount is used to determine the external force action point on a surface to be contacted corresponding to the on-virtual-surface external force action point, which has been corrected by the first compensation amount, such that the external force action point falls within the aforesaid existence permissible region.

Further, the second compensation amount is a moment compensation amount composed of the correction amount of a virtual surface frictional force component of a required virtual surface translational force (provisional value) in two or more virtual surfaces (hereinafter referred to as the virtual surface frictional force component correction amount in some cases). In this case, the second compensation amount is a compensation amount determined such that the total sum (resultant force) of the virtual surface frictional force component correction amounts constituting the second compensation amount is zero.

Further, the third compensation amount is a moment compensation amount composed of a twisting force to be additionally applied to the robot 1 as a moment external force about an axis, which is perpendicular to one or more virtual surfaces, from the virtual surface (hereinafter referred to as the virtual surface twisting force in some cases).

The second compensation amount is composed of the virtual surface frictional force component correction amounts in two or more virtual surfaces, because the resultant force of the required virtual surface translational forces corrected by the second compensation amount is required to satisfy the first requirement.

Here, the first compensation amount out of the first to the third compensation amounts has a function for canceling or reducing the moment error without the need for correcting the required virtual surface translational force (provisional value) determined by the processing up to S15. Hence, if the moment error can be cancelled by the first compensation amount, then the required virtual surface translational force (provisional value) determined by the processing up to S15 can be directly used as the required virtual surface translational force at current time to implement a desired motion.

Meanwhile, the second compensation amount or the third compensation amount serves to additionally impart a virtual surface frictional force component correction amount or a virtual surface twisting force to an external force to be applied from a virtual surface to the robot 1, so that the second compensation amount or the third compensation amount is subjected to the restrictions on the limit of frictional forces that can be generated on the virtual surface. Further, in order to satisfy the restrictions, the virtual surface normal force components N_na and N_nb (and consequently the internal forces) in the opposing virtual surfaces Sna and Snb (n=1 or 2 or 3) need to be corrected in some cases. Further, correcting these virtual surface normal force components N_na and N_nb generally leads to a change in the moment Ms generated about the moment reference point.

In the present embodiment, therefore, the external force target generator 27 preferentially determines the first compensation amount out of the first to the third compensation amounts as the moment compensation amount for canceling the moment error errM. The external force target generator 27 restricts the first compensation amount if the moment error cannot be canceled by the first compensation amount (more specifically, in the case where the first compensation amount is determined to cancel the entire moment error errM, the external force action point on the surface to be contacted corresponding to the on-virtual-surface external force action point that has been corrected using the first compensation amount deviates from the existence permissible region). Further, a set of the second compensation amount and the third compensation amount is determined such that the portion of the moment error errM that cannot be canceled by the restricted first compensation amount will be canceled by the second compensation amount and the third compensation amount.

This completes the description of the overview of the processing from S21 to S37 (the processing for determining the moment compensation amount).

The following will explain in more detail the processing for determining the moment compensation amount. The external force target generator 27 carries out the processing in S21 first. In this step S21, the external force target generator 27 calculates the moment error errM, which is the difference between the required total moment external force Mall calculated in S03 and the required virtual surface translational force dependent moment Ms (=Mall−Ms) calculated in S19.

Subsequently, the external force target generator 27 carries out the processing in S23. In this step S23, the external force target generator 27 calculates a Jacobian matrix J indicating the sensitivity in a change of the required virtual surface translational force dependent moment Ms in response to a change in the position of an on-virtual-surface external force action point (a change from a provisional on-virtual-surface external force action point).

Here, a change amount (vector) of the position of an external force action point on each virtual surface is denoted by $\Delta rp\_i$. When the external force action point on each virtual surface is changed by $\Delta rp\_i$ from a provisional on-virtual-surface external force action point, the change amount (vector) of the position of an external force action point on a surface to be contacted (a point at which a straight line which passes the external force action point on a virtual surface and which is perpendicular to the virtual surface intersects with the surface to be contacted) is denoted by $\Delta Poff\_i$. The change amount (vector) of the required virtual surface translational force dependent moment Ms observed when the external force action point on each virtual surface is changed by $\Delta rp\_i$ from the provisional on-virtual-surface external force action point is denoted by $\Delta Ms$. At this time, a relational expression of expression 05 given below is obtained on the basis of the above expressive 03.

$$\Delta Ms = \Sigma(\Delta rp\_i * (Ni+Fi) + \Delta Poff\_i * F\_i) \qquad \text{Expression 05}$$

In this case, $\Delta Poff\_i$ will be the function value of $\Delta rp\_i$ (more specifically, a value uniquely defined by the posture difference (spatial angular difference) between a virtual surface and a surface to be contacted corresponding thereto and $\Delta rp\_i$). Hence, expression 05 can be rewritten to the following expression 07.

$$\Delta Ms = J * (\Delta rp\_i) \qquad \text{Expression 07}$$

In this expression 07, ($\Delta rp\_i$) is a longitudinal vector having, as a component thereof, $\Delta rp\_i$ related to all virtual surfaces (all virtual surfaces set in S01 at current time). Further, J in expression 07 denotes a Jacobian matrix indicating sensitivity of a change in the required virtual surface translational force dependent moment Ms in response to a change in the position of an on-virtual-surface external force action point (a change from the position of a provisional on-virtual-surface external force action point).

Thus, in the processing in S23, the external force target generator 27 calculates the Jacobian matrix J on the basis of the required virtual surface translational forces N_i and F_i of each virtual surface and expression 05. In this case, the relationship between $\Delta Poff\_i$ and $\Delta rp\_i$ is determined on the basis of the posture difference between each virtual surface and the surface to be contacted corresponding thereto.

Subsequently, the external force target generator 27 carries out the processing in S25. This processing in S25 calculates ($\Delta$rp_i) that satisfies the relationship in expression 07 as a counterpart of the set of the on-virtual-surface external force action point correction amount in each virtual surface to cancel errM in the case where $\Delta$Ms in expression 07 coincides with the moment error errM calculated in S21.

Here, the Jacobian matrix J in expression 07 is usually not a regular matrix. Thus, the external force target generator 27 calculates a pseudo inverse matrix Jinv of the Jacobian matrix J determined in S23, and multiplies the pseudo inverse matrix Jinv by the moment error errM so as to calculate the on-virtual-surface external force action point correction amount $\Delta$rpc_i of each virtual surface. In this case, the pseudo inverse matrix Jinv is determined such that, for example, the mean value of the squared values or the absolute values of $\Delta$rpc_i corresponding to each virtual surface is minimized.

Alternatively, for example, $\Delta$rpc_i corresponding to each virtual surface may be weighted beforehand according to the area of the existence permissible region of the external force action point in a surface to be contacted corresponding to each virtual surface, and the pseudo inverse matrix Jinv may be determined such that the weighted mean value of the squared values or the absolute values of $\Delta$rpc_i corresponding to each virtual surface is minimized.

Subsequently, the external force target generator 27 carries out the processing in S27. In this step S27, the external force target generator 27 determines whether the position of the on-virtual-surface external force action point (Irp_i+$\Delta$rpc_i) after having been corrected by $\Delta$rpc_i, which has been determined in S25, from the position of a provisional on-virtual-surface external force action point Irp_i in every virtual surface satisfies an external force action point existence region condition.

Here, the external force action point existence region condition is a condition that the position of the on-virtual-surface external force action point of each virtual surface after the correction based on $\Delta$rpc_i exists in the existence permissible region on the virtual surface corresponding to the existence permissible region of the external force action point of each surface to be contacted at the current time generated by the basic gait element generator 25 (the region obtained by projecting the existence permissible region of the external force action point on the surface to be contacted onto a virtual surface). In this case, the existence permissible region of an external force action point on a surface to be contacted is projected onto a virtual surface in the same manner as that in the case where the external force action point on the surface to be contacted is projected onto a virtual surface, as illustrated in FIG. 12.

The external force action point existence region condition is equivalent to a condition that the point obtained by inversely projecting the on-virtual-surface external force action point on each virtual surface, which has been corrected by $\Delta$rpc_i, onto the surface to be contacted corresponding to the virtual surface exists in the existence permissible region of the external force action point on the surface to be contacted.

If the determination result in S27 is affirmative, then the moment error errM can be canceled simply by correcting the position of the external force action point of each virtual surface from the provisional on-virtual-surface external force action point (subsequently correcting the position of the external force action point of each surface to be contacted from the provisional external force action point) without the need for correcting the required virtual surface translational force of each virtual surface determined by the processing up to S15.

Hence, in this case, the external force target generator 27 carries out the processing in S29 and terminates the processing of the flowcharts in FIG. 7 to FIG. 9 at current time. In the processing of S29, the external force target generator 27 determines a desired external force to be applied to the robot 1 from each surface to be contacted and a desired external force action point at current time.

More specifically, the external force target generator 27 converts the required virtual surface translational force (N_i, F_i) in each virtual surface determined by the processing up to S15 into the translational force to be applied to the robot 1 from a surface to be contacted corresponding to the virtual surface on the basis of the posture difference between the virtual surface and the surface to be contacted corresponding thereto, and determines the converted translational force as the desired value of the translational external force, which constitutes the desired external force.

In this case, the aforesaid conversion for each virtual surface is implemented, for example, as described below. The external force target generator 27 calculates a rotational transform matrix R$\theta$ for converting the posture (the direction of a normal vector) of each virtual surface into the posture (the direction of a normal vector) of the surface to be contacted corresponding to the virtual surface on the basis of the posture difference between the virtual surface and the surface to be contacted. Then, the external force target generator 27 multiplies the rotational transform matrix R$\theta$ by the required virtual surface translational force (vector) thereby to convert the required virtual surface translational force into the desired value of a translational external force applied from the surface to be contacted to the robot 1.

According to the present embodiment, therefore, the desired value (the desired translational force) of a translational external force that should be applied from each surface to be contacted to the robot 1 is determined as a translational external force constituted of the virtual surface normal force component N_i and the virtual surface frictional force component F_i in a virtual surface corresponding to the surface to be contacted, and a normal force component (a component perpendicular to a surface to be contacted) and a frictional force component (a component parallel to a surface to be contacted), which share the same magnitude.

Further, the external force target generator 27 determines the $\Delta$rpc_i, which has been determined in S25, as the moment compensation amount. Then, the external force target generator 27 determines the point that is obtained by inversely projecting the on-virtual-surface external force action point on each virtual surface, which has been corrected by $\Delta$rpc_i, onto the surface to be contacted corresponding to the virtual surface (in the present embodiment, a point at which a straight line which passes a corrected on-virtual-surface external force action point and which is perpendicular to the virtual surface intersects with the surface to be contacted corresponding to the virtual surface) as the desired external force action point on the surface to be contacted.

In the processing of S29, the desired value of the twisting force (the desired twisting force) of each surface to be contacted, which is one of the constituent elements of a desired external force, is set to zero on any surface to be contacted.

Meanwhile, if the determination result in S27 described above is negative, then the on-virtual-surface external force action point correction amount $\Delta$rpc_i in each virtual surface for canceling the moment error errM must be restricted so as to satisfy the aforesaid external force action point existence region condition.

Subsequently, therefore, the external force target generator 27 carries out the processing in S31. In this step S31, the external force target generator 27 determines, as the first compensation amount, the on-virtual-surface external force action point restricted correction amount $\Delta rpc\_lim\_i$ obtained by restricting the on-virtual-surface external force action point correction amount $\Delta rpc\_i$ in each virtual surface such that the external force action point existence region condition is satisfied.

In this case, for a virtual surface that satisfies the external force action point existence region condition, the correction amount $\Delta rpc\_i$ determined in S25 is directly determined as the on-virtual-surface external force action point restricted correction amount $\Delta rpc\_lim\_i$.

Meanwhile, for a virtual surface that does not satisfy the external force action point existence region condition, the external force target generator 27 determines the on-virtual-surface external force action point restricted correction amount $\Delta rpc\_lim\_i$ as described below.

Figure 13:
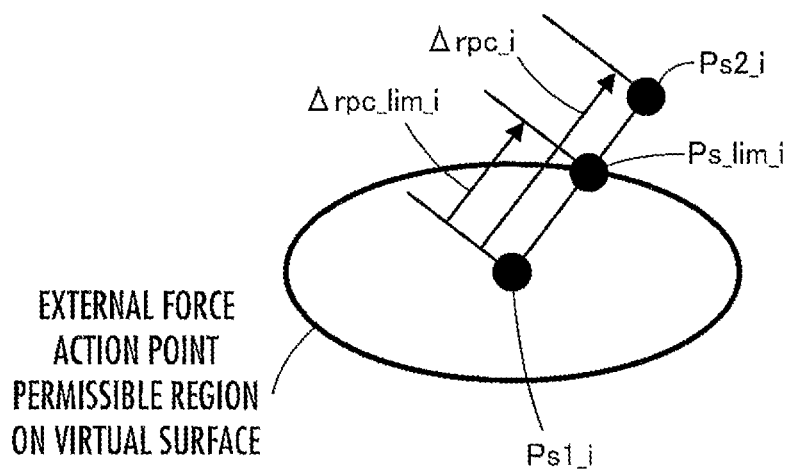
FIG. 13 is a diagram for describing the processing in S25 of FIG. 8.

Referring to FIG. 13, the on-virtual-surface external force action point before a correction (the point obtained by projecting a provisional external force action point on a surface to be contacted onto a virtual surface) is denoted by Ps1_i, and the point obtained by correcting the on-virtual-surface external force action point Ps1_i before the correction by using the on-virtual-surface external force action point correction amount $\Delta rpc\_i$ determined in S25 is denoted by Ps2_i. In this case, for a virtual surface that does not satisfy the external force action point existence region condition, the on-virtual-surface external force action point Ps2_i after a correction will deviate from the external force action point permissible region on a virtual surface, as illustrated.

In FIG. 13, for the convenience of illustration, the external force action point permissible region on a virtual surface is illustrated as a simple elliptical region. Alternatively, however, the region may of course have another shape.

At this time, the external force target generator 27 determines the on-virtual-surface external force action point restricted correction amount $\Delta rpc\_lim\_i$ such that the point obtained by correcting the point Ps1_i by the on-virtual-surface external force action point restricted correction amount $\Delta rpc\_lim\_i$ coincides with the point Ps_lim_i that exists on the boundary of the external force action point permissible region on a virtual surface on a line segment connecting, for example, the point Ps1_i before a correction and the point Ps2_i, which has been corrected by $\Delta rpc\_i$.

Instead of determining $\Delta rpc\_lim\_i$ as described above, for example, the on-virtual-surface external force action point restricted correction amount $\Delta rpc\_lim\_i$ may be determined such that the point obtained by correcting the point Ps1_i by the on-virtual-surface external force action point restricted correction amount $\Delta rpc\_lim\_i$ coincides with a point closest to the point Ps2_i, which has been corrected by using $\Delta rpc\_i$ (the point with a smallest distance from the point Ps2_i), out of the points on the boundary of the on-virtual-surface external force action point permissible region.

In the following description, the external force action point on each virtual surface that has been corrected using the on-virtual-surface external force action point restricted correction amount $\Delta rpc\_lim\_i$ determined in S31 as described above is referred to as the on-virtual-surface restricted corrected external force action point.

After carrying out the processing in S31 as described above, the external force target generator 27 carries out the processing in S33. In this step S33, the external force target generator 27 calculates a remaining error component errM' in the moment error errM as an error component that cannot be canceled by the on-virtual-surface external force action point restricted correction amount $\Delta rpc\_lim\_i$ in each virtual surface determined in S29.

More specifically, the external force target generator 27 calculates the on-virtual-surface external force action point correction error $\Delta rpc\_err\_i$, which is the difference between the on-virtual-surface external force action point correction amount $\Delta rpc\_i$ before restriction and the on-virtual-surface external force action point restricted correction amount $\Delta rpc\_lim\_i$ ($=\Delta rpc\_i - \Delta rpc\_lim\_i$). Then, the external force target generator 27 calculates the remaining error component errM' according to the following expression 09 obtained by replacing $\Delta rp\_i$ in expression 05 above by $\Delta rpc\_err\_i$.

$$errM'=\Sigma(\Delta rpc\_err\_i*(Ni+Fi)+\Delta Poff\_i*F\_i) \quad \text{Expression 09}$$

In this case, $\Delta Poff\_i$ in expression 09 is a value determined on the basis of $\Delta rpc\_err\_i$ and determined as the value of $\Delta Poff\_i$ when $\Delta rp\_i = \Delta rpc\_err\_i$ applies according to a relationship between $\Delta Poff\_i$ and $\Delta rp\_i$ in the above expression 05.

Alternatively, for example, a moment change amount $\Delta Ms$ calculated according to an expression obtained by replacing $\Delta rp\_i$ in the above expression 05 by $\Delta rpc\_lim\_i$, that is, the change amount of a moment about a moment reference point that occurs when the position of the external force action point on each virtual surface is corrected by $\Delta rpc\_lim\_i$ from a provisional on-virtual-surface external force action point may be calculated, and the change amount of the moment may be subtracted from the moment error errM thereby to calculate the remaining error component errM'. In this case, $\Delta Poff\_i$ may be determined as the value of $\Delta Poff\_i$ when $\Delta rp\_i = i\_\Delta rpc\_lim\_i$ applies according to a relationship between $\Delta Poff\_i$ and $\Delta rp\_i$ in the above expression 05.

After calculating the remaining error component errM' in errM as described above, the external force target generator 27 sequentially carries out the processing in S35 and S37 illustrated in FIG. 9, thereby determining the virtual surface frictional force component correction amount $f\_i$ as the second compensation amount and a virtual surface twisting force $R\_i$ as the third compensation amount.

In S35, the Jacobian matrix Jfr is calculated. The Jacobian matrix Jfr represents the relationship among a moment Mfr, $f\_i$ and $R\_i$ by the following expression 11. The moment Mfr is generated about the moment reference point by the virtual surface frictional force component correction amount $f\_i$ and the virtual surface twisting force $R\_i$ when $f\_i$ and $R\_i$ of arbitrary values are applied to each virtual surface (each virtual surface set in S01), that is, when $f\_i$ and $R\_i$ are additionally applied to the on-virtual-surface restricted corrected external force action point that has been corrected using $\Delta rpc\_lim\_i$.

$$Mfr = Jfr*(f\_i\ R\_i)^T \quad \text{Expression 11}$$

In this expression 11, $(f\_i\ R\_i)^T$ denotes a vertical vector having $f\_i$ and $R\_i$ as the components thereof. Here, the virtual surface frictional force component correction amount $f\_i$ is a moment compensation amount that should be determined such that the total sum (resultant force) thereof becomes zero.

Hence, in the virtual surface frictional force component correction amount $f\_i$, the virtual surface frictional force component correction amount corresponding to any one virtual surface is uniquely determined as a translational force obtained by reversing the sign of the total sum of the remaining virtual surface frictional force component correction amounts. For this reason, f_i as a component of the vertical vector $(f\_i\ R\_i)^T$ in expression 11 is obtained by removing f_i corresponding to any one virtual surface (hereinafter denoted by f_i0). Further, taking f_i0 as a translational force obtained by reversing the sign of the total sum of the remaining f_i's, the Jacobian matrix Jfr is determined such that a moment component about a moment reference point attributable to the translational force will be included in Mfr calculated by the computation of the right side of expression 11.

Subsequently, in S37, the external force target generator 27 calculates the set $(f\_i\ R\_i)^T$ of f_i and R_i that satisfies the relationship of expression 11 when Mfr of expression 11 coincides with the remaining error component errM'.

Here, the Jacobian matrix Jfr in expression 11 is usually not a regular matrix, so that the external force target generator 27 calculates a pseudo inverse matrix Jfr_inv of the Jacobian matrix Jfr determined in S37 and multiplies the pseudo inverse matrix Jfr_inv by the remaining error component errM' so as to calculate the set of f_i and R_i. In this case, the pseudo inverse matrix Jfr_inv is determined such that, for example, the mean value of the squared values or absolute values of the f_i's and R_i's constituting the vertical vector $(f\_i\ R\_i)^T$ of expression 11 is minimized. Incidentally, the aforesaid f_i0 is determined as the value having a sign reversed from the sign of the total sum of f_i's calculated as described above.

Supplementarily, the pseudo inverse matrix Jfr_inv may be determined such that, for example, the weighted mean value of the squared values or absolute values of f_i's and R_i's, respectively, constituting the vertical vector $(f\_i\ R\_i)^T$ of expression 11 is minimized. For example, the weight for each f_i is set such that, for a virtual surface having a higher frictional force upper limit value, the magnitude of f_i in the virtual surface relatively increases, and the Jfr_inv may be determined such that the weighted mean value using the weight is minimized.

As another alternative, for example, in the case where the virtual surface set in S01 includes the opposing virtual surfaces Sna and Snb, the virtual surface frictional force component correction amount f_na or f_nb in the opposing virtual surface Sna or Snb, whichever has a smaller magnitude of the virtual surface normal force component N_i, may be set to zero.

Further, it is not always necessary to calculate both f_i and R_i, and one of them may be set to zero.

In the case where the gait generator 23 generates the wall climbing gait, the processing in the aforesaid S35 and S37 is carried out, for example, as described below.

For instance, in the motional state illustrated in FIG. 11(b), a case where the remaining error component errM' of the moment error errM is assumed. Further, the position vectors (the position vectors relative to moment reference points) of the external force action points after having been subjected to on-virtual-surface restricted corrections in the virtual surfaces S3a, S2a, and S2b corresponding to the floor surface FL and the wall surfaces WL1 and WL2, respectively, are denoted by rp_3a, rp_2a and rp_2b, respectively. At this time, the relationship between the on-virtual-surface frictional force component correction amounts f_3a, f_2a, f_2b in the virtual surfaces S3a, S2a, S2b and the virtual surface twisting forces R_3a, R_2a, R_2b and the moment Mfr generated about the moment reference point by these f_3a, f_2a, f_2b, R_3a, R_2a, and R_2b is indicated by the following expression 11a.

$$Mfr = rp\_3a * f\_3a + rp\_2a * f\_2a + rp\_2b * f\_2b + R\_3a + R\_2a + R\_2b \qquad \text{Expression 11a}$$

In expression 11a, (rp_3a*f_3a), (rp_2a*f_2a), and (rp_2b*f_2b), respectively, denote vector products.

In this case, regarding the virtual surface frictional force component correction amount, f_3a+f_2a+f_2b=0 applies, leading to f_2b=−(f_3a+f_2a). Accordingly, expression 11a can be rewritten to the following expression 11b, which does not include, for example, f_2b.

$$Mfr = (rp\_3a - rp\_2b) * f\_3a + (rp\_2a - rp\_2b) * f\_2a + R\_3a + R\_2a + R\_2b \qquad \text{Expression 11b}$$

Therefore, in S35, the Jacobian matrix Jfr in the aforesaid expression 11 is determined by denoting the right side of the expression 11b by a coordinate component.

Then, in S37, the pseudo inverse matrix Jfr_inv of the Jacobian matrix Jfr is calculated as described above, and the determined Jfr_inv is multiplied by the remaining error component errM' to calculate f_3a, f_2a, R_3a, R_2a, and R_2b. Further, f_3b is calculated from f_3a and f_2a according to the relationship f_2b=−(f_3a+f_2a).

Supplementarily, for example, at the time after the motional state illustrated in FIG. 3(c) in the wall climbing gait, that is, in the situation wherein there are only two virtual surfaces, namely, the opposing virtual surfaces S2a and S2b, the Jacobian matrix Jfr can be determined in the same manner as that described above on the basis of the expression obtained by removing (rp_3a*f_3a) and R_3a from the right side of expression 11a and the relationship denoted by f_2a+f_2b=0.

If the processing up to S37 described above causes the determination result in S27 to be negative, then a set of a required virtual surface translational force (a required virtual surface translational force that has been corrected on the basis of f_i), an on-virtual-surface external force action point (an on-virtual-surface external force action point that has been corrected on the basis of Δrpc_lim_i), and an on-virtual-surface twisting force R_i, which set satisfies the first A requirement and the first B requirement and also permits a rotational motion (a rotational motion that changes an angular momentum about the moment reference point) of the entire robot 1 in the desired motion of the robot 1 will be substantially determined. In this case, however, the required virtual surface translational force is corrected on the basis of f_i, so that the virtual surface frictional force component of the corrected required virtual surface translational force does not necessarily satisfy the second requirement. Further, the on-virtual-surface twisting force R_i requires the frictional force between the virtual surface to which the twisting force R_i is to be applied and the robot 1, i.e., the frictional force between the surface to be contacted corresponding to the virtual surface and the robot 1.

Therefore, after the virtual surface frictional force component correction amount f_i and the virtual surface twisting force R_i are determined as described above, the external force target generator 27 subsequently carries out the determination processing in S39. In this step S39, the external force target generator 27 determines whether, in each virtual surface, the virtual surface frictional force component F_i that has been corrected on the basis of f_i (the frictional force component of the total sum of F_i and f_i determined by the processing up to S15) satisfies the second requirement and also satisfies a fourth requirement that the magnitude of R_i be a predetermined upper limit value or less set according to the magnitude of the virtual surface normal force component N_i.

Here, the predetermined upper limit value in the fourth requirement is a value set for each virtual surface as an upper limit value of the magnitude of a twisting force that can be generated by a frictional force of a virtual surface to which R_i is applied. According to the present embodiment, the upper limit value (hereinafter referred to as the twisting force upper limit value) is set to a value obtained by multiplying a coefficient µr_i set for each virtual surface on the basis of the environmental information related to the properties of the surface to be contacted corresponding to each virtual surface (hereinafter referred to as the twisting force coefficient) by the magnitude |N_i| of the virtual surface normal force component N_i (=µr_i*|N_i|).

In the present embodiment, before the processing by the external force target generator 27 begins, the twisting force coefficients of the virtual surfaces associated with individual surfaces to be contacted are determined beforehand on the basis of the environmental information and retained in a memory. Further, in S39, the twisting force coefficient in a virtual surface to which R_i is to be applied is selected from among the twisting force coefficients retained in the memory.

Supplementarily, the twisting force coefficient µr_i in each virtual surface may be set such that the twisting force coefficient µr_i is determined at each time of the desired gait, considering not only the environmental information on the properties of a surface to be contacted corresponding to the virtual surface but also the magnitude of the virtual surface frictional force component F_i in the virtual surface and the size of the surface of contact between the robot 1 and the surface to be contacted.

If the determination result in S39 is affirmative, the external force target generator 27 carries out the processing in S41 and terminates the processing illustrated in the flowcharts of FIG. 7 to FIG. 9 at the current time. In the processing in this step S41, the external force target generator 27 determines the desired external force and the desired external force action point of the robot 1 from each surface to be contacted at the current time.

More specifically, the external force target generator 27 determines the required virtual surface translational force in each virtual surface at the current time on the basis of the required virtual surface translational forces (N_i, F_i) in each virtual surface determined by the processing up to S15 and the virtual surface frictional force component correction amount f_i determined by the processing in S37. In this case, the virtual surface normal force component N_i determined by the processing up to S15 is directly determined as the virtual surface normal force component in the virtual surface and the frictional force component obtained by adding the virtual surface frictional force component correction amount f_i to the virtual surface frictional force component F_i determined by the processing up to S15 is determined as the virtual surface frictional force component in the virtual surface.

Regarding the virtual surface in which f_i=0 applies, the required virtual surface translational force (N_i, F_i) determined by the processing up to S15 will be eventually determined directly as the required virtual surface translational force in the virtual surface.

Further, the external force target generator 27 determines the virtual surface twisting force R_i determined by the processing in S37 as the twisting force in the virtual surface corresponding to the R_i.

Subsequently, the external force target generator 27 converts the required virtual surface translational force in each virtual surface determined as described above into a translational force to be applied to the robot 1 from the surface to be contacted on the basis of the posture difference between the virtual surface and the surface to be contacted corresponding thereto, and then determines the translational force as the desired value of the translational external force (the desired translational force), which is a constituent element of the desired external force. Similarly, the external force target generator 27 converts the virtual surface twisting force in each virtual surface into a twisting force to be applied to the robot 1 from the surface to be contacted corresponding to the virtual surface and determines the converted twisting force as the desired value of a twisting force (the desired twisting force), which is a constituent element of the desired external force.

Incidentally, the aforesaid conversion is the same conversion as that described in relation to the processing in S29 of FIG. 8, and carried out using the rotational transform matrix Rθ determined on the basis of the posture difference.

Further, as with the case of the processing in S29, the external force target generator 27 determines the point obtained by inversely projecting the external force action point on each virtual surface, which has been corrected on the basis of the on-virtual-surface external force action point restricted correction amount Δrpc_lim_i determined in S31, onto a surface to be contacted corresponding to the virtual surface as the desired external force action point on the surface to be contacted.

Meanwhile, in the case where the determination result in S39 is negative, that is, if there is a virtual surface that does not satisfy the second requirement or the fourth requirement, then the frictional force in the virtual surface would be inadequate for accomplishing a rotational motion in the desired motion of the robot 1. In this case, the external force target generator 27 subsequently carries out the processing in S43. In this step S43, the external force target generator 27 determines whether the virtual surface that does not satisfy the second requirement or the fourth requirement in the determination processing in S39 is the opposing virtual surface Sna or Snb (n=1 or 2 or 3).

In the situation wherein the determination result in S43 is negative, the magnitude of the virtual surface normal force component in the virtual surface that does not satisfy the second requirement or the fourth requirement cannot be increased while satisfying the first A requirement, which means that the magnitude of the virtual surface frictional force component in the virtual surface cannot be increased at the frictional force upper limit value or less. In this case, therefore, the external force target generator 27 decides in S47 that the desired motion is inappropriate (or the desired motion needs to be corrected) and interrupts the processing illustrated in the flowcharts of FIG. 7 to FIG. 9. In this case, the external force target generator 27 outputs error information to the basic gait element generator 25. Then, the basic gait element generator 25 creates the desired motion again on the basis of the error information.

Thus, in the present embodiment, if the processing up to S37 causes the determination result in S27 to be negative, then the set of the required virtual surface translational force (the required virtual surface translational force that has been corrected on the basis of f_i), the on-virtual-surface external force action point (the on-virtual-surface external force action point that has been corrected on the basis of Δrpc_lim_i), and the on-virtual-surface twisting force R_i, which set satisfies the first A requirement and the first B requirement and which permits the rotational motion of the entire robot 1 in the desired motion of the robot 1, is determined and then the desired motion is evaluated by the determination processing in S39 and S43. If the determination results in these steps S39 and S43 are both negative, then the desired motion is evaluated as inappropriate.

Meanwhile, in the situation wherein the determination result in S43 is affirmative, the magnitude of the virtual surface normal force components N_na and N_nb of the opposing virtual surfaces Sna and Snb (n=1 or 2 or 3) which include a virtual surface that does not satisfy the second requirement or the fourth requirement and which are parallel to each other can be increased while satisfying the first A requirement (while maintaining N_na+N_nb constant).

If the determination result in S43 is affirmative, then the external force target generator 27 subsequently carries out the processing in S45. In this step S45, the external force target generator 27 determines the increment IN_n of the magnitude of each of the virtual surface normal force components N_na and N_nb of the opposing virtual surfaces Sna and Snb such that the second requirement and the fourth requirement are satisfied.

More specifically, the external force target generator 27 calculates, as the candidate value of the increment IN_n, the value obtained by dividing the result, which is obtained by subtracting the frictional force upper limit value used in the determination processing in S39 ($=\mu\_i*|N\_i|$) from the magnitude of the virtual surface frictional force component F_i that has been corrected on the basis of the virtual surface frictional force component correction amount f_i, by the frictional coefficient $\mu\_i$ ($=(|F\_i|-\mu\_i*|N\_i|)/\mu\_i$) in each of the opposing virtual surfaces Sna and Snb including a virtual surface that does not satisfy the second requirement (hereinafter, the candidate value of IN_n calculated as described above will be referred to as the frictional force component compensation candidate value). In this case, the frictional force component compensation candidate value IN_n is calculated for each of the opposing virtual surfaces Sna and Snb including a virtual surface that does not satisfy the second requirement.

For example, in the case where the gait generator 23 generates the wall climbing gait, if the determination result in S39 indicates that one or both of the opposing virtual surfaces S2a and S2b corresponding to the wall surfaces WL1 and WL2 do not satisfy the second requirement, then the frictional force component compensation candidate values of IN_2, namely, $((|F\_2a|-\mu\_2a*|N\_2a|)/\mu\_2a$, $(|F\_2b|-\mu\_2b*|N\_2b|)/\mu\_2b)$, are calculated in these opposing virtual surfaces S2a and S2b.

Further, the external force target generator 27 calculates, as the candidate value of the increment IN_n, the value obtained by dividing the result, which is obtained by subtracting the twisting force upper limit value used in the determination processing in S39 ($=\mu r\_i*|N\_i|$) from the magnitude of the virtual surface twisting force R_i, by the twisting force coefficient $\mu r\_i$ ($=(|R\_i|-\mu r\_i*|N\_i|)/\mu r\_i$) in each of the opposing virtual surfaces Sna and Snb including a virtual surface that does not satisfy the fourth requirement (hereinafter, the candidate value of IN_n calculated as described above will be referred to as the twisting force compensation candidate value). In this case, as with the frictional force component compensation candidate values, the twisting force compensation candidate value IN_n is calculated for each of the opposing virtual surfaces Sna and Snb including a virtual surface that does not satisfy the fourth requirement.

Subsequently, for the opposing virtual surfaces Sna and Snb, for which only the frictional force component compensation candidate values out of the frictional force component compensation candidate values and the twisting force compensation candidate values have been calculated, the external force target generator 27 determines the frictional force component compensation candidate value of the opposing virtual surface Sna or Snb, whichever frictional force component compensation candidate value is larger, as the increment IN_n of the magnitude of the virtual surface normal force components N_na and N_nb in the opposing virtual surfaces Sna and Snb.

Further, for the opposing virtual surfaces Sna and Snb, for which only the twisting force compensation candidate values out of the frictional force component compensation candidate values and the twisting force compensation candidate values have been calculated, the external force target generator 27 determines the twisting force compensation candidate value of the opposing virtual surface Sna or Snb, whichever twisting force compensation candidate value is larger, as the increment IN_n of the magnitude of the virtual surface normal force components N_na and N_nb in the opposing virtual surfaces Sna and Snb.

Further, for the opposing virtual surfaces Sna and Snb for which both the frictional force component compensation candidate values and the twisting force compensation candidate values have been calculated, the external force target generator 27 determines a largest candidate value of the frictional force component compensation candidate values and the twisting force compensation candidate values of the opposing virtual surfaces Sna and Snb, respectively, as the increment IN_n of the virtual surface normal force components in the opposing virtual surfaces.

Here, when the virtual surface normal force components N_na and N_nb in the opposing virtual surfaces Sna and Snb are increased by the increment IN_n determined as described above in S45, the internal force in a direction that is orthogonal to the opposing virtual surfaces Sna and Snb increases. In addition, as N_na and N_nb increase, the moment generated about the moment reference point usually undesirably changes. According to the present embodiment, therefore, the external force target generator 27 carries out the processing from S13 in FIG. 7 again after carrying out the processing in S45.

This completes the detailed description of the processing carried out by the external force target generator 27 in the present embodiment.

In the processing by the external force target generator 27 described above, first, the processing from S05 to S15 provisionally determines the required virtual surface translational forces (N_i, F_i) necessary for accomplishing a translational motion of the entire robot 1 in the desired motion of the robot 1. In this case, the required virtual surface translational forces (N_i, F_i) are provisionally determined under the guideline that the first requirement (the first A requirement and the first B requirement), the second requirement, and the third requirement are satisfied, without considering the moment generated about the moment reference point. In this case, the mutual posture relationship between the virtual surfaces is established beforehand, so that the provisional values of the required virtual surface translational forces (N_i, F_i) that enable the translational motion of the entire robot 1 to be accomplished can be efficiently determined by a simple algorithm.

Further, if the determination results in both S07 and S09 are negative or if the determination results in S07, S09, and S15 are negative, affirmative, and negative, respectively, then it is evaluated that the desired motion generated by the basic gait element generator 25 is inappropriate, and the processing by the external force target generator 27 is interrupted. Thus, with a simple algorithm, a desired motion that tends to lead to an excessive frictional force between a surface to be contacted and the robot 1 or a desired motion that tends to lead to an excessive internal force of the robot 1 can be efficiently evaluated as inappropriate for implementing a translational motion of the entire robot 1 in a desired motion. This makes it possible to restrain wasteful arithmetic processing from being executed in generating a desired gait.

Further, after determining the provisional values of the required virtual surface translational forces (N_i, F_i) that enable a translational motion of the entire robot 1 to be accomplished as described above, the processing from S19 to S37 (except for the processing in S29) determines the on-virtual-surface external force action point correction amount Δrpc_i as the additional manipulated variable (the moment compensation amount) for implementing a rotational motion (a rotational motion that changes the angular momentum about the moment reference point) of the entire robot 1, or determines the set of the on-virtual-surface external force action point restricted correction amount Δrpc_lim_i, the virtual surface frictional force component correction amount Δf_i, and the virtual surface twisting force R_i. These moment compensation amounts are manipulated variables that will not change the resultant force of the required on-virtual-surface translational forces before and after an object to be corrected is corrected using the moment compensation amounts.

Thus, simply combining the provisional values of the required virtual surface translational forces (N_i, F_i) determined by the processing in S05 to S15 and the moment compensation amounts determined by the processing in S19 to S37 (except for the processing in S29) makes it possible to determine the set of the required on-virtual-surface translational force, the on-virtual-surface twisting force, and the on-virtual-surface external force action point (including the case where the on-virtual-surface twisting force is zero) that allow both the translational motion and the rotational motion of the entire robot 1 to be properly accomplished. Then, the set of the required on-virtual-surface translational force, the on-virtual-surface twisting force, and the on-virtual-surface external force action point makes it possible to efficiently and properly determine a desired external force (a desired translational force and a desired twisting force) to be applied to the robot 1 from surfaces to be contacted and a desired external force action point.

In this case, if the determination results in S39 and S43 are both negative, then the desired motion generated by the basic gait element generator 25 is evaluated as inappropriate and the processing by the external force target generator 27 is interrupted. This makes it possible to efficiently evaluated that a desired motion which tends to lead to an excessive frictional force between a surface to be contacted and the robot 1 is inappropriate in achieving a translational motion and a rotational motion of the entire robot 1 in a desired motion. This in turn makes it possible to restrain wasteful arithmetic processing from being carried out in generating a desired motion.

In the present embodiment, a final required virtual surface translational force (the set of the virtual surface normal force component N_i and the virtual surface frictional force component F_i) in each virtual surface corresponding to each surface to be contacted at the current time is determined to eventually satisfy the first A requirement, the first B requirement, the second requirement, and the third requirement except for the case where the processing by the external force target generator 27 causes any one of the determination results in S09, S15 and S43 to be negative (in the case where a desired motion is inappropriate).

Further, the desired value of a translational external force (a desired translational force) in a surface to be contacted corresponding to each virtual surface is determined such that the normal force component (the component perpendicular to a surface to be contacted) and the frictional force component (the component parallel to a surface to be contacted) thereof coincide with the virtual surface normal force component N_i and the virtual surface frictional force component F_i, respectively, in the virtual surface.

Hence, the desired translational force applied from each surface to be contacted to the robot 1 can be determined such that the required total translational external force is attained by the resultant force of the normal force components of the desired translational forces in the individual surfaces to be contacted as much as possible, while the frictional force component of the desired translational force is minimized as much as possible within the limit of the magnitude of the frictional force that can be generated in the surface to be contacted.

In particular, according to the present embodiment, the on-virtual-surface external force action point correction amount Δrpc_i (the first compensation amount) is preferentially determined as the moment compensation amount. This means that if the determination result in S27 is affirmative, then the moment compensation amount includes neither the virtual surface frictional force component correction amount f_i nor the virtual surface twisting force R_i. Thus, the magnitude of the virtual surface frictional force component F_i in each virtual surface can be controlled to a minimum within a range in which the first A requirement, the first B requirement, the second requirement, and the third requirement are satisfied. As a result, the magnitude of the frictional force component of the desired translational force in each surface to be contacted can be also controlled to a minimum or approximated to a minimum.

Further, if the virtual surfaces set in S01 include the opposing virtual surfaces Sna and Snb, in the case where the determination result in S27 is affirmative and also in the case where the determination result in S39 is affirmative, the magnitude of the internal force generated in the robot 1 between the opposing virtual surfaces Sna and Snb (the magnitude of N_na or N_nb, whichever is smaller) can be controlled to a minimum within a range in which the first A requirement, the first B requirement, the second requirement, and the third requirement are satisfied. Accordingly, the magnitude of the internal force generated in the robot 1 between the two surfaces to be contacted corresponding to the opposing virtual surfaces Sna and Snb (e.g., the wall surfaces WL1 and WL2 in the wall climbing gait) can be also controlled to a minimum or approximated to a minimum. Thus, the desired translational forces in the surfaces to be contacted including the two surfaces to be contacted corresponding to the opposing virtual surfaces Sna and Snb can be determined such that the share of the motive power (the driving torque in the present embodiment) that can be generated by the joint actuators 11 of the robot 1, which share is necessary for generating the internal force will be reduced.

Here, a supplementary description will be given of the relationship of correspondence between the present embodiment described above and the present invention. In the present embodiment, the external force target generator 27 of the gait generator 23 of the control unit 21 functions as the desired motion evaluation apparatus in the present invention.

In the processing carried out by the external force target generator 27, the processing in S01 implements the virtual surface group setting unit in the present invention.

Further, the processing in S03 implements the required total translational external force determining unit in the present invention.

Further, the processing in S05 implements the required virtual surface translational force calculating unit calculating the required virtual surface translational force so as to satisfy the first A requirement and the first B requirement.

Then, in this case, the processing in S07 to S17 implements the desired motion evaluating unit. In this case, the determination processing in S07 implements the first determining unit in the present invention. Further, the determination processing in S09 implements the second determining unit in the present invention. Further, the determination processing in S15 implements the third determining unit in the present invention.

Viewed from another point, the processing in S05 to S37 (except for the case where the determination result in S09 or S15 is negative) in the present embodiment implements the required virtual surface translational force calculating unit calculating the required virtual surface translational force so as to satisfy at least the first A requirement and the first B requirement (more specifically, to enable a rotational motion of the entire robot 1 in the desired motion of the robot 1 to be achieved, while satisfying the first A requirement, and the first B requirement).

Then, in this case, the processing in S39 to S45 following S37 as well as S13 to S17 implements the desired motion evaluating unit. In this case, the determination processing in S39 implements the first determining unit in the present invention. Further, the determination processing in S43 implements the second determining unit in the present invention. Further, the determination processing in S15 implements the third determining unit in the present invention.

Further, viewed from still another point, the processing in S05 to S13 (except for the case where the determination result in S09 is negative) or the processing in S05 to S45 (except for the case where the determination result in S09, S15, or S43 is negative) and the subsequent processing in S13 in the present embodiment implement the required virtual surface translational force calculating unit calculating the required virtual surface translational force so as to satisfy the first A requirement, the first B requirement, and the second requirement.

Then, in this case, the processing in S15 and S17 implements the desired motion evaluating unit in the present invention, and the determination processing in S15 implements the fourth determining unit in the present invention.

Second Embodiment

Figure 14:
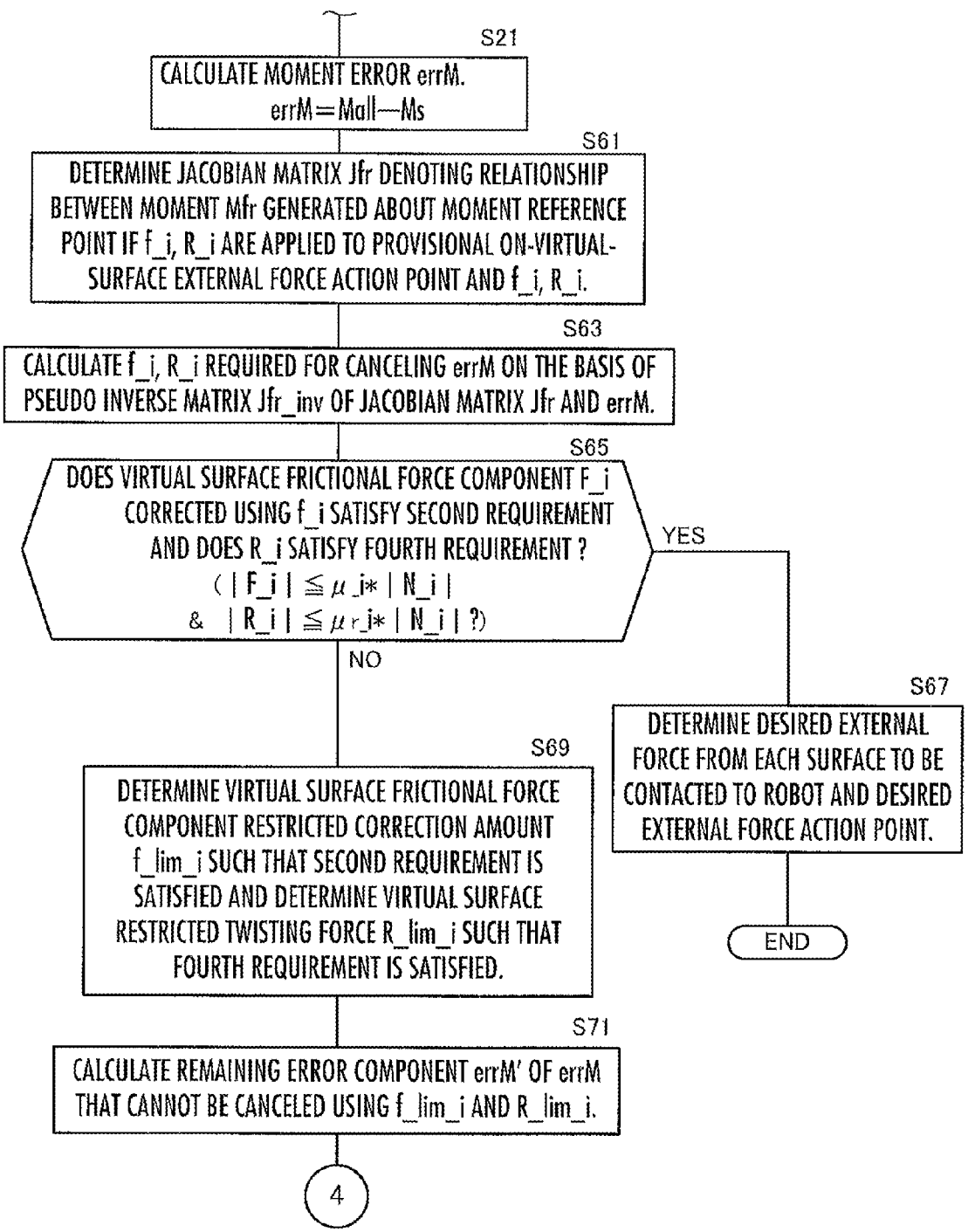
FIG. 14 is a flowchart illustrating the processing in a second embodiment by the external force target generator shown in FIG. 2.

A second embodiment of the present invention will now be described with reference to FIG. 14 and FIG. 15. The present embodiment differs from the first embodiment only partly in the processing carried out by the external force target generator 27, so that the description of the same aspects as those of the first embodiment will be omitted.

In the first embodiment, the on-virtual-surface external force action point correction amount as the first compensation amount has been preferentially determined in the processing for determining the moment compensation amount for canceling the moment error errM (the processing in S21 to S37).

However, it is alternately possible to determine, for example, the virtual surface frictional force component correction amount f_i serving as the second compensation amount or the virtual surface twisting force R_i serving as the third compensation amount in preference to the on-virtual-surface external force action point correction amount. The present embodiment illustrates an example wherein the second compensation amount or the third compensation amount is preferentially determined as the moment compensation amount as described above.

According to the present embodiment, the processing in S01 to S21 carried out by an external force target generator 27 is the same as that of the first embodiment. Further, in the present embodiment, the external force target generator 27 executes the processing illustrated by the flowcharts of FIG. 14 and FIG. 15 after the processing in S21 (the processing for calculating the moment error errM).

The external force target generator 27 carries out the processing in S61 after the processing in S21. In this step S61, the external force target generator 27 carries out the same processing as that in S35 described in the first embodiment so as to determine the Jacobian matrix Jfr that denotes the relationship between the virtual surface frictional force component correction amount f_i (the second compensation amount) and the virtual surface twisting force R_i (the third compensation amount) and the moment Mfr generated about the moment reference point by these f_i and R_i according to the aforesaid expression 11. However, in the present embodiment, the provisional on-virtual-surface external force action point (the point obtained by projecting the provisional external force action point on a surface to be contacted determined by the basic gait element generator 25 onto the virtual surface corresponding to the surface to be contacted) is used as the external force action point on each virtual surface to which the f_i and R_i are applied in S61.

Subsequently, the external force target generator 27 carries out the processing in S63. In this step S63, the external force target generator 27 calculates the set of f_i and R_i, namely, $(f\_i\ R\_i)^T$, in the case where Mfr of the aforesaid expression 11 coincides with the moment error errM determined in S21.

In this case, by the same processing as that in S37 in the first embodiment, the external force target generator 27 calculates a pseudo inverse matrix Jfr_inv of the Jacobian matrix Jfr determined in S61, and multiplies the pseudo inverse matrix Jfr_inv by the moment error errM so as to calculate the set of f_i and R_i, namely, $(f\_i\ R\_i)^T$. Thus, the set of f_i and R_i necessary for canceling errM is calculated.

It is not always necessary to calculate both f_i and R_i, and either one thereof may be set to zero.

By the processing up to S63 described above, the set of the required virtual surface translational force (the required virtual surface translational force that has been corrected on the basis of f_i), the on-virtual-surface external force action point (=provisional on-virtual-surface external force action point), and the virtual surface twisting force R_i, which set satisfies the first A requirement and the first B requirement and makes it possible to achieve a rotational motion (a rotational motion that changes the angular momentum about the moment reference point) of the entire robot 1 in the desired motion of the robot 1, is tentatively determined. In this case, however, the required virtual surface translational force is corrected on the basis of f_i, so that the virtual surface frictional force component of the corrected required virtual surface translational force does not necessarily satisfy the second requirement. In addition, the virtual surface twisting force R_i does not necessarily satisfy the fourth requirement described in the first embodiment.

The external force target generator 27, therefore, subsequently carries out the processing in S65. In this step S65, the external force target generator 27 carries out the same determination processing as that in S39 in the first embodiment. More specifically, the external force target generator 27 determines whether the virtual surface frictional force component F_i that has been corrected on the basis of f_i (the frictional force component based on the total sum of F_i and f_i determined by the processing up to S15) satisfies the second requirement and also determines whether the magnitude of R_i satisfies the fourth requirement in each virtual surface.

If the determination results are affirmative, then the external force target generator 27 carries out the processing in S67 and terminates the processing at the current time. In the processing carried out in S67, the external force target generator 27 determines, by the same processing as that in S41 of the first embodiment, the desired external force to be applied to the robot 1 from each surface to be contacted at the current time.

Meanwhile, regarding the desired external force action point of each surface to be contacted, the external force target generator 27 determines the provisional external force action point generated by the basic gait element generator 25 directly as the desired external force action point by the processing in S67 in the present embodiment.

If the determination result in S65 is negative, then the external force target generator 27 carries out the processing in S69. In this step S69, the external force target generator 27 determines the virtual surface frictional force component limited correction amount f_lim_i obtained by restricting the virtual surface frictional force component correction amount f_i such that the second requirement is satisfied and also determines the virtual surface restricted twisting force R_lim_i obtained by restricting the virtual surface twisting force R_i such that the fourth requirement is satisfied.

More specifically, the external force target generator 27 determines f_lim_i such that the virtual surface frictional force component F_i that has been corrected on the basis of f_lim_i is not more than the frictional force upper limit value set according to the virtual surface normal force component Ni determined by the processing up to S15 ($=\mu\_i*|N\_i|$) and also determines the R_lim_i such that the R_lim_i is not more than the twisting force upper limit value set according to the virtual surface normal force component Ni determined by the processing up to S15 ($=\mu r\_i*|N\_i|$).

In this case, the f_lim_i is determined such that the total sum (resultant force) thereof is maintained at zero in addition to satisfying the second requirement.

To be more specific, for example, the f_lim_i is determined such that the value obtained by multiplying the virtual surface frictional force component correction amount f_i in each virtual surface determined in S63 by a certain coefficient k of the same value coincides with the virtual surface frictional force component restricted correction amount f_lim_i. This causes the total sum (the resultant force) of the f_lim_i to become k-fold of the total sum of f_i ($=0$), that is, zero. In this case, the value of the coefficient k is taken as an unknown, and the value of the coefficient k is determined such that the magnitude of the frictional force obtained by adding $k*f\_i$ to the virtual surface frictional force component F_i before a correction, which has been determined by the processing up to S15, i.e., ($=|F\_i+k*f\_i|$), satisfies the second requirement (such that $|F\_i+k*f\_i| \leq \mu\_i*|N\_i|$ applies) in each virtual surface. Then, the f_i in each virtual surface calculated in S63 is multiplied by the determined coefficient k to determine the f_lim_i in each virtual surface.

If the virtual surface frictional force component F_i that has been corrected on the basis of f_i satisfies the second requirement in every virtual surface set in S01, then the value of the coefficient k is set to 1. In this case, therefore, the f_i in each virtual surface calculated in S63 is directly determined as f_lim_i.

The virtual surface restricted twisting force R_lim_i in each virtual surface is determined, for example, as follows. In a virtual surface that does not satisfy the fourth requirement in S65, the virtual surface restricted twisting force R_lim_i is determined such that the magnitude thereof coincides with the twisting force upper limit value ($=\mu r\_i*|N\_i|$). Further, in each virtual surface that satisfies the fourth requirement, the virtual surface twisting force R_i calculated in S63 is determined directly as the virtual surface restricted twisting force R_lim_i.

Alternatively, the virtual surface restricted twisting force R_lim_i in each virtual surface that does not satisfy the fourth requirement may be determined to be a twisting force having a magnitude that is slightly smaller than the twisting force upper limit value.

After determining the virtual surface frictional force component restricted correction amount f_lim_i and the virtual surface restricted twisting force R_lim_i as described above, the external force target generator 27 carries out the processing in S71. In this step S71, the external force target generator 27 calculates a remaining error component errM' of the moment error errM, the remaining error component errM' denoting an error component that cannot be canceled by the f_lim_i and R_lim_i in each virtual surface determined in S69.

More specifically, the external force target generator 27 calculates a difference $\Delta f\_i$ between the virtual surface frictional force component correction amount f_i before being restricted and the virtual surface frictional force component restricted correction amount f_lim_i ($=f\_i-f\_lim\_i$) and also calculates a difference $\Delta R\_i$ between the virtual surface twisting force R_i before being restricted and the virtual surface restricted twisting force R_lim_i ($=R\_i-R\_lim\_i$) in each virtual surface. Then, the external force target generator 27 replaces the components f_i and R_i of the vertical vector $(f\_i\_R\_i)^T$ in the right side of the aforesaid expression 11 by $\Delta f\_i$ and $\Delta R\_i$ corresponding thereto, and calculates the remaining error component errM' according to an expression obtained by replacing the left side of the aforesaid expression 11 by errM'.

Alternatively, the moment generated about a moment reference point when f_lim_i and R_lim_i are applied to a provisional on-virtual-surface external force action point may be calculated, and the obtained moment may be subtracted from the moment error errM thereby to calculate the remaining error component errM'.

Subsequently, the external force target generator 27 carries out the processing in S73 of FIG. 15. In this step S73, the external force target generator 27 calculates a Jacobian matrix J representing the sensitivity of a change in a required virtual surface translational force dependent moment Ms (the Jacobian matrix J in the aforesaid relational expression 07) in response to a change in the position of the on-virtual-surface external force action point (a change from the provisional on-virtual-surface external force action point) by carrying out the same processing as that in S23 of the first embodiment.

Subsequently, the external force target generator 27 carries out the processing in S75. In this step S75, the external force target generator 27 calculates, as a set counterpart of the on-virtual-surface external force action point correction amount $\Delta rpc\_i$ in each virtual surface for canceling errM, a vertical vector ($\Delta rp\_i$) that satisfies the relationship denoted by the aforesaid expression 07 when the $\Delta Ms$ (the change amount of the required virtual surface translational force dependent moment Ms) in expression 07 is set to coincide with the remaining error component errM' calculated in S71 by the same processing as that in S25 in the first embodiment. More specifically, the external force target generator 27 calculates the pseudo inverse matrix Jinv of the Jacobian matrix J determined in S73 by the same processing as that in S25, and multiplies errM' by the Jinv to calculate the set counterpart of the on-virtual-surface external force action point correction amount $\Delta rpc\_i$ in each virtual surface.

Subsequently, the external force target generator 27 carries out the determination processing in S77. The determination processing in S77 is the same as the determination processing in S27 in the first embodiment. More specifically, the external force target generator 27 determines whether the position of the on-virtual-surface external force action point that has been corrected on the basis of the Δrpc_i determined in S75 satisfies an external force action point existence region condition in all virtual surfaces.

If the determination result in this step S77 is affirmative, then the external force target generator 27 carries out the processing in S79 and terminates the processing at the current time. By this processing in S79, the external force target generator 27 determines the desired external force to be applied from each surface to be contacted to the robot 1 and the desired external force action point at the current time.

To be more specific, the external force target generator 27 determines the required virtual surface translational force in each virtual surface at the current time from the required virtual surface translational force (N_i, F_i) in each virtual surface determined by the processing up to S15 and the virtual surface frictional force component restricted correction amount f_lim_i determined by the processing in S69. In this case, the virtual surface normal force component N_i determined by the processing up to S15 is directly determined as the virtual surface normal force component in the virtual surface, and the frictional force component obtained by adding the virtual surface frictional force component restricted correction amount f_lim_i to the virtual surface frictional force component F_i determined by the processing up to S15 is determined as the virtual surface frictional force component in the virtual surface.

The external force target generator 27 determines the virtual surface restricted twisting force R_lim_i determined by the processing in S69 as the virtual surface twisting force in the virtual surface corresponding to the R_lim_i.

Further, the external force target generator 27 converts the required virtual surface translational force and the virtual surface twisting force in each virtual surface determined as described above into the translational force and the twisting force, respectively, to be applied from the surface to be contacted to the robot 1 by the same processing as that in S29 or S41 in the first embodiment, and determines the converted translational force and twisting force as the desired value of the translational external force (the desired translational force) and the desired value of the twisting force (the desired twisting force), respectively, which are constituent elements of the desired external force.

Further, as with the case of the processing in S29 in the first embodiment, the external force target generator 27 determines the point, which is obtained by inversely projecting the external force action point on each virtual surface that has been corrected on the basis of the on-virtual-surface external force action point correction amount Δrpc_i determined in S75 onto a surface to be contacted corresponding to the virtual surface, as the desired external force action point on the surface to be contacted.

In a situation wherein the determination result in S77 is negative, the remaining error component errM' cannot be canceled by correcting the on-virtual-surface external force action point within the range in which the external force action point existence region condition. In this case, therefore, it is necessary to increase the magnitude of the virtual surface normal force component N_i such that the frictional force or the twisting force to be applied to each virtual surface may be further increased (such that the determination result in S65 eventually turns to be affirmative).

Hence, in the case where the determination result in S77 is negative, the external force target generator 27 subsequently carries out the processing in S81. In this step S81, the external force target generator 27 determines whether the virtual surface that does not satisfy the second requirement or the fourth requirement in the determination processing in S65 is the opposing virtual surface Sna or Snb (n=1 or 2 or 3).

In a situation wherein the determination result in S65 is negative, the magnitude of the virtual surface normal force component in the virtual surface that does not satisfy the second requirement or the fourth requirement in the determination result in S65 cannot be increased while satisfying the first A requirement. In this case, therefore, the external force target generator 27 decides in S85 that the desired motion is inappropriate, i.e., the desired motion needs to be corrected, and then interrupts the processing at the current time. In this case, the external force target generator 27 outputs error information to the basic gait element generator 25. Then, the basic gait element generator 25 creates the desired motion again according to the error information.

Accordingly, in the present embodiment, if the determination result in S77 is negative, then the desired motion is evaluated by the determination processing in S81. Further, if the determination result in S81 is negative, then the desired motion is evaluated as inappropriate.

Meanwhile, in a situation wherein the determination result in S81 is affirmative, the magnitudes of the virtual surface normal force components N_na and N_nb of the opposing virtual surfaces Sna and Snb (n=1 or 2 or 3), which include a virtual surface that does not satisfy the second requirement or the fourth requirement and which are parallel to each other, can be increased while satisfying the first A requirement (while maintaining N_na+N_nb constant).

In the case where the determination result in S81 is affirmative, the external force target generator 27 carries out the processing in S83. In this step S83, the external force target generator 27 determines an increment IN_n of the magnitudes of the virtual surface normal force components N_na and N_nb of the opposing virtual surfaces Sna and Snb. In this case, according to the present embodiment, the increment IN_n determined in S83 is set to a predetermined value.

Alternatively, however, the increment IN_n may be determined by, for example, the same processing as that in S45 in the first embodiment.

Subsequently, the external force target generator 27 carries out the processing from S13 of FIG. 7 again.

The above has described in detail the processing by the external force target generator 27 in the present embodiment.

In the processing by the external force target generator 27 described above, first, the processing from S05 to S15 tentatively determines the required virtual surface translational force (N_i, F_i) necessary for accomplishing a translational motion of the entire robot 1 in a desired motion of the robot 1, as with the first embodiment. Thus, the provisional values of the required virtual surface translational forces (N_i, F_i) that allow the translational motion of the entire robot 1 to be achieved can be efficiently determined by a simple algorithm.

Further, as with the first embodiment, if the determination results in both S07 and S09 are negative, or the determination results in S07, S09, and S15 are negative, affirmative, and negative, respectively, then the desired motion generated by the basic gait element generator 25 is evaluated as inappropriate and the processing by the external force target generator 27 is interrupted. Hence, as with the first embodiment, with a simple algorithm, a desired motion that tends to lead to an excessive frictional force between a surface to be contacted and the robot 1 or a desired motion that tends to lead to an excessive internal force of the robot 1 can be efficiently evaluated as inappropriate for implementing a translational motion of the entire robot 1 in a desired motion. This makes it possible to restrain wasteful arithmetic processing from being executed in generating a desired gait.

Further, according to the present embodiment, after determining the provisional values of the required virtual surface translational forces (N_i, F_i) that enable a translational motion of the entire robot 1 to be accomplished as described above, the processing in S19, S21 and S61 to S75 (except for the processing in S67) determines the set of the virtual surface frictional force component correction amount Δf_i and the virtual surface twisting force R_i as the additional manipulated variable (the moment compensation amount) for implementing a rotational motion (a rotational motion that changes the angular momentum about the moment reference point) of the entire robot 1, or determines the set of the virtual surface frictional force component correction amount Δf_i, the virtual surface twisting force R_i, and the on-virtual-surface external force action point correction amount Δrpc_i.

Thus, as with the case of the first embodiment, simply combining the provisional values of the required virtual surface translational forces (N_i, F_i) determined by the processing from S05 to S15 and the moment compensation amount determined by the processing in S19, S21 and S61 to S75 (except for the processing in S67) makes it possible to determine the set of the required virtual surface translational force, the virtual surface twisting force, and virtual surface external force action point (including the case where the virtual surface twisting force is zero), which set allows both a translational motion and a rotational motion of the entire robot 1 to be properly achieved. Then, the set of the required virtual surface translational force, the virtual surface twisting force, and virtual surface external force action point makes it possible to efficiently and properly determine a desired external force (a desired translational force and a desired twisting force) to be applied to the robot 1 from each surface to be contacted, and a desired external force action point.

In this case, if the determination results in both S77 and S81 are negative, then the desired motion generated by the basic gait element generator 25 is evaluated as inappropriate and the processing by the external force target generator 27 is interrupted. With this arrangement, a desired motion that makes it difficult to accomplish a rotational motion of the entire robot 1 while satisfying at least the first A requirement and the first B requirement can be evaluated as an inappropriate desired motion. This makes it possible to restrain wasteful arithmetic processing from being carried out in generating a desired gait.

Figure 15:
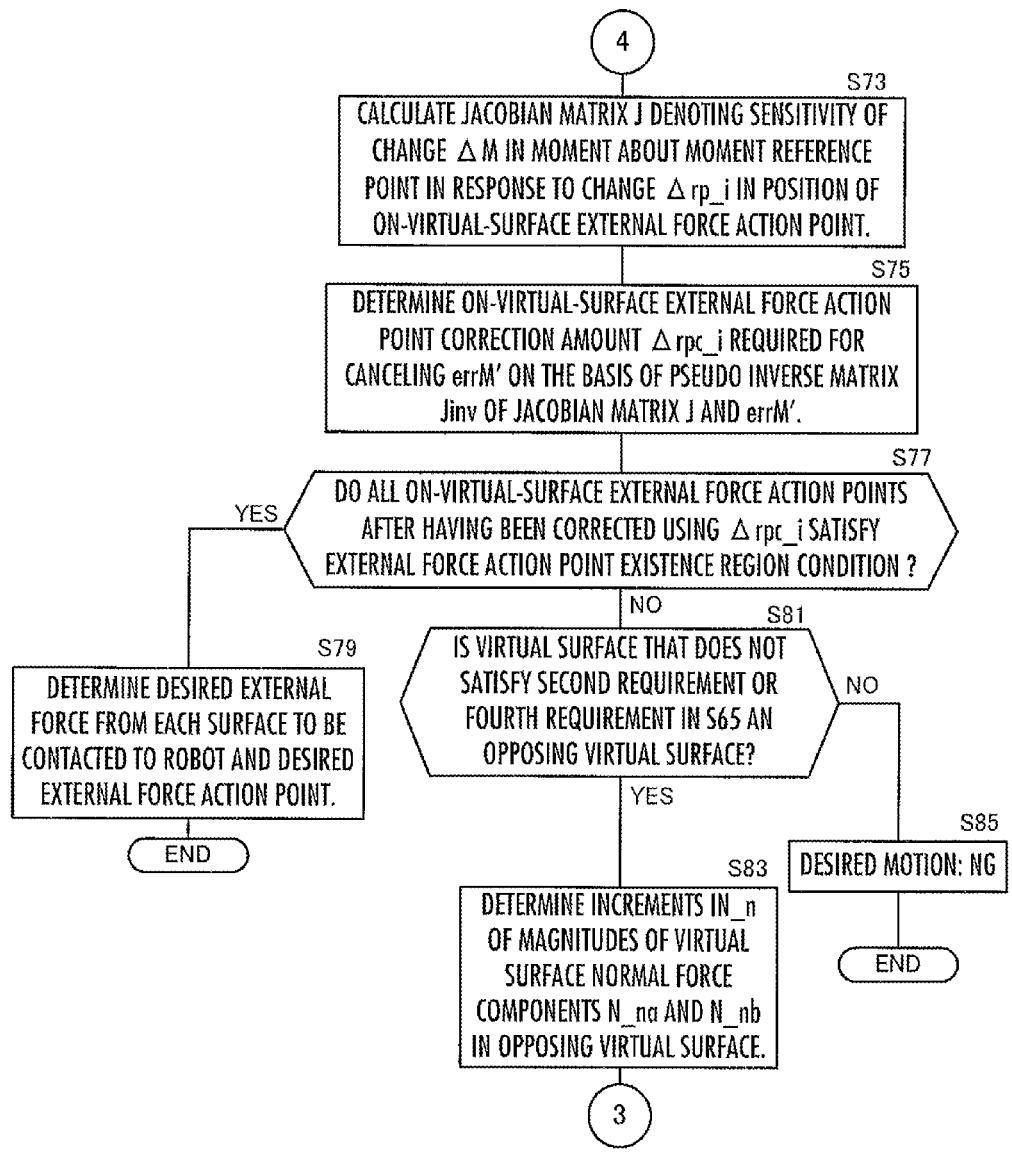
FIG. 15 is a flowchart illustrating the processing in the second embodiment by the external force target generator shown in FIG. 2.

Further, as with the first embodiment, a final required virtual surface translational force (the set of the virtual surface normal force component N_i and the virtual surface frictional force component F_i) in each virtual surface corresponding to each surface to be contacted at the current time is determined to eventually satisfy the first A requirement, the first B requirement, the second requirement, and the third requirement except for the case where the determination result in any one of S09 and S15 of FIG. 7 and S81 of FIG. 15 is negative (in the case where a desired motion is inappropriate).

Further, the desired value of a translational external force (a desired translational force) in a surface to be contacted corresponding to each virtual surface is determined such that the normal force component (the component perpendicular to a surface to be contacted) and the frictional force component (the component parallel to a surface to be contacted) thereof coincide with the virtual surface normal force component N_i and the virtual surface frictional force component F_i, respectively, in the virtual surface.

Hence, as with the first embodiment, the desired translational force applied from each surface to be contacted to the robot 1 can be determined such that the required total translational external force is attained by the resultant force of the normal force components of the desired translational forces in the individual surfaces to be contacted as much as possible, while the frictional force component of the desired translational force is minimized as much as possible within the limit of the magnitude of the frictional force that can be generated in the surface to be contacted.

Further, in the case where the virtual surfaces set in S01 include the opposing virtual surfaces Sna and Snb, and the determination result in S65 or S77 is affirmative, the magnitude of the internal force generated in the robot 1 between the opposing virtual surfaces Sna and Snb (the magnitude of N_na or N_nb, whichever is smaller) can be controlled to a minimum within a range in which the first A requirement, the first B requirement, the second requirement, and the third requirement are satisfied, as with the first embodiment. Thus, as with the first embodiment, the desired translational forces in the surfaces to be contacted including the two surfaces to be contacted corresponding to the opposing virtual surfaces Sna and Snb can be determined such that the share of the motive power (the driving torque in the present embodiment) that can be generated by the joint actuators 11 of the robot 1, which share is necessary for generating the internal force, will be reduced.

Here, a supplementary description will be given of the relationship of correspondence between the present embodiment described above and the present invention. In the present embodiment, the external force target generator 27 of the gait generator 23 of the control unit 21 functions as the desired motion evaluation apparatus in the present invention.

In the processing carried out by the external force target generator 27, the processing in S01 implements the virtual surface group setting unit in the present invention.

Further, the processing in S03 implements the required total translational external force determining unit in the present invention.

Further, the processing in S05 implements the required virtual surface translational force calculating unit calculating the required virtual surface translational force so as to satisfy the first A requirement and the first B requirement.

Then, in this case, the processing in S07 to S17 implements the desired motion evaluating unit. In this case, the determination processing in S07 implements the first determining unit in the present invention. Further, the determination processing in S09 implements the second determining unit in the present invention. Further, the determination processing in S15 implements the third determining unit in the present invention.

Further, viewed from another point, the processing in S05 to S13 (except for the case where the determination result in S09 is negative) or the processing in S05 to S21 (except for the case where the determination result in S09 or S15 is negative), the processing in S61 to S83 (except for the case where the determination result in S81 is negative), and the subsequent processing in S13 of the present embodiment implement the required virtual surface translational force calculating unit calculating the required virtual surface translational force so as to satisfy the first A requirement, the first B requirement, and the second requirement.

Then, in this case, the determination processing in S15 and S17 implements the desired motion evaluating unit in the present invention, and the determination processing in S15 implements the fourth determining unit in the present invention.

Third Embodiment

The third embodiment of the present invention will now be described with reference to FIG. 16. The present embodiment differs from the first embodiment only partly in the processing by an external force target generator 27, so that the description of the same aspects as those of the first embodiment will be omitted.

If the surfaces to be contacted in an outside world of a robot 1 have two surfaces to be contacted that oppose each other with an interval provided therebetween, as with the aforesaid wall surfaces WL1 and WL2, and the virtual surface group set in S01 includes opposing virtual surfaces Sna and Snb, then the moment generated about a moment reference point can be changed by manipulating (increasing or decreasing) an internal force (=min(|N_na|, |N_nb|)) between the opposing virtual surfaces Sna and Snb while maintaining the resultant force of the virtual surface normal force components N_na and N_nb in the opposing virtual surfaces Sna and Snb constant. Hence, the internal force can be used as the moment compensation amount for canceling or reducing a moment error errM (or a remaining error component errM').

According to the present embodiment, therefore, if the virtual surface group set in S01 includes the opposing virtual surfaces Sna and Snb, then a set of a second compensation amount (a virtual surface frictional force component correction amount f_i) and a third compensation amount (a virtual surface twisting force R_i) and an internal force correction amount ΔIN as a fourth compensation amount is determined as the moment compensation amount for canceling the remaining error component errM' calculated in S33.

To be more specific, the processing up to the aforesaid S33 in the processing carried out by the external force target generator 27 in the present embodiment is the same as that in the first embodiment. A part of the processing after S33 is different from the processing in the first embodiment.

Figure 16:
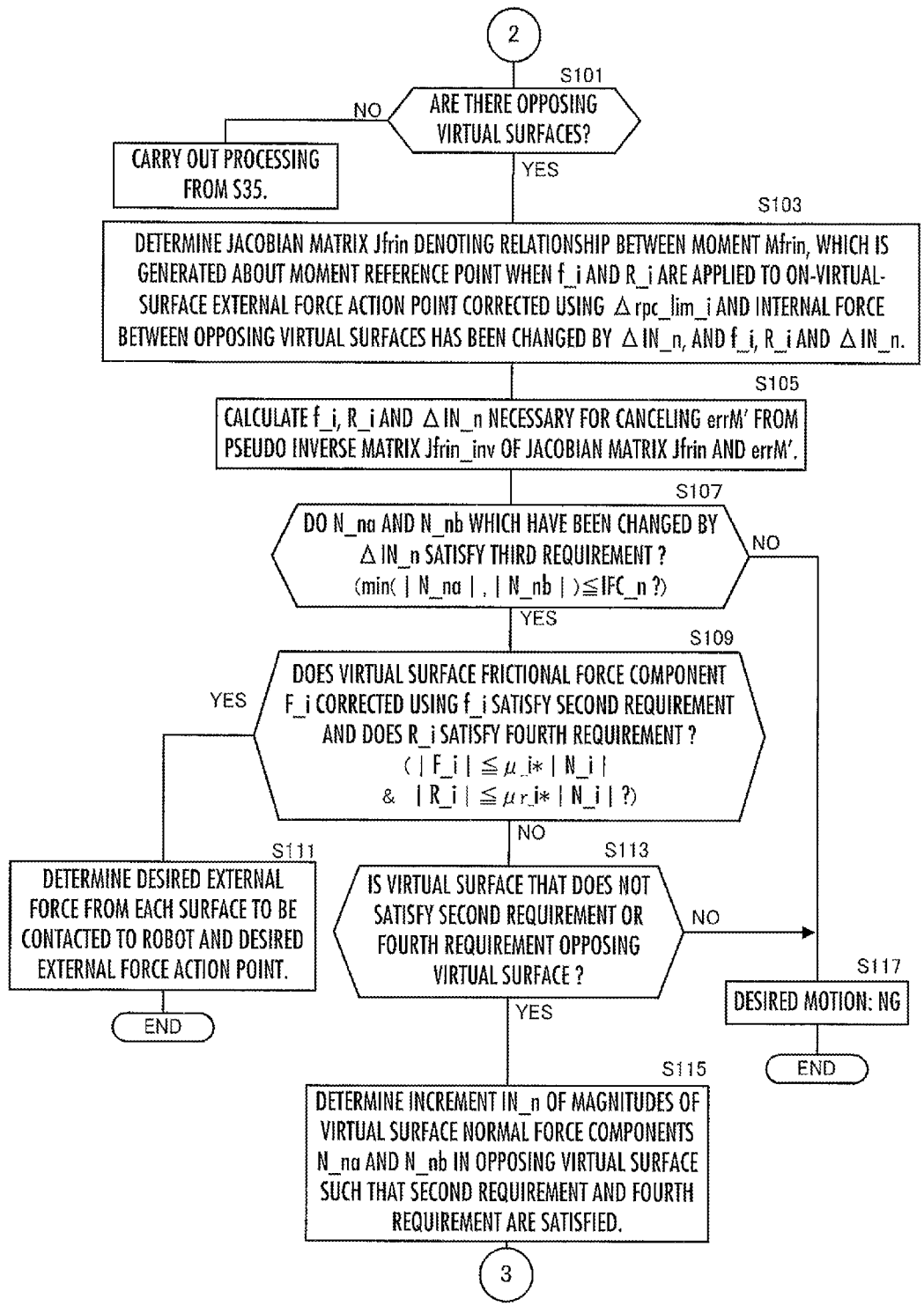
FIG. 16 is a flowchart illustrating the processing in a third embodiment by the external force target generator shown in FIG. 2.

Referring to FIG. 16, the external force target generator 27 carries out the processing in S101 after the processing in S33. In this step S101, the external force target generator 27 determines whether the virtual surface group set in S01 includes the opposing virtual surfaces Sna and Snb. If the determination result is negative, then the external force target generator 27 carries out the processing from S35 illustrated in FIG. 9 in the same manner as that in the first embodiment.

According to the present embodiment, in the case where the determination result in S101 is negative, when the processing in S35, S37, S39, and S43 illustrated in FIG. 9 is carried out thereafter, the determination result in S43 will be always negative. Hence, the processing in S43 and S45 is substantially unnecessary in the processing after the determination result in S101 turns negative, so that if the determination result in S39 is negative, then the processing in S47 may be immediately carried out.

Meanwhile, if the determination result in S101 is affirmative, then the external force target generator 27 carries out the processing in S103. In this step S103, the external force target generator 27 calculates, according to the following expression 13, a Jacobian matrix Jfrin representing the relationship between a moment Mfrin, which is generated about the moment reference point by the virtual surface frictional force component correction amount f_i, the virtual surface twisting force R_i, and an internal force correction amount ΔIN_n when the f_i and the R_i in arbitrary values are applied to the on-virtual-surface restrictedly corrected external force action point of each virtual surface (each virtual surface set in S01) and the magnitudes of the virtual surface normal force components N_na and N_nb of the opposing virtual surfaces Sna and Snb of each pair are changed by an internal force correction amount ΔIN_n in an arbitrary value, and the f_i, the R_i, and the ΔIN_n.

$$Mfrin = Jfrin \ast (f\_i\_R\_i \Delta IN\_n)^T \qquad \text{Expression 13}$$

In this expression 13, $(f\_i\_R\_i\ \Delta IN\_n)^T$ denotes the vertical vector composed of f_i, R_i and ΔIN_n. The virtual surface frictional force component correction amount f_i is a moment compensation amount that should be determined such that the total sum (resultant force) thereof is zero. Hence, f_i as a component of the vertical vector $(f\_i\ R\_i\ \Delta IN\_n)^T$ in expression 13 is obtained by removing f_i corresponding to any one virtual surface (≡f_i0), as with f_i in the aforesaid expression 11 described in the first embodiment. If the virtual surface group set in S01 includes a plurality of pairs of opposing virtual surfaces Sna and Snb, then the internal force correction amount ΔIN_n associated with the opposing virtual surfaces Sna and Snb of all the pairs will be included as a component of the vertical vector $(f\_i\_R\_i\ \Delta IN\_n)^T$ in expression 13.

Subsequently, the external force target generator 27 carries out the processing in S105. In this step S105, the external force target generator 27 calculates the set of f_i, R_i and ΔIN_n, i.e., $(f\_i\_R\_i\ \Delta IN\_n)^T$, that satisfies the relationship denoted by expression 13 when Mfrin in expression 13 is set to coincide with the remaining error component errM' calculated in S33.

More specifically, the external force target generator 27 calculates a pseudo inverse matrix Jfrin_inv of the Jacobian matrix Jfrin determined in S103, and multiplies the remaining error component errM' by the pseudo inverse matrix Jfrin_inv so as to calculate the set of f_i, R_i and ΔIN_n. In this case, the pseudo inverse matrix Jfrin_inv is determined such that, for example, the mean value (or the weighted mean value) of the squared value or the absolute value of each of the f_i, R_i and ΔIN_n constituting the vertical vector $(f\_i\_R\_i \Delta IN\_n)^T$ of expression 13 will be minimized, in the same manner as that for calculating the pseudo inverse matrix Jfr_inv by the processing in S37 of FIG. 9 described in the first embodiment. Further, the aforesaid f_i0 removed from the vertical vector $(f\_i\_R\_i\ \Delta IN\_n)^T$ in expression 13 is determined as a value obtained by reversing the sign of the total sum of f_i calculated as described above.

It is not always necessary to calculate all of the f_i, R_i and ΔIN_n. For example, the f_i in a virtual surface having a relatively small frictional coefficient μ_i may be set to zero or the R_i in a virtual surface having a relatively small twisting force coefficient μr_i may be set to zero.

When a gait generator 23 generates the aforesaid wall climbing gait, the processing in S103 and S105 is carried out, for example, as described below.

For instance, as with the case described in the first embodiment, the position vectors of on-virtual-surface restrictedly corrected external force action points (the position vectors relative to a moment reference point) in virtual surfaces S3a, S2a and S2b corresponding to the floor surface FL, the wall surface WL2 and the wall surface WL2, respectively, in the motional state illustrated in FIG. 11(b) are denoted by rp_3a, rp_2a, and rp_2b, respectively. At this time, the relationship between on-virtual-surface frictional force component correction amounts f_3a, f_2a, f_2b and virtual surface twisting forces R_3a, R_2a, R_2b in the virtual surfaces S3a, S2a and S2b, and an internal force correction amount ΔIN_2 between the virtual surfaces S2a and S2b, and the moment Mfrin generated about a moment reference point by the f_3a, f_2a, f_2b, R_3a, R_2a, R_2b, and ΔIN_2 is denoted by the following expression 13a.

$$Mfrin = rp\_3a * f\_3a + rp\_2a * f\_2a + rp\_2b * f\_2b + R\_3a + R\_2a + R\_2b + (rp\_2a - rp\_2b) * \Delta IN\_2 \quad \text{Expression 13a}$$

In expression 13a, (rp_3a*f_3a), (rp_2a*f_2a), (rp_2b*f_2b), and (rp_2a−rp_2b)*ΔIN_2 are vector products. In this case, ΔIN_2 is denoted as a vector (having a magnitude of ΔIN_2) moving from the virtual surface S2a to the virtual surface S2b in expression 13a.

In this case, regarding the virtual surface frictional force component correction amount, f_3a+f_2a+f_2b=0 applies, leading to f_2b=−(f_3a+f_2a). Hence, expression 13a is rewritten to, for example, the following expression 13b, which does not include f_2b.

$$Mfrin = (rp\_3a - rp\_2b) * f\_3a + (rp\_2a - rp\_2b) * f\_2a + R\_3a + R\_2a + R\_2b + (rp\_2a - rp\_2b) * \Delta IN\_2 \quad \text{Expression 13b}$$

Hence, in S103, the right side of the expression 13b is denoted by a coordinate component to determine the Jacobian matrix Jfrin in the aforesaid expression 13.

Further, in S105, the pseudo inverse matrix Jfrin_inv of the Jacobian matrix Jfrin is calculated as described above and the remaining error component errM' is multiplied by the obtained Jfr_inv so as to calculate f_3a, f_2a, R_3a, R_2a, R_2b, and ΔIN_2. Further, the f_3b is calculated from f_3a and f_2a according to a relationship denoted by f_2b=−(f_3a+f_2a).

If the processing up to S105 described above causes the determination result in the aforesaid S27 to become negative and the determination result in S101 to become affirmative, then the set of the virtual surface frictional force component correction amount f_i, the virtual surface twisting force R_i, and the internal force correction amount ΔIN_n is calculated, in addition to the on-virtual-surface external force action point restricted correction amount Δrpc_lim_i, as the moment compensation amount for achieving a rotational motion (a rotational motion that changes the angular momentum about the moment reference point) of the entire robot 1 in a desired motion of the robot 1 while satisfying the first A requirement and the first B requirement.

Subsequently, the external force target generator 27 carries out the determination processing in S107. In this step S107, the external force target generator 27 determines whether a corrected internal force satisfies the third requirement in the opposing virtual surfaces Sna and Snb in which the internal force is corrected on the basis of the internal force correction amount ΔIN_n. More specifically, the external force target generator 27 determines whether the magnitude of the virtual surface normal force component N_na or N_nb, whichever is smaller, after the magnitude of only the internal force correction amount ΔIN_n is changed in the opposing virtual surfaces Sna and Snb (i.e., the magnitude of the internal force that has been corrected on the basis of ΔIN_n) is the aforesaid internal force upper limit value IFC_n or less.

If the determination result in S107 is negative, then the external force target generator 27 decides in S117 that the desired motion is inappropriate (the desired motion needs to be corrected), and interrupts the processing for generating a target related to an external force. In this case, the external force target generator 27 outputs error information to the basic gait element generator 25. Then, the basic gait element generator 25 creates a desired motion again according to the error information.

If the determination result in S107 is affirmative, then the external force target generator 27 carries out the same determination processing as that in S39 of FIG. 9 (the determination processing related to the second requirement and the fourth requirement) in S109. In this case, the magnitudes of the virtual surface normal force components N_na and N_nb related to the frictional force upper limit values in the opposing virtual surfaces Sna and Snb indicate the values which have been corrected on the basis of the internal force correction amount ΔIN_n (more specifically, the values obtained by changing the magnitudes of the virtual surface normal force components N_na and N_nb, which have been determined by the processing up to S15 of FIG. 7, by the internal force correction amount ΔIN_n).

If the determination result in S109 is affirmative, then the external force target generator 27 carries out the same processing as that in S41 of FIG. 9 in S111 to determine the desired external force applied from each surface to be contacted to the robot 1 and the desired external force action point at the current time.

If the determination result in S109 is negative, then the external force target generator 27 carries out in S113 the same determination processing as that in S43 of FIG. 9. If the determination result is negative, then the external force target generator 27 decides in S117 that the desired motion is inappropriate and interrupts the processing by the external force target generator 27 (the processing for generating a target related to an external force).

Thus, according to the present embodiment, if the determination result in S107 is negative or if the determination results in both S109 and S113 are negative, then the desired motion will be evaluated as inappropriate.

If the determination result in S113 is affirmative, then the same processing as that in S45 of FIG. 9 is carried out in S115 to determine the increment IN_n of the magnitudes of the virtual surface normal force components N_na and N_nb in the opposing virtual surfaces Sna and Snb. To be more specific, the increment IN_n determined in S115 indicates the increment from the magnitudes of the virtual surface normal force components N_na and N_nb used in the determination processing in S109 (i.e., the value obtained after having been corrected on the basis of the internal force correction amount ΔIN_n).

Subsequently, the external force target generator 27 carries out the processing from S13 of FIG. 7 again.

In the case where the processing from S13 is carried out again as mentioned above, if the determination result in S15 is affirmative, then the processing from S35 may alternatively be carried out without carrying out the determination processing in S101 (or without depending upon the determination result in S101).

This completes the detailed description of the processing by the external force target generator 27 in the present embodiment.

As with the first embodiment, in the processing carried out by the external force target generator 27 described above, first, the required virtual surface translational forces (N_i, F_i) necessary for achieving a translational motion of the entire robot 1 in a desired motion of the robot 1 are tentatively determined by the processing in S05 to S15. Hence, the provisional values of the required virtual surface translational forces (N_i, F_i) that allow a translational motion of the entire robot 1 to be accomplished can be efficiently determined using a simple algorithm.

Further, as with the first embodiment, if the determination results in both S07 and S09 are negative or if the determination results in S07, S09, and S15 are negative, affirmative, and negative, respectively, then it is evaluated that the desired motion generated by the basic gait element generator 25 is inappropriate, and the processing by the external force target generator 27 is interrupted. Thus, with a simple algorithm, a desired motion that tends to lead to an excessive frictional force between a surface to be contacted and the robot 1 or a desired motion that tends to lead to an excessive internal force of the robot 1 can be efficiently evaluated as inappropriate for implementing a translational motion of the entire robot 1 in a desired motion, as with the first embodiment. This makes it possible to restrain wasteful arithmetic processing from being executed in generating a desired gait.

Further, in the present embodiment, after determining the provisional values of the required virtual surface translational forces (N_i, F_i) that enable a translational motion of the entire robot 1 to be accomplished as described above, the processing from S19 to S37 (except for the processing in S29) or from S19 to S33 (except for the processing in S29), and the processing in S103 to S105 determine the on-virtual-surface external force action point correction amount Δrpc_i as the additional manipulated variable (the moment compensation amount) for implementing a rotational motion (a rotational motion that changes the angular momentum about the moment reference point) of the entire robot 1, or determine the set of the on-virtual-surface external force action point restricted correction amount Δrpc_lim_i, the virtual surface frictional force component correction amount Δf_i, and the virtual surface twisting force R_i or the set of Δrpc_lim_i, Δf_i, R_i, and the internal force correction amount ΔIN_n.

Thus, as with the first embodiment, simply combining the provisional values of the required virtual surface translational forces (N_i, F_i) determined by the processing in S05 to S15 and the moment compensation amounts determined by the processing in S19 to S37 (except for the processing in S29) or S19 to S33 (except for the processing in S29) and the processing in S103 to S105 make it possible to determine the set of the required on-virtual-surface translational force, the on-virtual-surface twisting force, and the on-virtual-surface external force action point (including the case where the on-virtual-surface twisting force is zero) that allow both the translational motion and the rotational motion of the entire robot 1 to be properly accomplished. Then, the set of the required on-virtual-surface translational force, the on-virtual-surface twisting force, and the on-virtual-surface external force action point makes it possible to efficiently and properly determine a desired external force (a desired translational force and a desired twisting force) to be applied to the robot 1 from surfaces to be contacted and a desired external force action point.

In this case, if the determination results in S109 and S113 are both negative, then the desired motion generated by the basic gait element generator 25 is evaluated as inappropriate and the processing by the external force target generator 27 is interrupted. This makes it possible to evaluate that a desired motion which makes it difficult to achieve a rotational motion of the entire robot 1 while at least satisfying the first A requirement and the first B requirement is inappropriate. This in turn makes it possible to restrain wasteful arithmetic processing from being carried out in generating a desired motion.

As with the first embodiment, a final required virtual surface translational force (the set of the virtual surface normal force component N_i and the virtual surface frictional force component F_i) in each virtual surface corresponding to each surface to be contacted at the current time is determined to eventually satisfy the first A requirement, the first B requirement, the second requirement, and the third requirement except for the case where the determination result in any one of S09 and S15 illustrated in FIG. 7 and S107 and S113 of FIG. 16 is negative (in the case where a desired motion is inappropriate).

Further, the desired value of a translational external force (a desired translational force) in a surface to be contacted corresponding to each virtual surface is determined such that the normal force component (the component perpendicular to a surface to be contacted) and the frictional force component (the component parallel to a surface to be contacted) thereof coincide with the virtual surface normal force component N_i and the virtual surface frictional force component F_i, respectively, in the virtual surface.

Hence, as with the first embodiment, the desired translational force applied from each surface to be contacted to the robot 1 can be determined such that the required total translational external force is attained by the resultant force of the normal force components of the desired translational forces in the individual surfaces to be contacted as much as possible, while the frictional force component of the desired translational force is minimized as much as possible within the limit of the magnitude of the frictional force that can be generated in the surface to be contacted.

In particular, according to the present embodiment, as with the first embodiment, the on-virtual-surface external force action point correction amount Δrpc_i (the first compensation amount) is preferentially determined as the moment compensation amount. This means that the magnitude of the virtual surface frictional force component F_i in each virtual surface can be controlled to a minimum within a range in which the first A requirement, the first B requirement, the second requirement, and the third requirement are satisfied. As a result, the magnitude of the frictional force component of the desired translational force in each surface to be contacted can be also controlled to a minimum or approximated to a minimum.

Further, in the case where the virtual surfaces set in S01 include the opposing virtual surfaces Sna and Snb, except for the case where a desired motion is determined as inappropriate, the virtual surface normal force components N_na and N_nb are determined such that the magnitude of the internal force generated in the robot 1 between the opposing virtual surfaces Sna and Snb (the magnitude of N_na or N_nb, whichever is smaller) is the internal force upper limit value IFC_n or less (such that the third requirement is satisfied). This makes it possible to determine the desired translational forces in the surfaces to be contacted that include two surfaces to be contacted corresponding to the opposing virtual surfaces Sna and Snb such that the share, which is required for generating an internal force, in the motive power (the driving torque in the present embodiment) that can be generated by joint actuators 11 of the robot 1 will not become excessive.

Here, a supplementary description will be given of the relationship of correspondence between the present embodiment described above and the present invention. In the present embodiment, the external force target generator 27 of the gait generator 23 of a control unit 21 functions as the desired motion evaluation apparatus in the present invention.

In the processing carried out by the external force target generator 27, the processing in S01 implements the virtual surface group setting unit in the present invention.

Further, the processing in S03 implements the required total translational external force determining unit in the present invention.

Further, the processing in S05 implements the required virtual surface translational force calculating unit calculating the required virtual surface translational force so as to satisfy the first A requirement and the first B requirement.

Then, in this case, the processing in S07 to S17 implements the desired motion evaluating unit. In this case, the determination processing in S07 implements the first determining unit in the present invention. Further, the determination processing in S09 implements the second determining unit in the present invention. Further, the determination processing in S15 implements the third determining unit in the present invention.

Viewed from another point, the processing in S05 to S37 (except for the case where the determination result in S09 or S15 is negative and the case where the determination result in S101 is affirmative) in the present embodiment or the processing in S05 to S33 (except for the case where the determination result in S09 or S15 is negative) as well as S103 and S105 in the present embodiment implements the required virtual surface translational force calculating unit calculating the required virtual surface translational force so as to satisfy at least the first A requirement and the first B requirement (more specifically, to enable a rotational motion of the entire robot 1 in the desired motion of the robot 1 to be achieved, while satisfying the first A requirement and the first B requirement).

Then, in this case, the processing in S39 to S45 following S37 as well as S13 to S17 or the processing in S107 to S115 following S105 as well as S13 to S17 implements the desired motion evaluating unit in the present invention. In this case, the determination processing in S39 or S109 implements the first determining unit in the present invention. Further, the determination processing in S43 or S113 implements the second determining unit in the present invention. Further, the determination processing in S15 implements the third determining unit in the present invention.

Further, viewed from still another point, the processing in S05 to S13 (except for the case where the determination result in S09 is negative), the processing in S05 to S45 (except for the case where the determination result in S09, S15, or S43 is negative and the case where the determination result in S101 is affirmative) and the subsequent processing in S13 in the present embodiment, or the processing in S05 to S33 (except for the case where the determination result in S09 or S15 is negative), the processing in S103 to S115 (except for the case where the determination result in S107 or S113 is negative), and the subsequent processing in S13 in the present embodiment implement the required virtual surface translational force calculating unit calculating the required virtual surface translational force so as to satisfy the first A requirement, the first B requirement, and the second requirement.

Then, in this case, the processing in S15 and S17 implements the desired motion evaluating unit in the present invention, and the determination processing in S15 implements the fourth determining unit in the present invention.

Fourth Embodiment

A fourth embodiment of the present invention will now be described with reference to FIG. 17 and FIG. 18. The present embodiment differs from the second embodiment or the third embodiment only partly in the processing carried out by a external force target generator 27, so that the description of the same aspects as those of the second embodiment or the third embodiment will be omitted.

As with the third embodiment, the present embodiment uses, as appropriate, an internal force correction amount $\Delta IN\_n$ (a fourth compensation amount) as a moment compensation amount for canceling or reducing a moment error errM. In this case, according to the present embodiment, when a virtual surface group set in S01 includes opposing virtual surfaces, the set of a virtual surface frictional force component correction amount f_i (a second compensation amount), a virtual surface twisting force R_i (a third compensation amount), and an internal force correction amount $\Delta IN\_n$ (the fourth compensation amount) is determined as a moment compensation amount, and then an on-virtual-surface external force action point correction amount $\Delta rpc\_i$ (a first compensation amount) is determined to cancel a remaining error component errM' that cannot be canceled by the aforesaid set of compensation amounts.

To be more specific, the processing up to the aforesaid S21 in the processing carried out by the external force target generator 27 in the present embodiment is the same as that in the second embodiment. The processing after S21 is partly different from that in the second embodiment.

Figure 17:
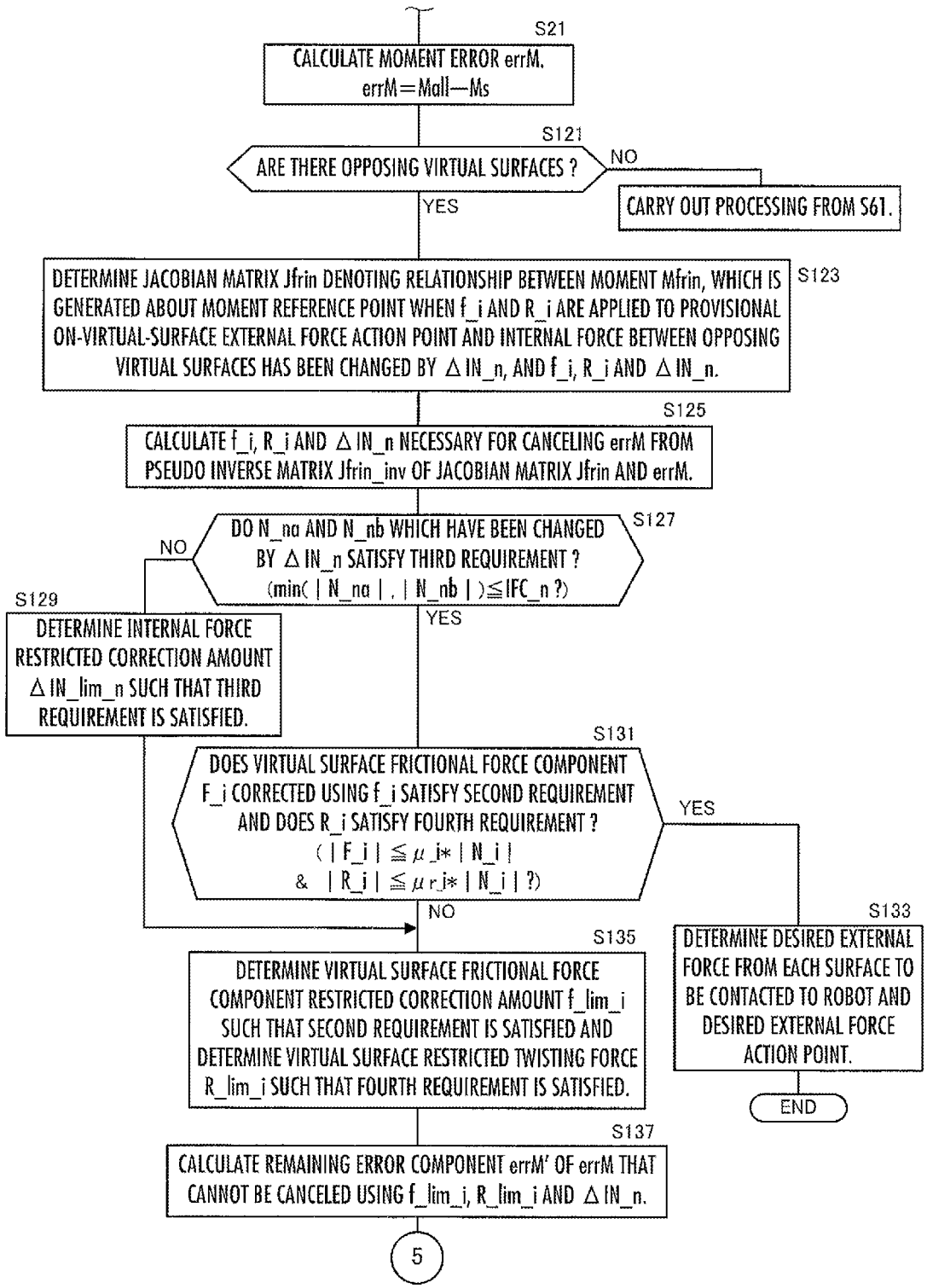
FIG. 17 and FIG. 18 are flowcharts illustrating the processing in a fourth embodiment by the external force target generator shown in FIG. 2.
Figure 18:
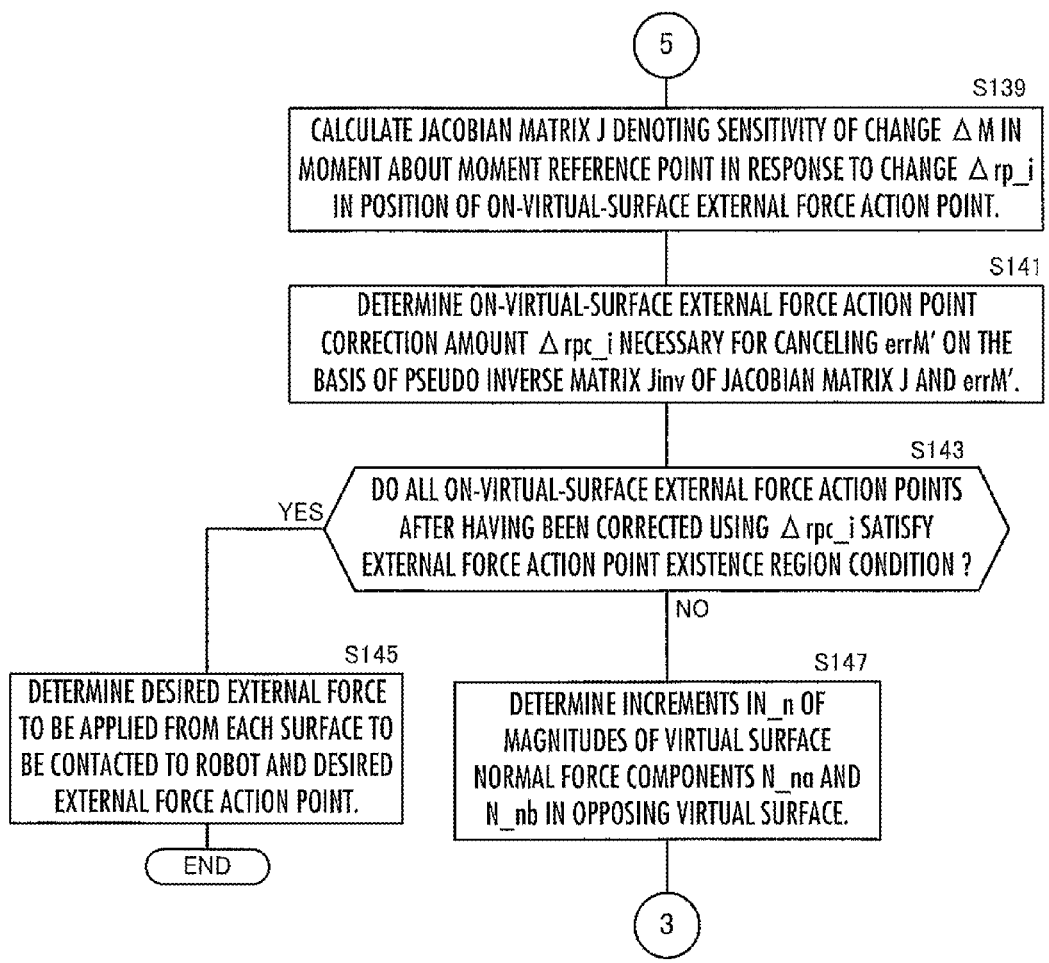

Referring to FIG. 17 and FIG. 18, the external force target generator 27 carries out the determination processing in S121 after S21. In this step S121, the external force target generator 27 determines whether the virtual surface group set in S01 includes opposing virtual surfaces Sna and Snb. If the determination result is negative, then the external force target generator 27 carries out the processing from S61 illustrated in FIG. 14 and FIG. 15 in the same manner as that in the second embodiment.

According to the present embodiment, in the case where the determination result in S121 is negative, when the determination processing in S81 illustrated in FIG. 15 is carried out thereafter, the determination result will be always negative. Hence, the processing in S81 and S83 is substantially unnecessary in the processing after the determination result in S121 turns negative, so that if the determination result in S77 is negative, then the processing in S85 may be immediately carried out.

Meanwhile, if the determination result in S121 is affirmative, then the external force target generator 27 carries out the processing in S123. In this step S123, the external force target generator 27 carries out the same processing as that in S103 described in the third embodiment to determine a Jacobian matrix Jfrin representing, by the aforesaid expression 13, the relationship between a virtual surface frictional force component correction amount f_i (a second compensation amount), a virtual surface twisting force R_i (a third compensation amount) and an internal force correction amount $\Delta IN\_n$ (a fourth compensation amount) and a moment Mfrin, which is generated about a moment reference point by the f_i, R_i and $\Delta IN\_n$. According to the present embodiment, however, a provisional virtual surface external force action point (a point obtained by projecting the provisional external force action point on a surface to be contacted, which has been determined by a basic gait element generator 25, onto a virtual surface corresponding to the surface to be contacted) is used as an external force action point on each virtual surface in the processing in S123.

Subsequently, the external force target generator 27 carries out the processing in S125. In this step S125, the external force target generator 27 calculates the set of f_i, R_i and $\Delta IN\_n$, i.e., $(f\_i\_R\_i\ \Delta IN\_n)^T$, that satisfies the relationship denoted by expression 13 when Mfrin in expression 13 is set to coincide with a moment error errM determined in S21.

In this case, the external force target generator 27 calculates a pseudo inverse matrix Jfrin_inv of the Jacobian matrix Jfrin determined in S123 by carrying out the same processing as that in S105 in the third embodiment, and multiplies the moment error errM by the pseudo inverse matrix Jfrin_inv so as to calculate the set of f_i, R_i and $\Delta IN\_n$, i.e., $(f\_i\_R\_i\ \Delta IN\_n)^T$. Thus, the set of f_i, R_i and $\Delta IN\_n$, required to cancel errM is calculated.

It is not always necessary to calculate all of the f_i, R_i and ΔIN_n. For example, the f_i in a virtual surface having a relatively small frictional coefficient μ_i may be set to zero or the R_i in a virtual surface having a relatively small twisting force coefficient μr_i may be set to zero.

If the processing up to S125 described above causes the determination result in S121 to become negative, then the set of the virtual surface frictional force component correction amount f_i, the virtual surface twisting force R_i, and the internal force correction amount ΔIN_n is calculated as the moment compensation amount for achieving a rotational motion (a rotational motion that changes the angular momentum about a moment reference point) of the entire robot 1 in a desired motion of the robot 1 while satisfying the first A requirement and the first B requirement.

Subsequently, the external force target generator 27 carries out, in S127, the same determination processing as that in S107 in the third embodiment. More specifically, the external force target generator 27 determines whether the internal force corrected on the basis of ΔIN_n (=min (|N_na|,|N_nb|)) satisfies the aforesaid third requirement.

If the determination result in S127 is affirmative, then the external force target generator 27 carries out the processing in S131. In this step S131, the external force target generator 27 carries out the same determination processing as that in S65 in the second embodiment. More specifically, the external force target generator 27 determines whether a virtual surface frictional force component F_i which has been corrected on the basis of f_i (the frictional force component of the total sum of F_i and f_i determined by the processing up to S15) satisfies the second requirement and also determines whether the magnitude of R_i satisfies the fourth requirement in each virtual surface.

If the determination result in S131 is affirmative, then the external force target generator 27 carries out the processing in S133 and terminates the processing at current time. The processing in this step S133, the external force target generator 27 carries out the same processing as that in S67 in the second embodiment to determine a desired external force from each surface to be contacted to the robot 1 and a desired external force action point at the current time.

To be more specific, the external force target generator 27 determines the required virtual surface translational force in each virtual surface at the current time on the basis of the required virtual surface translational force (N_i, F_i) in each virtual surface determined by the processing up to S15 and the virtual surface frictional force component correction amount f_i and the internal force correction amount ΔIN_n determined by the processing in S125. In this case, the normal force component obtained by changing the magnitude of the virtual surface normal force component N_i determined by the processing up to S15 by ΔIN_n is determined as the virtual surface normal force component in the virtual surface, and the frictional force component obtained by adding the virtual surface frictional force component correction amount f_i to the virtual surface frictional force component F_i determined by the processing up to S15 is determined as the virtual surface frictional force component in the virtual surface.

Further, the external force target generator 27 determines the virtual surface twisting force R_i determined by the processing in S125 as the twisting force in the virtual surface associated with the R_i.

Then, the external force target generator 27 converts the required virtual surface translational force and the virtual surface twisting force R_i in each virtual surface determined as described above into a translational force and a twisting force, respectively, to be applied to the robot 1 from a surface to be contacted corresponding to the virtual surface in the same manner as that of the processing in S67, thereby determining the desired translational force and the desired twisting force, which are constituent elements of a desired external force.

Further, the external force target generator 27 determines the provisional external force action point generated by the basic gait element generator 25 directly as a desired external force action point.

If the determination result in the aforesaid step S131 is negative, then the external force target generator 27 carries out the processing in S135. In this step S135, the external force target generator 27 carries out the same processing as that in S69 in the second embodiment to determine a virtual surface frictional force component restricted correction amount f_lim_i obtained by restricting the virtual surface frictional force component correction amount f_i such that the second requirement is satisfied and to also determine the virtual surface restricted twisting force R_lim_i obtained by restricting the virtual surface twisting force R_i such that the fourth requirement is satisfied.

Meanwhile, if the determination result in S127 is negative, then the external force target generator 27 carries out the processing in S129 and then carries out the processing in S135.

In this case, the external force target generator 27 determines in S129 an internal force restricted correction amount ΔIN_lim_n obtained by restricting the internal force correction amount ΔIN_n such that the third requirement is satisfied. To be more specific, for the opposing virtual surfaces Sna and Snb, on which the determination result in S127 is negative, the ΔIN_lim_n is determined such that the magnitude of the virtual surface normal force component N_na or N_nb, whichever is smaller, after changing the magnitudes of the virtual surface normal force components N_na and N_nb, which have been determined by the processing up to S'15, by the ΔIN_lim_n (the magnitude of the internal force that has been corrected on the basis of the ΔIN_lim_n) coincides with the aforesaid internal force upper limit value IFC_n (or takes a value that is slightly smaller than IFC_n).

In the case where the virtual surface group set in S01 has two pairs or more opposing virtual surfaces Sna and Snb, for the opposing virtual surfaces Sna and Snb, on which the determination result in S127 is not negative, then the internal force correction amount ΔIN_n calculated in S125 is determined directly as the internal force restricted correction amount ΔIN_lim_n.

Further, in the processing carried out in S135 following the processing in S129, the values obtained by correcting the magnitudes of the virtual surface normal force components, which have been determined by the processing up to S15, by the ΔIN_lim_n determined in S129 are used for the magnitudes of the virtual surface normal force components N_na and N_nb for determining the frictional force upper limit values and the twisting force upper limit values of the opposing virtual surfaces Sna and Snb, respectively.

In the processing in S135 following the processing in S129, on all virtual surfaces set in S01, there is a case where the virtual surface frictional force component F_i that has been corrected on the basis of f_i calculated in S125 satisfies the second requirement and R_i calculated in S125 satisfies the fourth requirement. In this case, the f_i and R_i calculated in S125 will be determined directly as the virtual surface frictional force component restricted correction amount f_lim_i and the virtual surface restricted twisting force R_lim_i in each virtual surface.

Although not illustrated, according to the present embodiment, if the determination result in S127 is affirmative and the determination result in S131 is negative, then the internal force correction amount ΔIN_n calculated in S125 will be determined directly as the internal force correction amount ΔIN_lim_n in the processing in S135 for the convenience of the processing thereafter.

After determining the ΔIN_lim_n, f_lim_i and R_lim_i as described above, the external force target generator 27 carries out the processing in S137. In this step S137, the external force target generator 27 calculates a remaining error component errM' of the moment error errM. The remaining error component errM' denotes an error component that cannot be canceled by the set of ΔIN_lim_n, f_lim_i and R_lim_i.

More specifically, the external force target generator 27 calculates a difference Δf_i between the virtual surface frictional force component correction amount f_i before being restricted and the virtual surface frictional force component restricted correction amount f_lim_i (=f_i−f_lim_i) and also calculates a difference ΔR_i between the virtual surface twisting force R_i before being restricted and the virtual surface restricted twisting force R_lim_i (=R_−R_lim_i) in each virtual surface. Further, the external force target generator 27 calculates a difference ΔΔIN_n between the internal force correction amount ΔIN_n before being restricted and the internal force restricted correction amount ΔIN_lim_i (=ΔIN_n−ΔIN_lim_n).

Then, the external force target generator 27 replaces the components f_i, R_i and ΔIN_n of the vertical vector (f_i_R_i ΔIN_n)$^T$ in the right side of the aforesaid expression 13 by Δf_i, ΔR_i and ΔΔIN_n corresponding thereto, and calculates the remaining error component errM' according to an expression obtained by replacing the left side of the aforesaid expression 13 by errM'.

Alternatively, by using an expression obtained by replacing the components f_i, R_i and ΔIN_n of the vertical vector (f_i_R_iΔIN_n)$^T$ in the right side of expression 13 by f_lim_i, R_lim_i and ΔIN_lim_n, respectively, the moment generated about a moment reference point due to the f_lim_i, R_lim_i and ΔIN_lim_n may be calculated, and the calculated moment may be subtracted from the moment error errM so as to calculate the remaining error component errM'.

Subsequently, the external force target generator 27 carries out the processing from S139 in FIG. 18. In this case, the processing from S139 to S143 is the same as the processing from S73 to S77 in the second embodiment.

If the determination result in S143 is affirmative, then the external force target generator 27 carries out the processing in S145 and terminates the processing at the current time. In this step S145, the external force target generator 27 carries out the same processing as that in S79 of the second embodiment to determine the desired external force applied from each surface to be contacted to the robot 1 and the desired external force action point at the current time.

To be more specific, the external force target generator 27 determines the required virtual surface translational force in each virtual surface at the current time on the basis of the required virtual surface translational forces (N_i, F_i) in each virtual surface determined by the processing up to S15 and the internal force restricted correction amount ΔIN_lim_n and the virtual surface frictional force component restricted correction amount f_lim_i determined by the processing up to S135. In this case, for the opposing virtual surfaces Sna and Snb, the normal force component obtained by changing the magnitudes of the virtual surface normal force components N_na and N_nb, which have been determined by the processing up to S15, by the ΔIN_lim_n is determined as the virtual surface normal force component in the opposing virtual surfaces Sna and Snb. For the remaining virtual surfaces, the virtual surface normal force component N_i determined by the processing up to S15 is directly determined as the virtual surface normal force component in the virtual surfaces. Further, for every virtual surface, the frictional force component obtained by adding the virtual surface frictional force component restricted correction amount f_lim_i to the virtual surface frictional force component F_i determined by the processing up to S15 is determined as the virtual surface frictional force component in the virtual surface.

Further, the external force target generator 27 determines the virtual surface restricted twisting force R_lim_i determined by the processing in S135 as the virtual surface twisting force in the virtual surface corresponding to the determined R_lim_i.

Then, the external force target generator 27 converts the required virtual surface translational force and the virtual surface twisting force in each virtual surface, which have been determined as described above, into the translation force and the twisting force, respectively, to be applied from the surface to be contacted, which corresponds to the virtual surface, to the robot 1, thereby determining the desired translational force and the desired twisting force, which are constituent elements of the desired external force, by the same processing as that in S79.

Further, the external force target generator 27 determines the point obtained by inversely projecting the external force action point on each virtual surface, which has been corrected on the basis of the on-virtual-surface external force action point correction amount Δrpc_i determined in S141, onto a surface to be contacted corresponding to the virtual surface as the desired external force action point on the surface to be contacted.

If the determination result in S143 is negative, then the external force target generator 27 carries out the processing in S147 and then carries out the processing from S13 of FIG. 7 again. In this case, the external force target generator 27 determines in S147 an increment IN_n of the magnitude of the virtual surface normal force components N_na and N_nb in the opposing virtual surfaces Sna and Snb (more specifically, the increment from the virtual surface normal force components N_na and N_nb determined by the processing up to S15). At this time, according to the present embodiment, the increment IN_n determined in S83 is set to a predetermined value.

When carrying out the aforesaid processing from S13 again, the processing from S61 may alternatively be carried out without carrying out the determination processing in S121 after the processing in S21 (or without depending on the determination result in S121).

This completes the detailed description of the processing by the external force target generator 27 in the present embodiment.

As with the first embodiment, in the processing carried out by the external force target generator 27 described above, first, the required virtual surface translational forces (N_i, F_i) necessary for achieving a translational motion of the entire robot 1 in a desired motion of the robot 1 are tentatively determined by the processing in S05 to S15. Hence, the provisional values of the required virtual surface translational forces (N_i, F_i) that allow a translational motion of the entire robot 1 to be accomplished can be efficiently determined using a simple algorithm.

Further, as with the first embodiment, if the determination results in both S07 and S09 are negative or if the determination results in S07, S09, and S15 are negative, affirmative, and negative, respectively, then it is evaluated that the desired motion generated by the basic gait element generator 25 is inappropriate, and the processing by the external force target generator 27 is interrupted. Thus, with a simple algorithm, a desired motion that tends to lead to an excessive frictional force between a surface to be contacted and the robot 1 or a desired motion that tends to lead to an excessive internal force of the robot 1 can be efficiently evaluated as inappropriate for implementing a translational motion of the entire robot 1 in a desired motion, as with the first embodiment. This makes it possible to restrain wasteful arithmetic processing from being executed in generating a desired gait.

Further, in the present embodiment, after determining the provisional values of the required virtual surface translational forces ($N\_i$, $F\_i$) that enable a translational motion of the entire robot 1 to be accomplished as described above, the processing in S19, S21 and S61 to S75 (except for the processing in S67) or the processing in S19, S21 and S123 to S141 (except for the processing in 8133) determines the pair of the virtual surface frictional force component correction amount $f\_i$ and the virtual surface twisting force $R\_i$ or the set of the $f\_i$, the $R\_lim\_i$ and the internal force correction amount $\Delta IN\_n$, or the set of the $f\_lim\_i$, the $R\_lim\_i$, the $\Delta rpc\_i$ and the internal force restricted correction amount $\Delta IN\_lim\_n$, or the set of the $f\_lim\_i$, the $R\_lim\_i$, $\Delta rpc\_i$, and the internal force restricted correction amount $\Delta IN\_n$ as the additional manipulated variable (the moment compensation amount) for implementing a rotational motion (a rotational motion that changes the angular momentum about the moment reference point) of the entire robot 1.

Thus, as with the first embodiment, simply combining the provisional values of the required virtual surface translational forces ($N\_i$, $F\_i$) determined by the processing in S05 to S15 and the moment compensation amounts determined by the processing in S19, S21 and S61 to S75 (except for the processing in S67) or S19, S21 and S123 to S141 (except for the processing in S133) makes it possible to determine the set of the required on-virtual-surface translational force, the on-virtual-surface twisting force, and the on-virtual-surface external force action point (including the case where the on-virtual-surface twisting force is zero) that allow both the translational motion and the rotational motion of the entire robot 1 to be properly accomplished. Then, the set of the required on-virtual-surface translational force, the on-virtual-surface twisting force, and the on-virtual-surface external force action point makes it possible to efficiently and properly determine the desired external forces (a desired translational force and a desired twisting force) to be applied to the robot 1 from surfaces to be contacted and a desired external force action point.

Further, as with the first embodiment, except for a case where the determination result in any one of S09 and S15 in FIG. 7 and S81 is negative (in the case where the desired motion is inappropriate), a final required virtual surface translational force (the set of the virtual surface normal force component $N\_i$ and the virtual surface frictional force component $F\_i$) in each virtual surface corresponding to each surface to be contacted at the current time is determined to eventually satisfy the first A requirement, the first B requirement, the second requirement, and the third requirement except.

Further, the desired value of a translational external force (a desired translational force) in a surface to be contacted corresponding to each virtual surface is determined such that the normal force component (the component perpendicular to a surface to be contacted) and the frictional force component (the component parallel to a surface to be contacted) thereof coincide with the virtual surface normal force component $N\_i$ and the virtual surface frictional force component $F\_i$, respectively, in the virtual surface.

Hence, as with the first embodiment, the desired translational force applied from each surface to be contacted to the robot 1 can be determined such that the required total translational external force is attained by the resultant force of the normal force components of the desired translational forces in the individual surfaces to be contacted as much as possible, while the frictional force component of the desired translational force is minimized as much as possible within the limit of the magnitude of the frictional force that can be generated in the surface to be contacted.

Further, in the case where the virtual surfaces set in S01 include the opposing virtual surfaces Sna and Snb, except for the case where a desired motion is determined as inappropriate, the virtual surface normal force components are determined such that the magnitude of the internal force generated in the robot 1 between the opposing virtual surfaces Sna and Snb (the magnitude of $N\_na$ or $N\_nb$, whichever is smaller) is the internal force upper limit value $IFC\_n$ or less (such that the third requirement is satisfied). This makes it possible to determine the desired translational forces in the surfaces to be contacted that include two surfaces to be contacted corresponding to the opposing virtual surfaces Sna and Snb such that the share, which is required for generating an internal force, in the motive power (the driving torque in the present embodiment) that can be generated by joint actuators 11 of the robot 1 will not become excessive.

Here, a supplementary description will be given of the relationship of correspondence between the present embodiment described above and the present invention. In the present embodiment, an external force target generator 27 of a gait generator 23 of a control unit 21 functions as the desired motion evaluation apparatus in the present invention.

In the processing carried out by the external force target generator 27, the processing in S01 implements the virtual surface group setting unit in the present invention.

Further, the processing in S03 implements the required total translational external force determining unit in the present invention.

Further, the processing in S05 implements the required virtual surface translational force calculating unit calculating the required virtual surface translational force so as to satisfy the first A requirement and the first B requirement.

Then, in this case, the processing in S07 to S17 implements the desired motion evaluating unit. In this case, the determination processing in S07 implements the first determining unit in the present invention. Further, the determination processing in S09 implements the second determining unit in the present invention. Further, the determination processing in S15 implements the third determining unit in the present invention.

Further, viewed from another point, the processing in S05 to S13 (except for the case where the determination result in S09 is negative), the processing in S05 to S21 (except for the case where the determination result in S09 or S15 is negative) and the processing in S61 to S83 (except for the case where the determination result in S81 is negative and the case where the determination result in S121 is affirmative) as well as the subsequent processing in S13 of the present embodiment, or the processing in S05 to S21 (except for the case where the determination result in S09 or S15 is negative) and the processing in S123 to S147 as well as the subsequent processing in S13 of the present embodiment implement the required virtual surface translational force calculating unit calculating the required virtual surface translational force so as to satisfy the first A requirement, the first B requirement, and the second requirement.

Then, in this case, the determination processing in S15 and S17 implements the desired motion evaluating unit in the present invention, and the determination processing in S15 implements the fourth determining unit in the present invention.

The above embodiments have been described, assuming the case where there are the surfaces to be contacted WL1 and WL2 opposing each other with an interval provided therebetween in an outside world (operating environment) of the robot 1, as with the aforesaid wall climbing gait. The present invention, however, can be applied also for evaluating a desired motion for causing a robot to carry out a motion in an operating environment wherein there are no surfaces to be contacted opposing each other with an interval provided therebetween. For example, the present invention can be applied also for evaluating a desired motion to cause the robot to effect a motion while maintaining a plurality of portions of the robot to be in contact with three surfaces to be contacted or two surfaces to be contacted that intersect with each other.

The examples of desired gaits other than the aforesaid wall climbing gait are illustrated in FIG. 19 and FIG. 20.

FIGS. 19(a) to 19(e) illustrate, in a time-series order, the instantaneous motional states of the robot 1 in an example of desired gait for causing a robot 1 to implement a motion in an operating environment in which there are, for example, a floor surface FL and a wall surface WL1 as two surfaces to be contacted that intersect with each other.

The motion of the robot 1 in the desired gait is the following type of motion. From the state wherein the robot 1 is standing with two link mechanisms 5a and 5b in contact with the floor surface FL, as illustrated in FIG. 19(a), the robot 1 brings link mechanisms 5c and 5d into a wall surface WL1, as illustrated in FIG. 19(b). Then, in this state, the robot 1 moves a body 3 thereof into contact with the wall surface WL1, leaning the body 3 against the wall surface WL1, as illustrated in FIG. 19(c). Thereafter, the robot 1 pushes the wall surface WL1 by the link mechanisms 5c and 5d to move the body 3 off of the wall surface WL1, as illustrated in FIG. 19(d), and finally moves the link mechanisms 5c and 5d off the wall surface WL1, as illustrated in FIG. 19(e).

Further, FIGS. 20(a) to 20(d) illustrate, in a time-series order, the instantaneous motional states of the robot 1 in an example of desired gait for causing the robot 1 to implement a motion in an operating environment in which there are, for example, a floor surface FL and two wall surfaces WL1 and WL3 as three surfaces to be contacted that intersect with each other (e.g., a corner of an indoor room). FIGS. 20(a) to 20(d) are the plan views of the robot 1 and the operating environment observed from above. In each of FIGS. 20(a) to 20(d), the robot 1 is standing with link mechanisms 5a and 5d (not shown) in contact with a floor surface FL.

Figure 20A:
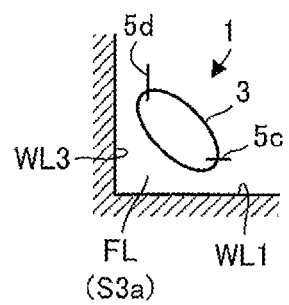
FIGS. 20(a) to 20(d) are diagrams illustrating in a time series manner the instantaneous motional states of the robot in yet another example of a desired gait of the robot shown in FIG. 1.
Figure 20B:
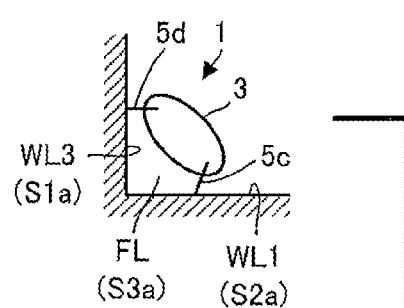
Figure 20C:
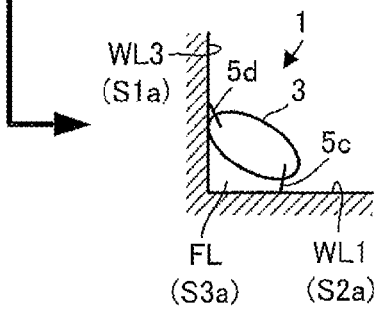

The motion of the robot 1 in the desired gait is the following type of motion. From the state wherein the robot 1 is standing in contact with the floor surface FL, as illustrated in FIG. 20(a), the robot 1 brings the link mechanisms 5c and 5d into wall surfaces WL1 and WL3, respectively, as illustrated in FIG. 20(b). Then, in this state, the robot 1 moves the body 3 thereof toward the wall surface WL3 into contact with the wall surface WL3, leaning the body 3 against the wall surface WL3, as illustrated in FIG. 20(c). Thereafter, the robot 1 pushes the wall surfaces WL 1 and WL2 by the link mechanisms 5c and 5d, respectively, to move the body 3 and the link mechanism 5c off of the wall surface WL1 and to move the link mechanism 5d off the wall surface WL3, as illustrated in FIG. 20(e).

Also in a case where the desired motion illustrated in FIG. 19 or FIG. 20 is evaluated, the desired motion of the robot 1 can be evaluated while determining the desired external force to be applied to the robot 1 from the surfaces to be contacted FL and WL1 and the desired external force action point by the processing by the external force target generator 27 in the embodiments described above.

In this case, in the processing by the external force target generator 27 related to the desired motion illustrated in FIG. 19, one virtual surface (a virtual surface S3a in the illustrated example) is set by the processing in the aforesaid S01 in the motional states shown in FIGS. 19(a) and 19(e), and two virtual surfaces (virtual surfaces S2a and S3a in the illustrated example) are set by the processing in the aforesaid S01 in the motional states shown in FIGS. 19(b) to 19(d).

Figure 20D:
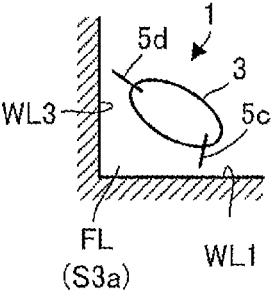

Further, in the processing by the external force target generator 27 related to the desired motion illustrated in FIG. 20, one virtual surface (a virtual surface S3a in the illustrated example) is set by the processing in the aforesaid S01 in the motional states shown in FIGS. 20(a) and 20(d), and three virtual surfaces (virtual surfaces S1a, S2a and S3a in the illustrated examples) are set by the processing in the aforesaid S01 in the motional states shown in FIGS. 20(b) and 20(c).

As with the case illustrated in FIG. 19 or FIG. 20, if no surfaces to be contacted corresponding to the opposing virtual surfaces Sna and Snb exist in the operating environment of the robot 1, then the determination results of the determination processing in S09 of FIG. 7, S43 of FIG. 9, S81 of FIG. 15, S101 of FIG. 16, and S121 of FIG. 17 will be always negative. Hence, no exclusive processing is required in the case where the above determination results are affirmative. For instance, in the case where the determination results in S07, S39, and S77 are negative, it may be determined that the respective desired motions are inappropriate.

Further, in the aforesaid embodiments, the examples in which the desired motion is evaluated while generating desired gaits by the control unit 21 installed in the robot 1 have been described. However, the processing for generating a desired gait (the processing by the gait generator 23) in the present embodiment does not have to be carried out when the robot 1 actually moves. Therefore, the processing by the gait generator 23 may be carried out as necessary by an appropriate computer outside the robot 1.

What is claimed is:

1. A desired motion evaluation apparatus of a legged mobile robot, which evaluates a desired motion of the robot for causing the robot to implement a motion while having a plurality of portions of the robot in contact with a plurality of different surfaces to be contacted, which exist in an operating environment of the robot, the desired motion evaluation apparatus comprising at least one processor, the at least one processor comprising:

a virtual surface group setting unit which uses a virtual surface group composed of a plurality of virtual surfaces having a predetermined mutual posture relationship in order to virtually set the virtual surface group in the space of an operating environment of the robot such that the plurality of virtual surfaces of the virtual surface group match or approximate the plurality of surfaces to be contacted;

a required total translational external force determining unit which determines, on the basis of the desired motion, a required total translational external force, which is a translational force component in a total external force to be applied to the robot to implement the desired motion;
a required virtual surface translational force calculating unit, which is a unit that calculates a required virtual surface translational force, which is a translational force to be applied to the robot from each of the plurality of virtual surfaces of the virtual surface group to attain the determined required total translational external force, and calculates the required virtual surface translational force in each virtual surface so as to satisfy at least a first A requirement that the resultant force of virtual surface normal force components, which are components perpendicular to the virtual surface of the required virtual surface translational force in each of the plurality of virtual surfaces, coincides with components other than components parallel to all virtual surfaces of the virtual surface group of the required total translational external force and a first B requirement that the resultant force of virtual surface frictional force components, which are components parallel to the virtual surface of the required virtual surface translational force in each of the plurality of virtual surfaces, coincides with the components parallel to all virtual surfaces of the virtual surface group of the required total translational external force; and
a desired motion evaluating unit which evaluates the desired motion at least on the basis of the calculated required virtual surface translational force.

2. The desired motion evaluation apparatus of a legged mobile robot according to claim 1, wherein
the desired motion evaluating unit includes a first determining unit, which determines whether the calculated required virtual surface translational force satisfies a second requirement that the magnitude of the virtual surface frictional force component of the required virtual surface translational force in each virtual surface is not more than a first predetermined value set on the basis of at least the virtual surface normal force component in the virtual surface, and the desired motion evaluating unit evaluates the desired motion as inappropriate at least in the case where a determination result of the first determining unit is negative and the calculated required virtual surface translational force is not correctable so as to satisfy the first A requirement, the first B requirement, and the second requirement.

3. The desired motion evaluation apparatus of a legged mobile robot according to claim 2, wherein
the desired motion evaluating unit includes a second determining unit, which, in the case where the determination result of the first determining unit is negative, determines whether the virtual surface in which the determination result is negative is a virtual surface belonging to opposing virtual surfaces, which are two virtual surfaces opposing to each other with an interval provided therebetween of the virtual surface group, and the desired motion evaluating unit determines that the desired motion is inappropriate in the case where the determination result of the first determining unit and the determination result of the second determining unit are both negative.

4. The desired motion evaluation apparatus of a legged mobile robot according to claim 3, wherein
the desired motion evaluating unit includes a third determining unit, which, in the case where the determination result of the second determining unit is affirmative, determines whether it is possible to correct the virtual surface normal force component of the calculated required virtual surface translational force in each of the two opposing virtual surfaces including the virtual surface in which the determination result of the first determining unit is negative so as to satisfy a third requirement that the magnitude of the normal force component which is the smaller one of the virtual surface normal force components in the two opposing virtual surfaces be a preset second predetermined value or less, the first A requirement, and the second requirement, and the desired motion evaluating unit determines that the desired motion is inappropriate in the case where the determination result of the first determining unit, the determination result of the opposing virtual surface determining unit, and the determination result of the third determining unit are negative, affirmative, and negative, respectively.

5. A desired motion evaluation apparatus of a legged mobile robot, which evaluates a desired motion of the robot for causing the robot to implement a motion while having a plurality of portions of the robot in contact with a plurality of different surfaces to be contacted, which exist in an operating environment of the legged mobile robot and include two surfaces to be contacted opposing to each other with an interval provided therebetween, the desired motion evaluation apparatus comprising at least one processor, the at least one processor comprising:
a virtual surface group setting unit which uses a virtual surface group composed of a plurality of virtual surfaces having a predetermined mutual posture relationship in order to virtually set the virtual surface group in the space of an operating environment of the robot such that the plurality of virtual surfaces of the virtual surface group match or approximate the plurality of surfaces to be contacted;
a required total translational external force determining unit which determines, on the basis of the desired motion, a required total translational external force, which is a translational force component in a total external force to be applied to the robot to implement the desired motion;
a required virtual surface translational force calculating unit, which is a unit that calculates a required virtual surface translational force, which is a translational force to be applied to the robot from each of the plurality of virtual surfaces of the virtual surface group to attain the determined required total translational external force, and calculates the required virtual surface translational force in each virtual surface so as to satisfy at least a first A requirement that the resultant force of virtual surface normal force components, which are components perpendicular to the virtual surface of the required virtual surface translational force in each of the plurality of virtual surfaces, coincides with components other than components parallel to all virtual surfaces of the virtual surface group of the required total translational external force, a first B requirement that the resultant force of virtual surface frictional force components, which are components parallel to the virtual surface of the required virtual surface translational force in each of the plurality of virtual surfaces, coincides with the components parallel to all virtual surfaces of the virtual surface group of the required total translational external force, and a second requirement that the magnitude of the virtual surface frictional force component of the required virtual surface translational force in each virtual surface is not more than a first predetermined value set on the basis of at least the virtual surface normal force component in the virtual surface; and a desired motion evaluating unit which evaluates the desired motion at least on the basis of the calculated required virtual surface translational force, wherein:

the desired motion evaluating unit includes a fourth determining unit which determines whether the calculated required virtual surface translational force in each of the opposing virtual surfaces satisfies a third requirement that the magnitude of the normal force component which is the smaller one of the virtual surface normal force components in the two opposing virtual surfaces, which correspond to the two surfaces to be contacted opposing to each other with an interval provided therebetween of the virtual surface group, is a preset second predetermined value or less; and the desired motion evaluating unit evaluates the desired motion as inappropriate in the case where the determination result of the fourth determining unit is negative and the virtual surface normal force component of the calculated required virtual surface translational force in each of the opposing virtual surfaces is not correctable so as to satisfy the first A requirement and the third requirement.

* * * * *